US011068128B2

(12) United States Patent
Zambetti et al.

(10) Patent No.: US 11,068,128 B2
(45) Date of Patent: Jul. 20, 2021

(54) USER INTERFACE OBJECT MANIPULATIONS IN A USER INTERFACE

(71) Applicant: Apple Inc., Cupertino, CA (US)

(72) Inventors: Nicholas Zambetti, San Francisco, CA (US); Gary Ian Butcher, San Jose, CA (US); Imran Chaudhri, San Francisco, CA (US); Jonathan R. Dascola, San Francisco, CA (US); Alan C. Dye, San Francisco, CA (US); Christopher Patrick Foss, San Francisco, CA (US); Aurelio Guzman, San Jose, CA (US); Jonathan P. Ive, San Jose, CA (US); Chanaka G. Karunamuni, San Jose, CA (US); Duncan Robert Kerr, San Francisco, CA (US); Stephen O. Lemay, Palo Alto, CA (US); Natalia Maric, San Francisco, CA (US); Christopher Wilson, San Francisco, CA (US); Eric Lance Wilson, San Jose, CA (US); Lawrence Y. Yang, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/358,483

(22) Filed: Mar. 19, 2019

(65) Prior Publication Data
US 2019/0212885 A1 Jul. 11, 2019

Related U.S. Application Data

(63) Continuation of application No. 14/913,350, filed as application No. PCT/US2014/053958 on Sep. 3,
(Continued)

(51) Int. Cl.
G06F 3/0482 (2013.01)
G06F 3/0481 (2013.01)
(Continued)

(52) U.S. Cl.
CPC ............ *G06F 3/0482* (2013.01); *G06F 1/163* (2013.01); *G06F 1/169* (2013.01); *G06F 3/0362* (2013.01);
(Continued)

(58) Field of Classification Search
CPC .. G06F 3/0482; G06F 3/0362; G06F 3/04845; G06F 1/163; G06F 1/169;
(Continued)

(56) References Cited

U.S. PATENT DOCUMENTS 4,358,837 A * 11/1982 Yamazaki ................ G04G 5/02
368/187
4,395,134 A 7/1983 Luce
(Continued)

FOREIGN PATENT DOCUMENTS

AU 2012200689 A1 3/2012
AU 2014100584 A4 7/2014
(Continued)

OTHER PUBLICATIONS

Non-Final Office Action received for U.S. Appl. No. 14/913,349, dated Jan. 2, 2020, 25 pages.
(Continued)

*Primary Examiner* — Haoshian Shih
*Assistant Examiner* — Alvaro R Calderon, IV
(74) *Attorney, Agent, or Firm* — Dentons US LLP

(57) ABSTRACT

Systems and processes for manipulating a graphical user interface are disclosed. One process can include receiving user input through a crown to rotate a virtual object. The process includes selecting a surface of the object from
(Continued)

among the multiple surfaces of the object in response to determining that the crown rotation exceeded a speed threshold.

30 Claims, 26 Drawing Sheets

Related U.S. Application Data 2014, now Pat. No. 10,275,117, which is a continuation-in-part of application No. 14/476,657, filed on Sep. 3, 2014, now abandoned.

(60) Provisional application No. 61/959,851, filed on Sep. 3, 2013, provisional application No. 61/873,359, filed on Sep. 3, 2013, provisional application No. 61/873,356, filed on Sep. 3, 2013, provisional application No. 61/873,360, filed on Sep. 3, 2013.

(51) Int. Cl.
| | |
|---|---|
| G06F 1/16 | (2006.01) |
| G06F 3/0484 | (2013.01) |
| G06F 3/0362 | (2013.01) |
| G06T 13/80 | (2011.01) |

(52) U.S. Cl.
CPC ........ G06F 3/0481 (2013.01); G06F 3/04845 (2013.01); G06T 13/80 (2013.01); *G06F 2203/04802* (2013.01)

(58) Field of Classification Search
CPC ......... G06F 3/0481; G06F 2203/04802; G06F 1/1643; G06F 3/0485; G06T 13/80
See application file for complete search history.

(56) References Cited

U.S. PATENT DOCUMENTS

| | | | |
|---|---|---|---|
| 4,623,261 A * | 11/1986 | Muto | G04F 8/00 368/110 |
| 5,088,070 A | 2/1992 | Shiff et al. | |
| 5,204,600 A | 4/1993 | Kahkoska | |
| 5,220,260 A | 6/1993 | Schuler | |
| 5,313,229 A | 5/1994 | Gilligan et al. | |
| 5,323,363 A * | 6/1994 | Hysek | G04B 19/223 368/21 |
| 5,329,501 A * | 7/1994 | Meister | G04G 21/04 368/10 |
| 5,477,508 A | 12/1995 | Will | |
| 5,508,978 A * | 4/1996 | Kalbermatter | G04G 21/00 368/13 |
| 5,519,393 A | 5/1996 | Brandestini | |
| 5,528,260 A | 6/1996 | Kent | |
| 5,563,631 A | 10/1996 | Masunaga | |
| 5,623,588 A | 4/1997 | Gould | |
| 5,661,632 A | 8/1997 | Register | |
| 5,689,628 A | 11/1997 | Robertson | |
| 5,691,747 A | 11/1997 | Amano | |
| 5,739,775 A | 4/1998 | Brandestini | |
| 5,751,260 A | 5/1998 | Nappi et al. | |
| 5,825,353 A | 10/1998 | Will | |
| 5,852,413 A | 12/1998 | Bacchi et al. | |
| 5,874,961 A | 2/1999 | Bates et al. | |
| 5,903,229 A | 5/1999 | Kishi | |
| 5,940,521 A | 8/1999 | East et al. | |
| 5,960,366 A | 9/1999 | Duwaer | |
| 5,982,710 A | 11/1999 | Rawat et al. | |
| 6,005,579 A | 12/1999 | Sugiyama et al. | |
| 6,081,256 A | 6/2000 | Martin et al. | |
| 6,115,025 A | 9/2000 | Buxton et al. | |
| 6,128,006 A | 10/2000 | Rosenberg et al. | |
| 6,157,381 A | 12/2000 | Bates et al. | |
| 6,161,957 A | 12/2000 | Guanter | |
| 6,192,258 B1 | 2/2001 | Kamada et al. | |
| 6,203,190 B1 | 3/2001 | Stotz | |
| 6,249,689 B1 | 6/2001 | Aizawa | |
| 6,266,098 B1 * | 7/2001 | Cove | H04N 5/44513 348/563 |
| 6,297,795 B1 | 10/2001 | Kato et al. | |
| 6,300,939 B1 | 10/2001 | Decker et al. | |
| 6,305,234 B1 | 10/2001 | Thies et al. | |
| 6,310,648 B1 | 10/2001 | Miller et al. | |
| 6,323,846 B1 | 11/2001 | Westerman et al. | |
| 6,336,126 B1 | 1/2002 | Bjorklund et al. | |
| 6,339,438 B1 | 1/2002 | Bates et al. | |
| 6,351,657 B2 | 2/2002 | Yamada | |
| 6,369,794 B1 | 4/2002 | Sakurai et al. | |
| 6,396,482 B1 | 5/2002 | Griffin et al. | |
| 6,477,117 B1 | 11/2002 | Narayanaswami et al. | |
| 6,489,950 B1 | 12/2002 | Griffin et al. | |
| 6,525,997 B1 | 2/2003 | Narayanaswami et al. | |
| 6,535,461 B1 | 3/2003 | Karhu et al. | |
| 6,556,222 B1 | 4/2003 | Narayanaswami | |
| 6,570,557 B1 | 5/2003 | Westerman et al. | |
| 6,570,583 B1 | 5/2003 | Kung et al. | |
| 6,597,374 B1 * | 7/2003 | Baker | H03J 1/0025 345/173 |
| 6,600,936 B1 | 7/2003 | Kärkkäinen et al. | |
| 6,636,197 B1 | 10/2003 | Goldenberg et al. | |
| 6,636,246 B1 | 10/2003 | Gallo et al. | |
| 6,647,338 B1 | 11/2003 | Remlinger et al. | |
| 6,661,438 B1 | 12/2003 | Shiraishi et al. | |
| 6,677,932 B1 | 1/2004 | Westerman | |
| 6,686,904 B1 * | 2/2004 | Sherman | G06F 3/0213 341/22 |
| 6,686,911 B1 | 2/2004 | Levin et al. | |
| 6,700,564 B2 | 3/2004 | Mcloone et al. | |
| 6,720,860 B1 | 4/2004 | Narayanaswami | |
| 6,763,226 B1 | 7/2004 | Mczeal, Jr. | |
| 6,788,220 B2 | 9/2004 | Netzer et al. | |
| 6,809,275 B1 | 10/2004 | Cheng et al. | |
| 6,809,724 B1 | 10/2004 | Shiraishi et al. | |
| 6,842,169 B2 | 1/2005 | Griffin et al. | |
| 6,937,228 B2 | 8/2005 | Yu | |
| 6,967,642 B2 | 11/2005 | SanGiovanni et al. | |
| 6,967,903 B2 | 11/2005 | Guanter et al. | |
| 6,977,868 B2 | 12/2005 | Brewer et al. | |
| 7,002,558 B2 | 2/2006 | Keely et al. | |
| 7,046,230 B2 | 5/2006 | Zadesky et al. | |
| 7,058,904 B1 | 6/2006 | Khan et al. | |
| 7,075,513 B2 | 7/2006 | Silfverberg et al. | |
| 7,081,905 B1 | 7/2006 | Raghunath | |
| 7,085,590 B2 | 8/2006 | Kennedy et al. | |
| 7,091,964 B2 | 8/2006 | Wong et al. | |
| 7,116,317 B2 | 10/2006 | Gregorio et al. | |
| 7,130,664 B1 | 10/2006 | Williams | |
| 7,143,355 B2 | 11/2006 | Yamaguchi et al. | |
| 7,146,005 B1 | 12/2006 | Anft et al. | |
| 7,168,047 B1 | 1/2007 | Huppi et al. | |
| 7,227,963 B1 | 6/2007 | Yamada et al. | |
| 7,256,770 B2 | 8/2007 | Hinckley et al. | |
| 7,272,077 B2 | 9/2007 | Nobs et al. | |
| 7,286,063 B2 | 10/2007 | Gauthey et al. | |
| 7,286,119 B2 | 10/2007 | Miyashita et al. | |
| 7,317,449 B2 | 1/2008 | Robbins et al. | |
| 7,333,084 B2 | 2/2008 | Griffin et al. | |
| 7,463,239 B2 | 12/2008 | Ledbetter et al. | |
| 7,469,381 B2 | 12/2008 | Ording | |
| 7,469,386 B2 | 12/2008 | Bear et al. | |
| 7,477,890 B1 | 1/2009 | Narayanaswami et al. | |
| 7,489,303 B1 | 2/2009 | Pryor | |
| 7,499,040 B2 | 3/2009 | Zadesky et al. | |
| 7,506,269 B2 | 3/2009 | Lang et al. | |
| 7,519,468 B2 | 4/2009 | Orr et al. | |
| 7,596,761 B2 | 9/2009 | Lemay et al. | |
| 7,600,192 B1 | 10/2009 | Hashimoto et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,710,393 B2 | 5/2010 | Tsuk et al. | |

(56) References Cited

U.S. PATENT DOCUMENTS

| | | |
|---|---|---|
| 7,710,409 B2 | 5/2010 | Robbin et al. |
| 7,720,552 B1 | 5/2010 | Lloyd |
| 7,794,138 B2 | 9/2010 | Hilfiker |
| 7,844,914 B2 | 11/2010 | Andre et al. |
| 7,844,915 B2 | 11/2010 | Platzer et al. |
| 7,856,255 B2 | 12/2010 | Tsuchiya et al. |
| 7,865,304 B2 | 1/2011 | Gretton et al. |
| 7,876,288 B1 | 1/2011 | Huang |
| 7,916,157 B1 | 3/2011 | Kelley et al. |
| 7,956,847 B2 | 6/2011 | Christie |
| 7,957,762 B2 | 6/2011 | Herz et al. |
| 7,965,276 B1 | 6/2011 | Martin et al. |
| 8,001,488 B1 | 8/2011 | Lam et al. |
| 8,006,002 B2 | 8/2011 | Kalayjian et al. |
| 8,009,144 B2 | 8/2011 | Yajima et al. |
| 8,019,390 B2 | 9/2011 | Sindhu |
| 8,046,705 B2 | 10/2011 | Hunleth et al. |
| 8,130,205 B2 | 3/2012 | Forstall et al. |
| 8,140,996 B2 | 3/2012 | Tomkins et al. |
| 8,191,011 B2 | 5/2012 | Abanami et al. |
| 8,194,036 B1 | 6/2012 | Geiss et al. |
| 8,201,102 B2 | 6/2012 | Lee et al. |
| 8,239,784 B2 | 8/2012 | Hotelling et al. |
| 8,266,550 B1 | 9/2012 | Cleron et al. |
| 8,279,180 B2 | 10/2012 | Hotelling et al. |
| 8,307,306 B2 | 11/2012 | Komatsu et al. |
| 8,308,680 B1 | 11/2012 | Chawla |
| 8,311,727 B2 | 11/2012 | Eckstein et al. |
| 8,365,090 B2 | 1/2013 | Ording |
| 8,381,135 B2 | 2/2013 | Hotelling et al. |
| 8,427,432 B2 | 4/2013 | Kim et al. |
| 8,448,083 B1 | 5/2013 | Migos et al. |
| 8,479,122 B2 | 7/2013 | Hotelling et al. |
| 8,487,882 B2 | 7/2013 | Inaba et al. |
| 8,533,623 B2 | 9/2013 | St |
| 8,549,429 B2 | 10/2013 | Tsuruta et al. |
| 8,566,722 B2 | 10/2013 | Gordon et al. |
| 8,627,236 B2 | 1/2014 | Jung et al. |
| 8,665,209 B2 | 3/2014 | Rimas-Ribikauskas et al. |
| 8,669,944 B2 | 3/2014 | Klinghult et al. |
| 8,669,945 B2 | 3/2014 | Coddington |
| 8,677,283 B2 | 3/2014 | Fong |
| 8,686,944 B1 | 4/2014 | Dayer et al. |
| 8,692,851 B2 | 4/2014 | Ording et al. |
| 8,717,302 B1 | 5/2014 | Qin et al. |
| 8,743,151 B1 | 6/2014 | Fulcher et al. |
| 8,799,816 B2 | 8/2014 | Wells et al. |
| 8,824,245 B2 | 9/2014 | Lau et al. |
| 8,860,674 B2 | 10/2014 | Lee et al. |
| 8,952,886 B2 | 2/2015 | Tsuk et al. |
| 8,954,887 B1 | 2/2015 | Mendis et al. |
| 9,001,625 B2 * | 4/2015 | Essery ................ H04W 88/02 |
| | | 368/46 |
| 9,007,057 B2 | 4/2015 | Villaret |
| 9,007,302 B1 | 4/2015 | Bandt-horn |
| 9,007,323 B2 | 4/2015 | Araki |
| 9,052,814 B2 | 6/2015 | Ording |
| 9,104,705 B2 | 8/2015 | Fujinaga |
| 9,176,652 B1 * | 11/2015 | Patel ................ G06F 3/04883 |
| 9,182,876 B2 | 11/2015 | Kim et al. |
| 9,189,089 B2 | 11/2015 | Sutton et al. |
| 9,195,219 B2 | 11/2015 | Hong et al. |
| 9,229,624 B2 | 1/2016 | Wei et al. |
| 9,268,400 B2 | 2/2016 | Gomez Sainz-Garcia |
| 9,395,867 B2 | 7/2016 | Yach et al. |
| 9,395,905 B2 | 7/2016 | Wherry |
| 9,442,649 B2 | 9/2016 | Davis et al. |
| 9,448,691 B2 | 9/2016 | Suda |
| D778,912 S | 2/2017 | Akana et al. |
| 9,582,187 B2 | 2/2017 | Gil et al. |
| 9,620,312 B2 | 4/2017 | Ely et al. |
| 9,651,922 B2 * | 5/2017 | Hysek .................. G04G 9/00 |
| 9,666,178 B2 | 5/2017 | Loubiere et al. |
| 9,678,571 B1 | 6/2017 | Robert et al. |
| 9,696,809 B2 | 7/2017 | Temple |
| 9,772,769 B2 * | 9/2017 | Shimazu ............ G06F 3/04883 |
| 9,798,443 B1 | 10/2017 | Gray |
| 9,823,828 B2 | 11/2017 | Zambetti et al. |
| D813,239 S | 3/2018 | Akana et al. |
| 9,921,711 B2 | 3/2018 | Oh et al. |
| 9,965,144 B2 | 5/2018 | Nakamura et al. |
| 9,984,539 B2 | 5/2018 | Moussette et al. |
| 10,019,097 B2 | 7/2018 | Ely et al. |
| 10,048,802 B2 | 8/2018 | Shedletsky et al. |
| 10,057,470 B2 | 8/2018 | Kim et al. |
| 10,097,496 B2 | 10/2018 | Dye et al. |
| 10,133,439 B1 | 11/2018 | Brichter et al. |
| 10,175,652 B2 | 1/2019 | Ely et al. |
| 10,216,147 B2 | 2/2019 | Ely et al. |
| 10,216,352 B2 | 2/2019 | Liang et al. |
| 10,222,909 B2 | 3/2019 | Shedletsky et al. |
| 10,275,117 B2 | 4/2019 | Zambetti et al. |
| D849,749 S | 5/2019 | Akana et al. |
| 10,289,218 B1 | 5/2019 | Young |
| 10,296,125 B2 | 5/2019 | Ely et al. |
| 10,324,620 B2 | 6/2019 | Balaram |
| 10,331,081 B2 | 6/2019 | Ely et al. |
| 10,331,082 B2 | 6/2019 | Ely et al. |
| 10,339,721 B1 | 7/2019 | Dascola et al. |
| 10,642,467 B2 | 5/2020 | Merminod et al. |
| 2001/0004337 A1 | 6/2001 | Paratte et al. |
| 2001/0011991 A1 | 8/2001 | Wang et al. |
| 2001/0041596 A1 | 11/2001 | Forlenzo et al. |
| 2001/0043514 A1 | 11/2001 | Kita et al. |
| 2002/0015024 A1 | 2/2002 | Westerman et al. |
| 2002/0019296 A1 | 2/2002 | Freeman et al. |
| 2002/0027547 A1 | 3/2002 | Kamijo et al. |
| 2002/0030665 A1 | 3/2002 | Ano |
| 2002/0030668 A1 | 3/2002 | Hoshino et al. |
| 2002/0036623 A1 | 3/2002 | Kano et al. |
| 2002/0047860 A1 * | 4/2002 | Ceulaer ................ H04N 21/431 |
| | | 715/721 |
| 2002/0054164 A1 | 5/2002 | Uemura |
| 2002/0063684 A1 | 5/2002 | Tran |
| 2002/0101457 A1 | 8/2002 | Lang |
| 2002/0101458 A1 | 8/2002 | SanGiovanni |
| 2002/0118169 A1 | 8/2002 | Hinckley et al. |
| 2002/0126099 A1 | 9/2002 | Engholm |
| 2002/0154150 A1 | 10/2002 | Ogaki et al. |
| 2002/0154175 A1 | 10/2002 | Abello et al. |
| 2002/0171689 A1 | 11/2002 | Fox et al. |
| 2002/0186621 A1 | 12/2002 | Lai et al. |
| 2003/0020671 A1 | 1/2003 | Santoro et al. |
| 2003/0025673 A1 | 2/2003 | Ledbetter et al. |
| 2003/0052901 A1 | 3/2003 | Fukuchi |
| 2003/0076301 A1 | 4/2003 | Tsuk et al. |
| 2003/0098891 A1 | 5/2003 | Molander et al. |
| 2003/0103044 A1 | 6/2003 | Sunda et al. |
| 2003/0112279 A1 | 6/2003 | Irimajiri |
| 2003/0115384 A1 | 6/2003 | Sonehara et al. |
| 2003/0123329 A1 | 7/2003 | Guanter et al. |
| 2003/0137540 A1 | 7/2003 | Klevenz et al. |
| 2003/0142081 A1 | 7/2003 | Iizuka et al. |
| 2003/0142288 A1 | 7/2003 | Kinrot et al. |
| 2003/0189598 A1 | 10/2003 | Lipstein et al. |
| 2003/0210286 A1 | 11/2003 | Gerpheide et al. |
| 2004/0013042 A1 | 1/2004 | Farine et al. |
| 2004/0027793 A1 * | 2/2004 | Haraguchi ............ G06F 1/1671 |
| | | 361/679.55 |
| 2004/0038667 A1 | 2/2004 | Vance |
| 2004/0047244 A1 | 3/2004 | Iino et al. |
| 2004/0073935 A1 | 4/2004 | Kang |
| 2004/0085328 A1 | 5/2004 | Maruyama et al. |
| 2004/0100479 A1 | 5/2004 | Nakano et al. |
| 2004/0113819 A1 | 6/2004 | Gauthey et al. |
| 2004/0130580 A1 | 7/2004 | Howard et al. |
| 2004/0130581 A1 | 7/2004 | Howard et al. |
| 2004/0145595 A1 | 7/2004 | Bennett |
| 2004/0150621 A1 | 8/2004 | Bohn |
| 2004/0155907 A1 | 8/2004 | Yamaguchi et al. |
| 2004/0170270 A1 | 9/2004 | Takashima et al. |
| 2004/0218472 A1 | 11/2004 | Narayanaswami et al. |
| 2004/0225613 A1 | 11/2004 | Narayanaswami et al. |
| 2004/0230599 A1 | 11/2004 | Moore et al. |

(56) References Cited

U.S. PATENT DOCUMENTS

| | | | |
|---|---|---|---|
| 2004/0233162 A1* | 11/2004 | Kobayashi | G01D 5/2451 345/156 |
| 2004/0239649 A1 | 12/2004 | Ludtke et al. | |
| 2004/0239692 A1 | 12/2004 | Balle et al. | |
| 2004/0252119 A1 | 12/2004 | Hunleth et al. | |
| 2004/0264301 A1 | 12/2004 | Howard et al. | |
| 2005/0007884 A1 | 1/2005 | Lorenzato et al. | |
| 2005/0012723 A1 | 1/2005 | Pallakoff | |
| 2005/0081164 A1 | 4/2005 | Hama et al. | |
| 2005/0097466 A1 | 5/2005 | Levi et al. | |
| 2005/0116941 A1 | 6/2005 | Wallington et al. | |
| 2005/0136955 A1 | 6/2005 | Mumick et al. | |
| 2005/0143124 A1 | 6/2005 | Kennedy et al. | |
| 2005/0154798 A1 | 7/2005 | Nurmi | |
| 2005/0168566 A1 | 8/2005 | Tada et al. | |
| 2005/0183012 A1 | 8/2005 | Petro et al. | |
| 2005/0190059 A1 | 9/2005 | Wehrenberg | |
| 2005/0191994 A1 | 9/2005 | May et al. | |
| 2005/0195216 A1 | 9/2005 | Kramer et al. | |
| 2005/0209051 A1 | 9/2005 | Santomassimo et al. | |
| 2005/0215848 A1 | 9/2005 | Lorenzato et al. | |
| 2005/0231489 A1 | 10/2005 | Ladouceur et al. | |
| 2005/0259077 A1 | 11/2005 | Adams et al. | |
| 2006/0007129 A1 | 1/2006 | Pletikosa et al. | |
| 2006/0017692 A1 | 1/2006 | Wehrenberg et al. | |
| 2006/0020904 A1 | 1/2006 | Aaltonen et al. | |
| 2006/0022956 A1 | 2/2006 | Lengeling et al. | |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0028444 A1 | 2/2006 | Hinckley et al. | |
| 2006/0028446 A1 | 2/2006 | Liberty et al. | |
| 2006/0033724 A1 | 2/2006 | Chaudhri et al. | |
| 2006/0064716 A1 | 3/2006 | Sull et al. | |
| 2006/0085751 A1 | 4/2006 | O'Brien et al. | |
| 2006/0090090 A1 | 4/2006 | Perng et al. | |
| 2006/0092177 A1 | 5/2006 | Blasko et al. | |
| 2006/0112350 A1 | 5/2006 | Kato et al. | |
| 2006/0143574 A1 | 6/2006 | Ito et al. | |
| 2006/0152480 A1 | 7/2006 | Senn | |
| 2006/0174213 A1 | 8/2006 | Kato | |
| 2006/0181506 A1 | 8/2006 | Fyke et al. | |
| 2006/0197753 A1 | 9/2006 | Hotelling | |
| 2006/0212905 A1 | 9/2006 | Matsuda et al. | |
| 2006/0224945 A1* | 10/2006 | Khan | G06F 3/0482 715/201 |
| 2006/0255683 A1 | 11/2006 | Suzuki et al. | |
| 2006/0268019 A1 | 11/2006 | Wang et al. | |
| 2006/0268020 A1 | 11/2006 | Han | |
| 2006/0290671 A1 | 12/2006 | Bohn et al. | |
| 2007/0002019 A1 | 1/2007 | Lane et al. | |
| 2007/0004451 A1 | 1/2007 | C. Anderson | |
| 2007/0031119 A1 | 2/2007 | Iwanaga | |
| 2007/0046635 A1 | 3/2007 | Nishiyama et al. | |
| 2007/0063995 A1 | 3/2007 | Bailey et al. | |
| 2007/0070090 A1 | 3/2007 | Debettencourt et al. | |
| 2007/0073917 A1* | 3/2007 | Larson | G06F 3/0485 710/14 |
| 2007/0085841 A1 | 4/2007 | Tsuk et al. | |
| 2007/0097151 A1 | 5/2007 | Rosenberg | |
| 2007/0106949 A1 | 5/2007 | Narita et al. | |
| 2007/0120819 A1 | 5/2007 | Young et al. | |
| 2007/0132733 A1 | 6/2007 | Ram | |
| 2007/0132789 A1 | 6/2007 | Ording et al. | |
| 2007/0136679 A1 | 6/2007 | Yang | |
| 2007/0157094 A1 | 7/2007 | Lemay et al. | |
| 2007/0168369 A1 | 7/2007 | Bruns | |
| 2007/0176910 A1* | 8/2007 | Simek | G06F 3/0362 345/184 |
| 2007/0180379 A1 | 8/2007 | Osato et al. | |
| 2007/0182595 A1 | 8/2007 | Ghasabian | |
| 2007/0182999 A1 | 8/2007 | Anthony et al. | |
| 2007/0209017 A1 | 9/2007 | Gupta et al. | |
| 2007/0211042 A1 | 9/2007 | Kim et al. | |
| 2007/0226646 A1 | 9/2007 | Nagiyama et al. | |
| 2007/0229458 A1 | 10/2007 | Moon | |
| 2007/0236475 A1 | 10/2007 | Wherry | |
| 2007/0236479 A1 | 10/2007 | Wang et al. | |
| 2007/0237493 A1 | 10/2007 | Hall et al. | |
| 2007/0239837 A1 | 10/2007 | Jablokov et al. | |
| 2007/0242569 A1 | 10/2007 | Inoue et al. | |
| 2007/0247435 A1 | 10/2007 | Benko et al. | |
| 2007/0279401 A1 | 12/2007 | Ramstein et al. | |
| 2007/0290045 A1 | 12/2007 | Cisar | |
| 2007/0291018 A1 | 12/2007 | Park et al. | |
| 2007/0296711 A1 | 12/2007 | Yee et al. | |
| 2008/0001915 A1 | 1/2008 | Pihlaja et al. | |
| 2008/0004084 A1 | 1/2008 | Park et al. | |
| 2008/0020810 A1 | 1/2008 | Park | |
| 2008/0040692 A1 | 2/2008 | Sunday et al. | |
| 2008/0043028 A1 | 2/2008 | Tanaka | |
| 2008/0052945 A1 | 3/2008 | Matas et al. | |
| 2008/0062127 A1 | 3/2008 | Brodersen et al. | |
| 2008/0062141 A1 | 3/2008 | Chandhri | |
| 2008/0066135 A1 | 3/2008 | Brodersen et al. | |
| 2008/0123473 A1 | 5/2008 | Ozawa et al. | |
| 2008/0125196 A1* | 5/2008 | Ryu | G06F 3/0362 455/575.3 |
| 2008/0129520 A1 | 6/2008 | Lee | |
| 2008/0148177 A1 | 6/2008 | Lang et al. | |
| 2008/0150901 A1 | 6/2008 | Lowles et al. | |
| 2008/0155461 A1 | 6/2008 | Ozaki et al. | |
| 2008/0155475 A1 | 6/2008 | Duhig et al. | |
| 2008/0158149 A1 | 7/2008 | Levin | |
| 2008/0163116 A1 | 7/2008 | Lee et al. | |
| 2008/0163119 A1 | 7/2008 | Kim et al. | |
| 2008/0163121 A1 | 7/2008 | Lee et al. | |
| 2008/0165124 A1* | 7/2008 | Kim | G06F 3/0362 345/156 |
| 2008/0165140 A1 | 7/2008 | Christie et al. | |
| 2008/0165144 A1 | 7/2008 | Forstall et al. | |
| 2008/0165152 A1 | 7/2008 | Forstall et al. | |
| 2008/0165153 A1 | 7/2008 | Platzer et al. | |
| 2008/0168349 A1 | 7/2008 | Lamiraux et al. | |
| 2008/0168382 A1 | 7/2008 | Louch et al. | |
| 2008/0168384 A1 | 7/2008 | Platzer et al. | |
| 2008/0168404 A1 | 7/2008 | Ording | |
| 2008/0172634 A1 | 7/2008 | Choi et al. | |
| 2008/0174570 A1 | 7/2008 | Jobs et al. | |
| 2008/0186808 A1 | 8/2008 | Lee | |
| 2008/0204478 A1 | 8/2008 | Hung | |
| 2008/0207281 A1 | 8/2008 | Tsuchiya et al. | |
| 2008/0216001 A1 | 9/2008 | Ording et al. | |
| 2008/0224995 A1* | 9/2008 | Perkunder | G06F 3/0362 345/157 |
| 2008/0225014 A1 | 9/2008 | Kim | |
| 2008/0257701 A1 | 10/2008 | Wlotzka et al. | |
| 2008/0279475 A1 | 11/2008 | Lee et al. | |
| 2008/0288880 A1 | 11/2008 | Reponen et al. | |
| 2008/0318635 A1 | 12/2008 | Yoon et al. | |
| 2008/0320391 A1 | 12/2008 | Lemay et al. | |
| 2009/0002335 A1 | 1/2009 | Chaudhri | |
| 2009/0007019 A1 | 1/2009 | Kobayashi et al. | |
| 2009/0015550 A1 | 1/2009 | Koski et al. | |
| 2009/0030800 A1 | 1/2009 | Grois | |
| 2009/0046110 A1 | 2/2009 | Sadler et al. | |
| 2009/0050465 A1 | 2/2009 | Asada et al. | |
| 2009/0051649 A1 | 2/2009 | Rondel et al. | |
| 2009/0059730 A1 | 3/2009 | Lyons et al. | |
| 2009/0064031 A1 | 3/2009 | Bull et al. | |
| 2009/0070705 A1 | 3/2009 | Ording | |
| 2009/0070711 A1 | 3/2009 | Kwak et al. | |
| 2009/0079698 A1 | 3/2009 | Takashima et al. | |
| 2009/0098912 A1 | 4/2009 | Kim et al. | |
| 2009/0100373 A1 | 4/2009 | Pixley et al. | |
| 2009/0109069 A1 | 4/2009 | Takasaki et al. | |
| 2009/0119678 A1 | 5/2009 | Shih et al. | |
| 2009/0125811 A1 | 5/2009 | Bethurum | |
| 2009/0143117 A1 | 6/2009 | Shin et al. | |
| 2009/0144642 A1 | 6/2009 | Crystal | |
| 2009/0152452 A1 | 6/2009 | Lee et al. | |
| 2009/0156255 A1 | 6/2009 | Shin et al. | |
| 2009/0177966 A1 | 7/2009 | Chaudhri | |
| 2009/0193359 A1 | 7/2009 | Anthony et al. | |

(56) References Cited

U.S. PATENT DOCUMENTS

| | | |
|---|---|---|
| 2009/0196124 A1 | 8/2009 | Mooring et al. |
| 2009/0199130 A1 | 8/2009 | Tsern et al. |
| 2009/0204920 A1 | 8/2009 | Beverley et al. |
| 2009/0204929 A1 | 8/2009 | Baumann et al. |
| 2009/0231271 A1 | 9/2009 | Heubel et al. |
| 2009/0241150 A1 | 9/2009 | White et al. |
| 2009/0288039 A1 | 11/2009 | Mail et al. |
| 2009/0289905 A1 | 11/2009 | Ahn |
| 2009/0315867 A1 | 12/2009 | Sakamoto et al. |
| 2009/0325563 A1 | 12/2009 | Horodezky et al. |
| 2010/0001967 A1 | 1/2010 | Yoo |
| 2010/0004031 A1 | 1/2010 | Kim |
| 2010/0004033 A1 | 1/2010 | Choe et al. |
| 2010/0026640 A1 | 2/2010 | Kim et al. |
| 2010/0029327 A1 | 2/2010 | Jee |
| 2010/0030549 A1 | 2/2010 | Lee et al. |
| 2010/0058223 A1 | 3/2010 | Price et al. |
| 2010/0058226 A1 | 3/2010 | Flake et al. |
| 2010/0058240 A1 | 3/2010 | Bull et al. |
| 2010/0060664 A1 | 3/2010 | Kilpatrick, II et al. |
| 2010/0070926 A1 | 3/2010 | Abanami et al. |
| 2010/0073692 A1 | 3/2010 | Waltman et al. |
| 2010/0079500 A1 | 4/2010 | Osullivan et al. |
| 2010/0080379 A1 | 4/2010 | Chen et al. |
| 2010/0088634 A1 | 4/2010 | Tsuruta et al. |
| 2010/0093400 A1 | 4/2010 | Ju et al. |
| 2010/0110044 A1 | 5/2010 | Englund |
| 2010/0113101 A1* | 5/2010 | Tanada ............... G06F 3/03547 455/566 |
| 2010/0128570 A1 | 5/2010 | Smith et al. |
| 2010/0130125 A1 | 5/2010 | Nurmi |
| 2010/0131904 A1 | 5/2010 | Fong et al. |
| 2010/0141609 A1 | 6/2010 | Frisbee |
| 2010/0146387 A1 | 6/2010 | Hoover |
| 2010/0148945 A1 | 6/2010 | Yun et al. |
| 2010/0164908 A1* | 7/2010 | Hill ..................... G06F 3/0362 345/184 |
| 2010/0169097 A1 | 7/2010 | Nachman et al. |
| 2010/0173678 A1 | 7/2010 | Kim et al. |
| 2010/0187074 A1 | 7/2010 | Manni |
| 2010/0188268 A1* | 7/2010 | Grignani ............ G06F 3/03547 341/22 |
| 2010/0199232 A1 | 8/2010 | Mistry et al. |
| 2010/0211498 A1 | 8/2010 | Aabye et al. |
| 2010/0211919 A1 | 8/2010 | Brown et al. |
| 2010/0214243 A1 | 8/2010 | Birnbaum et al. |
| 2010/0220562 A1 | 9/2010 | Hozumi et al. |
| 2010/0223055 A1 | 9/2010 | Mclean |
| 2010/0235742 A1 | 9/2010 | Hsu et al. |
| 2010/0248778 A1 | 9/2010 | Biswas |
| 2010/0259481 A1 | 10/2010 | Oh et al. |
| 2010/0267424 A1 | 10/2010 | Kim et al. |
| 2010/0269038 A1 | 10/2010 | Tsuda |
| 2010/0271340 A1 | 10/2010 | Nagashima et al. |
| 2010/0271342 A1 | 10/2010 | Nagashima et al. |
| 2010/0271343 A1 | 10/2010 | Nagashima et al. |
| 2010/0271401 A1 | 10/2010 | Fong |
| 2010/0277126 A1 | 11/2010 | Naeimi et al. |
| 2010/0283743 A1 | 11/2010 | Coddington |
| 2010/0302278 A1 | 12/2010 | Shaffer et al. |
| 2010/0315417 A1 | 12/2010 | Cho et al. |
| 2010/0317332 A1 | 12/2010 | Bathiche et al. |
| 2010/0323762 A1 | 12/2010 | Sindhu |
| 2010/0325575 A1 | 12/2010 | Platzer et al. |
| 2010/0331145 A1 | 12/2010 | Lakovic et al. |
| 2011/0006980 A1 | 1/2011 | Taniguchi et al. |
| 2011/0014956 A1 | 1/2011 | Lee et al. |
| 2011/0022472 A1 | 1/2011 | Zon et al. |
| 2011/0025311 A1 | 2/2011 | Chauvin et al. |
| 2011/0025624 A1 | 2/2011 | Goto |
| 2011/0047491 A1 | 2/2011 | Hwang et al. |
| 2011/0055752 A1 | 3/2011 | Rubinstein et al. |
| 2011/0057877 A1* | 3/2011 | Nagashima ........... G06F 3/0362 345/157 |
| 2011/0057886 A1 | 3/2011 | Ng et al. |
| 2011/0072345 A1 | 3/2011 | Lim |
| 2011/0074719 A1 | 3/2011 | Yeh et al. |
| 2011/0074828 A1 | 3/2011 | Capela et al. |
| 2011/0086613 A1 | 4/2011 | Doudkine et al. |
| 2011/0087963 A1 | 4/2011 | Brisebois et al. |
| 2011/0090255 A1 | 4/2011 | Wilson et al. |
| 2011/0093812 A1 | 4/2011 | Fong |
| 2011/0095993 A1 | 4/2011 | Zuverink |
| 2011/0099509 A1 | 4/2011 | Horagai et al. |
| 2011/0102455 A1 | 5/2011 | Temple |
| 2011/0119578 A1 | 5/2011 | Schwartz |
| 2011/0126155 A1 | 5/2011 | Krishnaraj et al. |
| 2011/0128226 A1* | 6/2011 | Jensen ................. G06F 3/0485 345/163 |
| 2011/0131494 A1 | 6/2011 | Ono et al. |
| 2011/0131531 A1 | 6/2011 | Russell et al. |
| 2011/0157046 A1 | 6/2011 | Lee et al. |
| 2011/0164042 A1 | 7/2011 | Chaudhri |
| 2011/0167262 A1 | 7/2011 | Ross et al. |
| 2011/0167382 A1 | 7/2011 | van Os |
| 2011/0187355 A1 | 8/2011 | Dixon et al. |
| 2011/0199342 A1 | 8/2011 | Vartanian et al. |
| 2011/0202834 A1 | 8/2011 | Mandryk et al. |
| 2011/0202859 A1 | 8/2011 | Fong |
| 2011/0202866 A1 | 8/2011 | Huang et al. |
| 2011/0224967 A1 | 9/2011 | Van |
| 2011/0225543 A1 | 9/2011 | Arnold et al. |
| 2011/0248948 A1 | 10/2011 | Griffin et al. |
| 2011/0252357 A1 | 10/2011 | Chaudhri |
| 2011/0252362 A1 | 10/2011 | Cho et al. |
| 2011/0252369 A1 | 10/2011 | Chaudhri |
| 2011/0271183 A1 | 11/2011 | Bose et al. |
| 2011/0271233 A1 | 11/2011 | Radakovitz et al. |
| 2011/0279384 A1 | 11/2011 | Miller et al. |
| 2011/0296312 A1 | 12/2011 | Boyer et al. |
| 2011/0298830 A1 | 12/2011 | Lam |
| 2011/0302493 A1 | 12/2011 | Runstedler et al. |
| 2011/0302513 A1 | 12/2011 | Ademar et al. |
| 2011/0307842 A1 | 12/2011 | Chiang et al. |
| 2011/0316888 A1 | 12/2011 | Sachs et al. |
| 2012/0011437 A1 | 1/2012 | James et al. |
| 2012/0026198 A1 | 2/2012 | Maesaka |
| 2012/0030627 A1 | 2/2012 | Nurmi et al. |
| 2012/0032988 A1 | 2/2012 | Katayama et al. |
| 2012/0038582 A1 | 2/2012 | Grant |
| 2012/0044267 A1 | 2/2012 | Fino et al. |
| 2012/0050185 A1 | 3/2012 | Davydov et al. |
| 2012/0054670 A1 | 3/2012 | Rainisto |
| 2012/0056848 A1 | 3/2012 | Yamano et al. |
| 2012/0062398 A1* | 3/2012 | Durand ............... G06F 3/0362 341/35 |
| 2012/0066638 A1 | 3/2012 | Ohri et al. |
| 2012/0068925 A1 | 3/2012 | Wong et al. |
| 2012/0083260 A1 | 4/2012 | Arriola et al. |
| 2012/0089951 A1 | 4/2012 | Cassidy |
| 2012/0092383 A1 | 4/2012 | Hysek et al. |
| 2012/0099406 A1 | 4/2012 | Lau et al. |
| 2012/0105484 A1 | 5/2012 | Cui |
| 2012/0127071 A1 | 5/2012 | Jitkoff et al. |
| 2012/0131504 A1 | 5/2012 | Fadell et al. |
| 2012/0147052 A1 | 6/2012 | Homma et al. |
| 2012/0155223 A1 | 6/2012 | Hoover |
| 2012/0157789 A1 | 6/2012 | Kangas et al. |
| 2012/0159380 A1 | 6/2012 | Kocienda et al. |
| 2012/0162261 A1 | 6/2012 | Kim et al. |
| 2012/0162350 A1 | 6/2012 | Lee et al. |
| 2012/0169776 A1 | 7/2012 | Rissa et al. |
| 2012/0174005 A1 | 7/2012 | Deutsch et al. |
| 2012/0179998 A1 | 7/2012 | Nesladek et al. |
| 2012/0186951 A1 | 7/2012 | Wu et al. |
| 2012/0192110 A1 | 7/2012 | Wu et al. |
| 2012/0197743 A1 | 8/2012 | Grigg et al. |
| 2012/0221241 A1 | 8/2012 | Nurmi |
| 2012/0226977 A1 | 9/2012 | Lengeling et al. |
| 2012/0236037 A1 | 9/2012 | Lessing et al. |
| 2012/0256863 A1 | 10/2012 | Zhang et al. |
| 2012/0272145 A1 | 10/2012 | Ryan et al. |
| 2012/0272181 A1 | 10/2012 | Rogers et al. |
| 2012/0278725 A1 | 11/2012 | Gordon et al. |

(56) References Cited

U.S. PATENT DOCUMENTS

| | | |
|---|---|---|
| 2012/0289290 A1 | 11/2012 | Chae et al. |
| 2012/0290472 A1 | 11/2012 | Mullen et al. |
| 2012/0304113 A1 | 11/2012 | Patten et al. |
| 2012/0306765 A1 | 12/2012 | Moore et al. |
| 2012/0311055 A1 | 12/2012 | Adams et al. |
| 2012/0324390 A1 | 12/2012 | Tao et al. |
| 2012/0327006 A1 | 12/2012 | Israr et al. |
| 2013/0019182 A1 | 1/2013 | Gil et al. |
| 2013/0021362 A1 | 1/2013 | Sakurada et al. |
| 2013/0024780 A1 | 1/2013 | Sutedja et al. |
| 2013/0024811 A1 | 1/2013 | Gleadall et al. |
| 2013/0027412 A1* | 1/2013 | Roddy ............... G04G 15/006 345/501 |
| 2013/0038636 A1 | 2/2013 | Fujiwaka |
| 2013/0055160 A1 | 2/2013 | Yamada et al. |
| 2013/0067390 A1 | 3/2013 | Kwiatkowski et al. |
| 2013/0073932 A1 | 3/2013 | Migos et al. |
| 2013/0097526 A1 | 4/2013 | Stovicek et al. |
| 2013/0097566 A1 | 4/2013 | Berglund |
| 2013/0111342 A1 | 5/2013 | Alameh et al. |
| 2013/0111384 A1 | 5/2013 | Kim et al. |
| 2013/0111407 A1 | 5/2013 | Mullen |
| 2013/0117689 A1 | 5/2013 | Lessing et al. |
| 2013/0117698 A1 | 5/2013 | Park et al. |
| 2013/0132883 A1 | 5/2013 | Vayrynen |
| 2013/0135228 A1 | 5/2013 | Won et al. |
| 2013/0135234 A1 | 5/2013 | Hisano et al. |
| 2013/0135236 A1 | 5/2013 | Yano |
| 2013/0139102 A1 | 5/2013 | Miura et al. |
| 2013/0141342 A1 | 6/2013 | Bokma et al. |
| 2013/0142016 A1 | 6/2013 | Pozzo Di Borgo et al. |
| 2013/0145292 A1 | 6/2013 | Cohen et al. |
| 2013/0145316 A1 | 6/2013 | Heo |
| 2013/0147747 A1 | 6/2013 | Takagi |
| 2013/0154933 A1 | 6/2013 | Sheik-nainar |
| 2013/0169579 A1 | 7/2013 | Havnor |
| 2013/0176020 A1 | 7/2013 | Chauvin et al. |
| 2013/0205939 A1 | 8/2013 | Meerovitsch et al. |
| 2013/0208013 A1 | 8/2013 | Yuu et al. |
| 2013/0218517 A1 | 8/2013 | Ausserlechner et al. |
| 2013/0222301 A1 | 8/2013 | Lee et al. |
| 2013/0226444 A1 | 8/2013 | Johansson et al. |
| 2013/0258819 A1* | 10/2013 | Hoover ............... G04C 3/146 368/184 |
| 2013/0262564 A1 | 10/2013 | Wall et al. |
| 2013/0275899 A1 | 10/2013 | Schubert et al. |
| 2013/0282360 A1 | 10/2013 | Shimota et al. |
| 2013/0282459 A1 | 10/2013 | Smets et al. |
| 2013/0290116 A1* | 10/2013 | Hepworth ............ G06F 3/0482 705/14.73 |
| 2013/0303087 A1 | 11/2013 | Hauser et al. |
| 2013/0305187 A1 | 11/2013 | Phillips et al. |
| 2013/0324093 A1 | 12/2013 | Santamaria et al. |
| 2013/0328786 A1 | 12/2013 | Hinckley |
| 2013/0339343 A1 | 12/2013 | Hierons et al. |
| 2013/0339345 A1 | 12/2013 | Soto Matamala et al. |
| 2013/0342457 A1 | 12/2013 | Cox et al. |
| 2014/0028554 A1 | 1/2014 | De Los Reyes et al. |
| 2014/0028688 A1 | 1/2014 | Houjou et al. |
| 2014/0028735 A1 | 1/2014 | Williams et al. |
| 2014/0040742 A1 | 2/2014 | Park et al. |
| 2014/0075311 A1 | 3/2014 | Boettcher et al. |
| 2014/0075368 A1 | 3/2014 | Kim et al. |
| 2014/0092037 A1 | 4/2014 | Kim |
| 2014/0105278 A1 | 4/2014 | Bivolarsky |
| 2014/0106734 A1 | 4/2014 | Lee |
| 2014/0132640 A1 | 5/2014 | Sharma et al. |
| 2014/0136443 A1 | 5/2014 | Kinsey et al. |
| 2014/0136981 A1 | 5/2014 | Xiang et al. |
| 2014/0137020 A1 | 5/2014 | Sharma et al. |
| 2014/0139422 A1 | 5/2014 | Mistry et al. |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0157160 A1 | 6/2014 | Cudak et al. |
| 2014/0160078 A1 | 6/2014 | Seo et al. |
| 2014/0204229 A1 | 7/2014 | Leung et al. |
| 2014/0215340 A1 | 7/2014 | Shetty et al. |
| 2014/0222916 A1 | 8/2014 | Foley et al. |
| 2014/0237382 A1 | 8/2014 | Grandhi |
| 2014/0253487 A1 | 9/2014 | Bezinge et al. |
| 2014/0258935 A1 | 9/2014 | Nishida et al. |
| 2014/0260776 A1 | 9/2014 | Burleson et al. |
| 2014/0282005 A1 | 9/2014 | Gutowitz |
| 2014/0282142 A1 | 9/2014 | Lin |
| 2014/0282214 A1 | 9/2014 | Shirzadi et al. |
| 2014/0292668 A1 | 10/2014 | Fricklas et al. |
| 2014/0298233 A1 | 10/2014 | Pettey et al. |
| 2014/0306989 A1 | 10/2014 | Doubleday et al. |
| 2014/0328147 A1 | 11/2014 | Yang et al. |
| 2014/0330435 A1 | 11/2014 | Stoner et al. |
| 2014/0333670 A1 | 11/2014 | Balivada et al. |
| 2014/0347289 A1 | 11/2014 | Lee et al. |
| 2014/0362024 A1 | 12/2014 | Hicks |
| 2014/0372115 A1 | 12/2014 | LeBeau et al. |
| 2015/0007048 A1 | 1/2015 | Dumans |
| 2015/0036555 A1 | 2/2015 | Shin et al. |
| 2015/0046871 A1 | 2/2015 | Lewis |
| 2015/0049591 A1 | 2/2015 | Adams et al. |
| 2015/0058744 A1 | 2/2015 | Dhingra et al. |
| 2015/0065821 A1 | 3/2015 | Conrad |
| 2015/0067497 A1 | 3/2015 | Cieplinski et al. |
| 2015/0074615 A1 | 3/2015 | Han et al. |
| 2015/0077398 A1 | 3/2015 | Stokes et al. |
| 2015/0085621 A1 | 3/2015 | Hong et al. |
| 2015/0121224 A1 | 4/2015 | Krasnahill, Jr. |
| 2015/0121311 A1 | 4/2015 | Lou et al. |
| 2015/0149899 A1 | 5/2015 | Bernstein et al. |
| 2015/0149956 A1 | 5/2015 | Kempinski et al. |
| 2015/0160856 A1 | 6/2015 | Jang et al. |
| 2015/0178041 A1 | 6/2015 | Uskoreit |
| 2015/0199012 A1 | 7/2015 | Palmer |
| 2015/0199110 A1 | 7/2015 | Nakazato |
| 2015/0205476 A1 | 7/2015 | Kuscher et al. |
| 2015/0234518 A1 | 8/2015 | Teller et al. |
| 2015/0234562 A1 | 8/2015 | Ording |
| 2015/0261310 A1* | 9/2015 | Walmsley ............ G06F 3/04883 345/173 |
| 2015/0269944 A1 | 9/2015 | Wang |
| 2015/0277559 A1 | 10/2015 | Vescovi et al. |
| 2015/0302301 A1 | 10/2015 | Petersen |
| 2015/0370425 A1 | 12/2015 | Chen et al. |
| 2015/0370529 A1 | 12/2015 | Zambetti et al. |
| 2015/0378447 A1 | 12/2015 | Nagano et al. |
| 2015/0378555 A1 | 12/2015 | Ramanathan et al. |
| 2016/0011758 A1 | 1/2016 | Meggs et al. |
| 2016/0028875 A1 | 1/2016 | Brown et al. |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034153 A1 | 2/2016 | Lejeune et al. |
| 2016/0034166 A1 | 2/2016 | Kocienda et al. |
| 2016/0034167 A1 | 2/2016 | Wilson et al. |
| 2016/0054710 A1 | 2/2016 | Kim et al. |
| 2016/0062466 A1 | 3/2016 | Verweij et al. |
| 2016/0062487 A1 | 3/2016 | Foss et al. |
| 2016/0062567 A1 | 3/2016 | Yang et al. |
| 2016/0062571 A1 | 3/2016 | Dascola et al. |
| 2016/0062573 A1 | 3/2016 | Dascola et al. |
| 2016/0062608 A1 | 3/2016 | Foss et al. |
| 2016/0063828 A1 | 3/2016 | Verweij et al. |
| 2016/0063850 A1 | 3/2016 | Yang et al. |
| 2016/0065509 A1 | 3/2016 | Butcher et al. |
| 2016/0065525 A1 | 3/2016 | Dye et al. |
| 2016/0071241 A1 | 3/2016 | Karunamuni et al. |
| 2016/0098016 A1 | 4/2016 | Shedletsky et al. |
| 2016/0162164 A1 | 6/2016 | Phillips et al. |
| 2016/0170436 A1 | 6/2016 | Farrar et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0170625 A1 | 6/2016 | Zambetti et al. |
| 2016/0180820 A1* | 6/2016 | Pascucci ............... G09G 5/34 345/684 |

(56) References Cited

U.S. PATENT DOCUMENTS

| | | |
|---|---|---|
| 2016/0198319 A1 | 7/2016 | Huang et al. |
| 2016/0202866 A1 | 7/2016 | Zambetti |
| 2016/0209939 A1 | 7/2016 | Zambetti et al. |
| 2016/0231883 A1 | 8/2016 | Zambetti et al. |
| 2016/0259499 A1 | 9/2016 | Kocienda et al. |
| 2016/0259530 A1 | 9/2016 | Everitt et al. |
| 2016/0259535 A1 | 9/2016 | Seymour et al. |
| 2016/0269540 A1 | 9/2016 | Butcher et al. |
| 2016/0327911 A1 | 11/2016 | Eim et al. |
| 2017/0010678 A1 | 1/2017 | Tuli |
| 2017/0010751 A1 | 1/2017 | Shedletsky et al. |
| 2017/0045958 A1* | 2/2017 | Battlogg ............... G06F 3/0487 |
| 2017/0053542 A1 | 2/2017 | Wilson et al. |
| 2017/0089735 A1 | 3/2017 | Ruh |
| 2017/0104902 A1 | 4/2017 | Kim et al. |
| 2017/0208466 A1 | 7/2017 | Seo et al. |
| 2017/0269692 A1 | 9/2017 | Eck et al. |
| 2017/0315716 A1 | 11/2017 | Zambetti et al. |
| 2017/0357427 A1 | 12/2017 | Wilson et al. |
| 2017/0358181 A1 | 12/2017 | Moussette et al. |
| 2018/0024683 A1 | 1/2018 | Ely et al. |
| 2018/0067557 A1 | 3/2018 | Robert et al. |
| 2018/0074690 A1 | 3/2018 | Zambetti et al. |
| 2018/0081453 A1 | 3/2018 | Ely |
| 2018/0088532 A1 | 3/2018 | Ely et al. |
| 2018/0088797 A1 | 3/2018 | Mcatee et al. |
| 2018/0210516 A1 | 7/2018 | Zambetti et al. |
| 2018/0307363 A1 | 10/2018 | Ely et al. |
| 2018/0329587 A1 | 11/2018 | Ko et al. |
| 2018/0335891 A1 | 11/2018 | Shedletsky et al. |
| 2018/0335901 A1 | 11/2018 | Manzari et al. |
| 2018/0336866 A1 | 11/2018 | Triverio et al. |
| 2018/0341344 A1 | 11/2018 | Foss et al. |
| 2018/0367489 A1 | 12/2018 | Dye et al. |
| 2019/0033862 A1 | 1/2019 | Groden et al. |
| 2019/0050055 A1 | 2/2019 | Chaudhri et al. |
| 2019/0056700 A1 | 2/2019 | Matsuno et al. |
| 2019/0072912 A1 | 3/2019 | Pandya et al. |
| 2019/0080066 A1 | 3/2019 | Van Os et al. |
| 2019/0080072 A1 | 3/2019 | Van Os et al. |
| 2019/0101870 A1 | 4/2019 | Pandya et al. |
| 2019/0163324 A1 | 5/2019 | Shedletsky et al. |
| 2019/0163329 A1 | 5/2019 | Yang et al. |
| 2019/0243471 A1 | 8/2019 | Foss et al. |
| 2019/0272036 A1 | 9/2019 | Grant et al. |
| 2019/0274565 A1 | 9/2019 | Soli et al. |
| 2019/0279520 A1 | 9/2019 | Wilson et al. |
| 2019/0354268 A1 | 11/2019 | Everitt et al. |
| 2020/0081538 A1 | 3/2020 | Moussette et al. |
| 2020/0081539 A1 | 3/2020 | Moussette et al. |
| 2020/0110522 A1 | 4/2020 | Zambetti et al. |
| 2020/0145361 A1 | 5/2020 | Dye et al. |
| 2020/0167047 A1 | 5/2020 | Dascola et al. |
| 2020/0272287 A1 | 8/2020 | Yang et al. |
| 2020/0272293 A1 | 8/2020 | Zambetti et al. |
| 2020/0341553 A1 | 10/2020 | Moussette et al. |

FOREIGN PATENT DOCUMENTS

| | | |
|---|---|---|
| AU | 2016231505 A1 | 10/2016 |
| AU | 2018100429 A4 | 5/2018 |
| AU | 2018100429 B4 | 8/2018 |
| CN | 1263425 A | 8/2000 |
| CN | 1330310 A | 1/2002 |
| CN | 1341889 A | 3/2002 |
| CN | 1398366 A | 2/2003 |
| CN | 1549998 A | 11/2004 |
| CN | 1650251 A | 8/2005 |
| CN | 1757011 A | 4/2006 |
| CN | 1797295 A | 7/2006 |
| CN | 1811899 A | 8/2006 |
| CN | 101042300 A | 9/2007 |
| CN | 101059730 A | 10/2007 |
| CN | 101101595 A | 1/2008 |
| CN | 101431545 A | 5/2009 |
| CN | 101446802 A | 6/2009 |
| CN | 101625620 A | 1/2010 |
| CN | 101876877 A | 11/2010 |
| CN | 101893992 A | 11/2010 |
| CN | 101976171 A | 2/2011 |
| CN | 101241407 B | 7/2011 |
| CN | 102402328 A | 4/2012 |
| CN | 102508707 A | 6/2012 |
| CN | 102591579 A | 7/2012 |
| CN | 102612679 A | 7/2012 |
| CN | 102750066 A | 10/2012 |
| CN | 102859482 A | 1/2013 |
| CN | 102902453 A | 1/2013 |
| CN | 102902454 A | 1/2013 |
| CN | 102905181 A | 1/2013 |
| CN | 101034328 B | 2/2013 |
| CN | 102981770 A | 3/2013 |
| CN | 103069378 A | 4/2013 |
| CN | 103154878 A | 6/2013 |
| CN | 103270486 A | 8/2013 |
| CN | 103460164 A | 12/2013 |
| CN | 103703437 A | 4/2014 |
| CN | 103782252 A | 5/2014 |
| CN | 103793138 A | 5/2014 |
| CN | 103858088 A | 6/2014 |
| CN | 103870255 A | 6/2014 |
| CN | 103914261 A | 7/2014 |
| CN | 103970413 A | 8/2014 |
| CN | 104166458 A | 11/2014 |
| CN | 105955591 A | 9/2016 |
| CN | 107710135 A | 2/2018 |
| CN | 107797657 A | 3/2018 |
| CN | 108139863 A | 6/2018 |
| CN | 108304106 A | 7/2018 |
| CN | 108334190 A | 7/2018 |
| CN | 108369455 A | 8/2018 |
| EP | 1052566 A1 | 11/2000 |
| EP | 1168149 A2 | 1/2002 |
| EP | 1406158 A2 | 4/2004 |
| EP | 1486860 A1 | 12/2004 |
| EP | 1505484 A1 | 2/2005 |
| EP | 1847920 A2 | 10/2007 |
| EP | 1850213 A2 | 10/2007 |
| EP | 1942401 A1 | 7/2008 |
| EP | 1944677 A2 | 7/2008 |
| EP | 1956433 A1 | 8/2008 |
| EP | 1956446 A2 | 8/2008 |
| EP | 2124131 A2 | 11/2009 |
| EP | 2207084 A2 | 7/2010 |
| EP | 2224317 A1 | 9/2010 |
| EP | 2237140 A2 | 10/2010 |
| EP | 2302492 A2 | 3/2011 |
| EP | 2385451 A1 | 11/2011 |
| EP | 2551784 A1 | 1/2013 |
| EP | 2610738 A2 | 7/2013 |
| EP | 2733579 A2 | 5/2014 |
| EP | 2733598 A2 | 5/2014 |
| EP | 2741176 A2 | 6/2014 |
| EP | 3401770 A1 | 11/2018 |
| GB | 2392773 A | 3/2004 |
| GB | 2489580 A | 10/2012 |
| JP | 55-80084 A | 6/1980 |
| JP | 5-88812 A | 4/1993 |
| JP | 6-348408 A | 12/1994 |
| JP | 7-152478 A | 6/1995 |
| JP | 11-110106 A | 4/1999 |
| JP | 2000-503153 A | 3/2000 |
| JP | 2000-305760 A | 11/2000 |
| JP | 2001-100905 A | 4/2001 |
| JP | 2001-202178 A | 7/2001 |
| JP | 2001-202181 A | 7/2001 |
| JP | 2002-288690 A | 10/2002 |
| JP | 2003-248544 A | 9/2003 |
| JP | 2003-330586 A | 11/2003 |
| JP | 2003-330856 A | 11/2003 |
| JP | 2004-21522 A | 1/2004 |
| JP | 2004-184396 A | 7/2004 |
| JP | 2004-259063 A | 9/2004 |
| JP | 2005-004891 A | 1/2005 |

(56) References Cited

FOREIGN PATENT DOCUMENTS

| | | |
|---|---|---|
| JP | 20051-96077 A | 7/2005 |
| JP | 2006-11690 A | 1/2006 |
| JP | 2006-140990 A | 6/2006 |
| JP | 2006-185273 A | 7/2006 |
| JP | 2007-512635 A | 5/2007 |
| JP | 2007-170995 A | 7/2007 |
| JP | 2007-179544 A | 7/2007 |
| JP | 2008-97057 A | 4/2008 |
| JP | 2008-518539 A | 5/2008 |
| JP | 2008-157974 A | 7/2008 |
| JP | 2008-539513 A | 11/2008 |
| JP | 2009-59382 A | 3/2009 |
| JP | 2009-510404 A | 3/2009 |
| JP | 2009-128296 A | 6/2009 |
| JP | 2009-246553 A | 10/2009 |
| JP | 2009-265793 A | 11/2009 |
| JP | 2009-294526 A | 12/2009 |
| JP | 2010-515978 A | 5/2010 |
| JP | 2010-257051 A | 11/2010 |
| JP | 2011-8540 A | 1/2011 |
| JP | 2011-90640 A | 5/2011 |
| JP | 2011-96043 A | 5/2011 |
| JP | 2011-530738 A | 12/2011 |
| JP | 2012-27797 A | 2/2012 |
| JP | 2012-58979 A | 3/2012 |
| JP | 2012-155698 A | 8/2012 |
| JP | 2012-252384 A | 12/2012 |
| JP | 2013-114844 A | 6/2013 |
| JP | 2013-122738 A | 6/2013 |
| JP | 2013-137750 A | 7/2013 |
| JP | 2013-164700 A | 8/2013 |
| JP | 2014-42164 A | 3/2014 |
| JP | 2016-538653 A | 12/2016 |
| KR | 10-2004-0107472 A | 12/2004 |
| KR | 10-0630154 B1 | 9/2006 |
| KR | 10-2007-0024702 A | 3/2007 |
| KR | 10-2008-0095085 A | 10/2008 |
| KR | 10-2010-0003589 A | 1/2010 |
| KR | 10-2010-0109277 A | 10/2010 |
| KR | 10-2011-0093090 A | 8/2011 |
| KR | 10-2011-0114294 A | 10/2011 |
| KR | 20110114294 A | 10/2011 |
| KR | 10-2012-0071468 A | 7/2012 |
| KR | 10-2012-0079707 A | 7/2012 |
| KR | 10-2013-0027017 A | 3/2013 |
| TW | I269202 B | 12/2006 |
| TW | D122820 S | 5/2008 |
| TW | 200843452 A | 11/2008 |
| TW | 201119339 A | 6/2011 |
| TW | I349212 B | 9/2011 |
| TW | I381305 B | 1/2013 |
| TW | I384394 B1 | 2/2013 |
| TW | I394410 B1 | 4/2013 |
| TW | I395498 B | 5/2013 |
| TW | I405106 B | 8/2013 |
| TW | 201403363 A | 1/2014 |
| TW | I426416 B | 2/2014 |
| TW | 201421340 A | 6/2014 |
| TW | I443547 B | 7/2014 |
| WO | 93/08517 A1 | 4/1993 |
| WO | 96/19872 A1 | 6/1996 |
| WO | 01/69369 A1 | 9/2001 |
| WO | 3021568 A1 | 3/2003 |
| WO | 2005/055034 A1 | 6/2005 |
| WO | 2006/037545 A2 | 4/2006 |
| WO | 2006/042309 A1 | 4/2006 |
| WO | 2008/033853 A2 | 3/2008 |
| WO | 2008/085742 A2 | 7/2008 |
| WO | 2008/086218 A2 | 7/2008 |
| WO | 2008/106777 A1 | 9/2008 |
| WO | 2009/026508 A1 | 2/2009 |
| WO | 2009/084368 A1 | 7/2009 |
| WO | 2009/085378 A1 | 7/2009 |
| WO | 2009/097592 A1 | 8/2009 |
| WO | 2010/024969 A1 | 3/2010 |
| WO | 2010/150768 A1 | 12/2010 |
| WO | 2011/126502 A1 | 10/2011 |
| WO | 2012/006494 A1 | 1/2012 |
| WO | 2012/080020 A1 | 6/2012 |
| WO | 2013/105664 A1 | 7/2013 |
| WO | 2013/114844 A1 | 8/2013 |
| WO | 2013/133901 A2 | 9/2013 |
| WO | 2013/169842 A2 | 11/2013 |
| WO | 2013/169846 A1 | 11/2013 |
| WO | 2013/169849 A2 | 11/2013 |
| WO | 2013/169875 A2 | 11/2013 |
| WO | 2014/105276 A1 | 7/2014 |
| WO | 2015/034969 A2 | 3/2015 |
| WO | 2016/144385 A1 | 9/2016 |
| WO | 2016/144563 A1 | 9/2016 |
| WO | 2016/144696 A2 | 9/2016 |
| WO | 2017/027625 A2 | 2/2017 |
| WO | 2018/048518 A1 | 3/2018 |
| WO | 2018/048632 A1 | 3/2018 |

OTHER PUBLICATIONS

Notice of Allowance received for U.S. Appl. No. 14/641,308, dated Jan. 15, 2020, 7 pages.
Office Action received for Chinese Patent Application No. 201910454076.4, dated Dec. 18, 2019, 14 pages (7 pages of English Translation and 7 pages of Official Copy).
Office Action received for Danish Patent Application No. PA201970259, dated Jan. 15, 2020, 4 pages.
Office Action received for Indian Patent Application No. 201617008291, dated Jan. 14, 2020, 7 pages.
Office Action received for Indian Patent Application No. 201617008296, dated Jan. 14, 2020, 7 pages.
Applicant Initiated Interview Summary received for U.S. Appl. No. 15/655,253, dated Mar. 31, 2020, 5 pages.
Intention to Grant received for European Patent Application No. 14772494.2, dated Mar. 16, 2020, 10 pages.
Office Action received for Taiwanese Patent Application No. 104107318, dated Feb. 18, 2020, 10 pages (4 pages of English Translation and 6 pages of Official Copy).
Decision to Grant received for European Patent Application No. 14772001.5, dated Dec. 5, 2019, 2 pages.
European Search Report received for European Patent Application No. 19206249.5, dated Dec. 19, 2019, 4 pages.
Office Action received for Chinese Patent Application No. 201910454069.4, dated Dec. 20, 2019, 6 pages (1 page of English Translation and 5 pages of Official Copy).
Applicant Initiated Interview Summary received for U.S. Appl. No. 16/144,950, dated Jan. 29, 2020, 5 pages.
Applicant Initiated Interview Summary received for U.S. Appl. No. 15/818,500, dated Jan. 30, 2020, 5 pages.
Decision on Appeal received for Korean Patent Application No. 10-2018-7010872, dated Jan. 20, 2020, 20 pages (3 pages of English Translation and 17 pages of Official Copy).
Final Office Action received for U.S. Appl. No. 15/655,253, dated Feb. 4, 2020, 20 pages.
International Search Report and Written Opinion received for PCT Patent Application No. PCT/US2019/049237, dated Jan. 8, 2020, 21 pages.
Notice of Allowance received for U.S. Appl. No. 14/913,345, dated Feb. 10, 2020, 10 pages.
Office Action received for European Patent Application No. 19206249.5, dated Jan. 20, 2020, 8 pages.
Office Action received for Indian Patent Application No. 201617009216, dated Jan. 24, 2020, 6 pages.
Decision on Appeal received for Korean Patent Application No. 10-2016-7008449, dated Jul. 30, 2019, 29 pages (7 page of English Translation and 22 pages of Official Copy).
Final Office Action received for U.S. Appl. No. 16/147,413, dated Sep. 3, 2019, 19 pages.
Intention to Grant received for Danish Patent Application No. PA201770794, dated Aug. 15, 2019, 2 pages.
Non-Final Office Action received for U.S. Appl. No. 15/818,500, dated Aug. 30, 2019, 17 pages.

(56) References Cited

OTHER PUBLICATIONS

Notice of Allowance received for Chinese Patent Application No. 201480059543.9, dated Sep. 4, 2019, 2 pages (1 page of English Translation and 1 page of Official Copy).
Notice of Allowance received for Korean Patent Application No. 10-2016-7008449, dated Aug. 9, 2019, 6 pages (2 pages of English Translation and 4 pages of Official Copy).
Office Action received for Australian Patent Application No. 2019216614, dated Aug. 22, 2019, 3 pages.
Office Action received for Chinese Patent Application No. 201480060083.1, dated Aug. 13, 2019, 6 pages (3 pages of English Translation and 3 pages of Official Copy).
Office Action received for Korean Patent Application No. 10-2017-7024506, dated Aug. 12, 2019, 6 pages (2 pages of English Translation and 4 pages of Official Copy).
Final Office Action received for U.S. Appl. No. 14/913,349, dated Jul. 22, 2019, 20 pages.
Intention to Grant received for European Patent Application No. 14772001.5, dated Jul. 18, 2019, 16 pages.
Notice of Allowance received for Japanese Patent Application No. 2017-545561, dated Jul. 12, 2019, 4 pages (1 page of English Translation and 3 pages of Official Copy).
Notice of Allowance received for Japanese Patent Application No. 2018-083313, dated Jul. 1, 2019, 4 pages (1 page of English Translation and 3 pages of Official Copy).
Notice of Allowance received for U.S. Appl. No. 15/049,049, dated Jul. 25, 2019, 8 pages.
Extended European Search Report received for European Patent Application No. 19156614.0, dated May 28, 2019, 9 pages.
Final Office Action received for U.S. Appl. No. 14/641,308, dated Jul. 1, 2019, 46 pages.
Intention to Grant received for European Patent Application No. 14772002.3, dated Jun. 24, 2019, 9 pages.
Non-Final Office Action received for U.S. Appl. No. 14/913,345, dated Jun. 26, 2019, 23 pages.
Office Action received for Danish Patent Application No. PA201770794, dated Jun. 13, 2019, 2 pages.
Advisory Action received for U.S. Appl. No. 14/841,646, dated Nov. 21, 2018, 5 pages.
Advisory Action received for U.S. Appl. No. 15/049,052, dated Sep. 11, 2017, 2 pages.
Corrected Notice of Allowance received for U.S. Appl. No. 14/641,252, dated Aug. 28, 2018, 2 pages.
Corrected Notice of Allowance received for U.S. Appl. No. 14/641,252, dated Jul. 9, 2018, 25 Pages.
Corrected Notice of Allowance received for U.S. Appl. No. 14/641,252, dated May 10, 2018, 10 pages.
Corrected Notice of Allowance received for U.S. Appl. No. 14/829,573, dated Aug. 9, 2018, 3 pages.
Corrected Notice of Allowance received for U.S. Appl. No. 14/829,573, dated Sep. 11, 2018, 3 pages.
Corrected Notice of Allowance received for U.S. Appl. No. 14/830,629, dated Feb. 13, 2019, 3 pages.
Corrected Notice of Allowance received for U.S. Appl. No. 16/055,489, dated Feb. 26, 2019, 2 pages.
Decision to Grant received for Danish Patent Application No. PA201570781, dated Jul. 17, 2017, 2 pages.
Decision to Grant received for Danish Patent Application No. PA201670117, dated Nov. 20, 2017, 2 pages.
Decision to Grant received for European Patent Application No. 15782209.9, dated Feb. 14, 2019, 2 pages.
Final Office Action received for U.S. Appl. No. 14/641,308, dated Mar. 14, 2018, 42 pages.
Final Office Action received for U.S. Appl. No. 14/830,629, dated Apr. 16, 2018, 27 pages.
Final Office Action received for U.S. Appl. No. 14/841,646, dated Aug. 2, 2018, 22 pages.
Final Office Action received for U.S. Appl. No. 14/913,349, dated Jul. 30, 2018, 18 pages.
Final Office Action received for U.S. Appl. No. 15/049,052, dated Mar. 1, 2018, 15 pages.
Final Office Action received for U.S. Appl. No. 15/049,052, dated May 17, 2017, 13 pages.
Final Office Action received for U.S. Appl. No. 15/049,052, dated Oct. 2, 2018, 16 pages.
Final Office Action received for U.S. Appl. No. 14/839,912, dated Sep. 13, 2018, 31 pages.
"Headset Button Controller v7.3 APK Full APP Download for Andriod", Blackberry, iPhone, Jan. 27, 2014, 11 pages.
Intention to Grant received for Danish Patent Application No. PA201570781, dated Dec. 8, 2016, 2 pages.
Intention to Grant received for Danish Patent Application No. PA201670117, dated Apr. 21, 2017, 2 pages.
Intention to Grant received for Danish Patent Application No. PA201870631, dated Apr. 5, 2019, 2 pages.
Intention to Grant received for Danish Patent Application No. PA201870632, dated Apr. 5, 2019, 2 pages.
Intention to Grant received for European Patent Application No. 14772001.5, dated Mar. 22, 2019, 17 pages.
Intention to Grant received for European Patent Application No. 15782209.9, dated Sep. 28, 2018, 8 pages.
Intention to Grant received for European Patent Application No. 18157131.6, dated Jan. 9, 2019, 9 pages.
International Preliminary Report on Patentability received for PCT Patent Application No. PCT/US2015/019322, dated Mar. 16, 2017, 11 pages.
International Preliminary Report on Patentability received for PCT Patent Application No. PCT/US2015/045936, dated Mar. 16, 2017, 9 Pages.
International Preliminary Report on Patentability received for PCT Patent Application No. PCT/US2015/045965, dated Dec. 27, 2016, 10 pages.
International Preliminary Report on Patentability received for PCT Patent Application No. PCT/US2015/047704, dated Mar. 16, 2017, 19 pages.
International Preliminary Report on Patentability received for PCT Patent Application No. PCT/US2015/054310, dated Sep. 14, 2017, 7 pages.
International Preliminary Report on Patentability received for PCT Patent Application No. PCT/US2015/019320, dated Mar. 16, 2017, 10 pages.
International Preliminary Report on Patentability received for PCT Patent Application No. PCT/US2015/019321, dated Mar. 16, 2017, 8 Pages.
Non-Final Office Action received for U.S. Appl. No. 14/641,308, dated Dec. 20, 2018, 43 pages.
Non-Final Office Action received for U.S. Appl. No. 14/641,308, dated Jun. 23, 2017, 53 pages.
Non-Final Office Action received for U.S. Appl. No. 14/829,573, dated Jan. 22, 2018, 26 Pages.
Non-Final Office Action received for U.S. Appl. No. 14/830,629, dated Dec. 1, 2016, 20 pages.
Non-Final Office Action received for U.S. Appl. No. 14/830,629, dated Jun. 15, 2017, 24 pages.
Non-Final Office Action received for U.S. Appl. No. 14/839,912, dated Feb. 26, 2019, 36 pages.
Non-Final Office Action received for U.S. Appl. No. 14/839,914, dated Oct. 19, 2017, 46 pages.
Non-Final Office Action received for U.S. Appl. No. 14/841,646, dated Dec. 1, 2017, 23 pages.
Non-Final Office Action received for U.S. Appl. No. 14/913,349, dated Apr. 2, 2019, 15 pages.
Non-Final Office Action received for U.S. Appl. No. 14/913,349, dated Jan. 11, 2018, 6 pages.
Non-Final Office Action received for U.S. Appl. No. 15/049,049, dated Feb. 6, 2019, 21 pages.
Non-Final Office Action received for U.S. Appl. No. 15/049,052, dated May 31, 2018, 15 pages.
Non-Final Office Action received for U.S. Appl. No. 15/049,052, dated Nov. 29, 2016, 13 pages.
Non-Final Office Action received for U.S. Appl. No. 15/049,052, dated Sep. 21, 2017, 14 pages.

(56) References Cited

OTHER PUBLICATIONS

Non-Final Office Action received for U.S. Appl. No. 16/144,950, dated Mar. 6, 2019, 24 pages.
Non-Final Office Action received for U.S. Appl. No. 16/147,413, dated Feb. 7, 2019, 18 pages.
Non-Final Office Action received for U.S. Appl. No. 14/839,912, dated Feb. 12, 2018, 30 pages.
Non-Final office Action Received for U.S. Appl. No. 14/839,912, dated Jun. 8, 2017, 26 pages.
Notice of Acceptance received for Australian Patent Application No. 2014315324, dated Sep. 28, 2017, 3 pages.
Notice of Allowance and Search Report received for Taiwanese Patent Application No. 104128687, dated Jun. 7, 2016, 4 pages (1 page of English Translation and 3 pages of Official copy).
Notice of Allowance received for Chinese Patent Application No. 201480060082.7, dated Mar. 12, 2019, 2 pages (1 page of English Translation and 1 page of Official Copy).
Notice of Allowance received for Danish Patent Application No. PA201570776, dated Feb. 8, 2017, 2 pages.
Notice of Allowance received for Japanese Patent Application No. 2016-537946, dated Mar. 26, 2018, 4 pages (1 page of English Translation and 3 pages of Official Copy).
Notice of Allowance received for Japanese Patent Application No. 2018-143982, dated Apr. 8, 2019, 4 pages (1 page of English Translation and 3 pages of Official Copy).
Notice of Allowance received for Taiwanese Patent Application No. 103130517, dated May 14, 2018, 5 pages (2 pages of English Translation and 3 pages of Official Copy).
Notice of Allowance received for Taiwanese Patent Application No. 104107333, dated Nov. 8, 2016, 2 pages (Official Copy Only). {See Communication under 37 CFR § 1.98(a) (3)}.
Notice of Allowance received for Taiwanese Patent Application No. 104107334, dated Jan. 26, 2017, 3 pages. (Official Copy Only) {See Communication under 37 CFR § 1.98(a) (3)}.
Notice of Allowance received for Taiwanese Patent Application No. 104133281, dated Mar. 29, 2018, 4 pages (1 page of English Translation and 3 pages of Official copy).
Notice of Allowance received for U.S. Appl. No. 13/038,276, dated Nov. 3, 2016, 10 pages.
Notice of Allowance received for U.S. Appl. No. 13/038,276, dated Nov. 30, 2016, 2 pages.
Notice of Allowance received for U.S. Appl. No. 14/641,241, dated Apr. 13, 2017, 2 pages.
Notice of Allowance received for U.S. Appl. No. 14/641,241, dated Jan. 31, 2017, 13 pages.
Notice of Allowance received for U.S. Appl. No. 14/641,241, dated Mar. 24, 2017, 3 Pages.
Notice of Allowance received for U.S. Appl. No. 14/641,252, dated Apr. 11, 2018, 14 pages.
Notice of Allowance received for U.S. Appl. No. 14/641,252, dated Jul. 18, 2018, 9 pages.
Notice of Allowance received for U.S. Appl. No. 14/829,573, dated Apr. 25, 2018, 6 pages.
Notice of Allowance received for U.S. Appl. No. 14/830,629, dated Oct. 17, 2018, 8 pages.
Notice of Allowance received for U.S. Appl. No. 14/839,914, dated Jun. 22, 2018, 12 pages.
Notice of Allowance received for U.S. Appl. No. 16/055,489, dated Jan. 9, 2019, 24 pages.
Notice of Allowance received for U.S. Appl. No. 16/055,489, dated Jan. 25, 2019, 8 pages.
Notice of Allowance received for U.S. Appl. No. 16/055,489, dated Nov. 8, 2018, 28 pages.
Office Action received for Danish Patent Application No. PA201770794, dated Dec. 19, 2017, 8 pages.
Office Action received for Korean Patent Application No. 10-2018-7010872, dated Dec. 21, 2018, 7 pages (3 pages of English Translation and 4 pages of Official Copy).
Office Action received for Australian Patent Application No. 2014315324, dated Aug. 8, 2017, 3 pages.
Office Action received for Australian Patent Application No. 2014315324, dated Oct. 21, 2016, 3 pages.
Office Action received for Australian Patent Application No. 2017276285, dated Nov. 26, 2018, 2 pages.
Office Action received for Australian Patent Application No. 2018200289, dated Apr. 9, 2019, 5 pages.
Office Action received for Australian Patent Application No. 2018200289, dated Dec. 4, 2018, 4 pages.
Office Action received for Australian Patent Application No. 2018200998, dated Jan. 30, 2019, 4 pages.
Office Action received for Chinese Patent Application No. 201480059543.9, dated Feb. 28, 2019, 16 pages (4 pages of English Translation and 12 pages of Official Copy).
Office Action received for Chinese Patent Application No. 201480060044.1, dated Jan. 26, 2018, 15 pages (5 pages of English translation and 10 pages of Official Copy).
Office Action received for Chinese Patent Application No. 201480060044.1, dated Sep. 25, 2018, 6 pages (3 pages of English translation and 3 pages of official copy).
Office Action received for Chinese Patent Application No. 201480060083.1, dated Dec. 5, 2018, 11 pages (5 pages of English Translation and 6 pages of Official Copy).
Office Action received for Chinese Patent Application No. 201580046339.8, dated Feb. 26, 2019, 18 pages (6 pages of English Translation and 12 pages of Official Copy).
Office Action received for Danish Patent Application No. PA201570776, dated Aug. 19, 2016, 3 pages.
Office Action received for Danish Patent Application No. PA201570781, dated Aug. 19, 2016, 3 pages.
Office Action received for Danish Patent Application No. PA201670117, dated Jan. 12, 2017, 3 pages.
Office Action received for Danish Patent Application No. PA201670117, dated Jun. 13, 2016, 10 pages.
Office Action received for Danish Patent Application No. PA201770794, dated Apr. 5, 2018, 4 pages.
Office Action received for Danish Patent Application No. PA201770794, dated Oct. 30, 2018, 3 pages.
Office Action received for European Patent Application No. 14771688.0, dated Jan. 21, 2019, 8 pages.
Office Action received for European Patent Application No. 14772001.5, dated Feb. 14, 2018, 5 pages.
Office Action received for European Patent Application No. 14772001.5, dated May 30, 2017, 10 pages.
Office Action received for European Patent Application No. 16710372.0, dated Feb. 22, 2019, 7 pages.
Office Action received for Japanese Patent Application No. 2016-537946, dated Aug. 7, 2017, 8 pages (4 Pages of English Translation and 4 Pages of Official Copy).
Office Action received for Japanese Patent Application No. 2016-537946, dated Jan. 30, 2017, 12 pages (6 pages of English Translation and 6 pages of Official Copy).
Office Action received for Japanese Patent Application No. 2018-083313, dated Feb. 12, 2019, 4 pages (2 pages of English Translation and 2 pages of Official Copy).
Office Action received for Japanese Patent Application No. 2018-090084, dated Feb. 15, 2019, 6 pages (3 pages of English Translation and 3 pages of Official copy).
Office Action received for Japanese Patent Application No. 2018-143982, dated Dec. 7, 2018, 10 pages (5 pages of English Translation and 5 pages of Official Copy).
Office Action received for Korean Patent Application No. 10-2016-7008449, dated Jan. 12, 2017, 15 pages (6 pages of English translation and 9 pages of official Copy).
Office Action received for Korean Patent Application No. 10-2016-7008449, dated Jan. 16, 2018, 10 pages (5 pages of English Translation and 5 pages of Official Copy).
Office Action received for Korean Patent Application No. 10-2016-7008449, dated Nov. 27, 2017, 6 pages (3 pages of English Translation and 3 pages of Official Copy).
Office Action received for Korean Patent Application No. 10-2018-7010872, dated May 21, 2018, 10 pages (4 pages of English Translation and 6 pages of Official Copy).

(56) References Cited

OTHER PUBLICATIONS

Office Action received for Korean Patent Application No. 10-2018-7032106, dated Dec. 26, 2018, 10 pages (4 pages of English translation and 6 pages of Official Copy).
Office Action received for Korean Patent Application No. 10-2018-7010872, dated Feb. 13, 2019, 7 pages (3 pages of English Translation and 4 pages of Official Copy).
Office Action received for Taiwanese Patent Application No. 103130517, dated Jul. 29, 2016, 7 pages (3 pages of English Translation and 4 pages of Official Copy).
Office Action received for Taiwanese Patent Application No. 103130517, dated Feb. 6, 2018, 5 pages (2 pages of English Translation and 3 pages of Official Copy).
Office Action received for Taiwanese Patent Application No. 104107318, dated Dec. 26, 2018, 33 pages (9 pages of English Translation and 24 pages of Official Copy).
Office Action received for Taiwanese Patent Application No. 104107327, dated Sep. 28, 2018, 7 pages (3 pages of English Translation and 4 pages of Official Copy).
Office Action received for Taiwanese Patent Application No. 104107333, dated May 17, 2016, 6 pages (3 pages of English Translation and 3 pages of Official Copy).
Office Action received for Taiwanese Patent Application No. 104107334, dated Sep. 19, 2016, 15 pages (6 pages of English Translation and 9 pages of Official Copy).
Office Action received for Taiwanese Patent Application No. 104128701, dated Jul. 22, 2016, 25 pages (9 pages of English Translation and 16 pages of Official Copy).
Office Action received for Taiwanese Patent Application No. 104128701, dated Mar. 16, 2017, 8 pages (3 pages of English Translation and 5 pages of Official Copy).
Office Action received for Taiwanese Patent Application No. 104133281, dated Mar. 30, 2017, 10 Pages (4 pages of English translation and 6 pages of official copy).
Office Action received for Taiwanese Patent Application No. 104133281, dated Sep. 1, 2016, 10 pages (4 pages of English Translation and 6 pages of Official Copy).
Search Report and opinion received for Danish Patent Application No. PA201870631, dated Dec. 6, 2018, 8 pages.
Search Report and Opinion received for Danish Patent Application No. PA201870632, dated Dec. 3, 2018, 8 pages.
Summons to Attend Oral Proceedings received for European Patent Application No. 14772001.5, mailed on Nov. 14, 2018, 5 pages.
Summons to Attend Oral Proceedings received for European Patent Application No. 14772001.5, mailed on Oct. 4, 2018, 15 pages.
Office Action received for Taiwan Patent Application No. 103130517, dated Feb. 22, 2016, 7 pages (3 pages of English Translation and 4 pages of Official Copy).
Non Final Office Action received for U.S. Appl. No. 12/790,490, dated Jan. 16, 2013, 12 pages.
Final Office Action received for U.S. Appl. No. 12/790,490, dated Jul. 17, 2013, 10 pages.
Notice of Allowance received for U.S. Appl. No. 12/790,490, dated Dec. 6, 2013, 11 pages.
Final Office Action received for U.S. Appl. No. 13/038,276, dated Mar. 27, 2014, 24 pages.
Final Office Action received for U.S. Appl. No. 13/038,276, dated Mar. 11, 2016, 36 pages.
Non-Final Office Action received for U.S. Appl. No. 13/038,276, dated Jul. 29, 2015, 31 pages.
Non-Final Office Action received for U.S. Appl. No. 13/038,276, dated Sep. 12, 2013, 24 pages.
Search Report received for Danish Patent Application No. PA201570781, dated Mar. 8, 2016, 10 pages.
Agarwal, Deepesh, "DexClock—Live Clock and Date Blended Into Beautiful Artwork As Your Desktop Wallpaper", available at: <https://www.megaleecher.net/DexCiock_Wallpaper_Designs>, Jul. 6, 2013, 4 pages.

Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Colt, Sam, "Here's One Way Apple's Smartwatch Could Be Better Than Anything Else", Business Insider, Aug. 21, 2014, pp. 1-4.
Dewsberry, Victor, "Designing for Small Screens", AVA Publishing, 2005, 27 pages.
Office Action received for Danish Patent Application No. PA201570776, dated Jan. 26, 2016, 12 pages.
International Preliminary Report on Patentability received for PCT Patent Application No. PCT/US2012/025519, dated Sep. 3, 2013, 5 pages.
International Search Report and Written Opinion received for PCT Patent Application No. PCT/US2012/025519, dated Jun. 11, 2012, 7 pages.
International Preliminary Report on Patentability received for PCT Patent Application No. PCT/US2014/053957, dated Mar. 17, 2016, 8 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/019321, dated Jun. 3, 2015, 11 pages.
International Search Report and Written Opinion received for PCT Patent Application No. PCT/US2015/019322, dated Jun. 18, 2015, 16 pages.
International Search Report and Written Opinion received for PCT Application No. PCT/US2015/045936, dated Nov. 4, 2015, 12 pages.
International Search Report and Written Opinion received for PCT Patent Application No. PCT/US2015/045965, dated Feb. 1, 2016, 20 pages.
International Search Report and Written Opinion received for PCT Patent Application No. PCT/US2015/047704, dated Feb. 22, 2016, 25 pages.
Invitation to Pay Additional Fees received for PCT Patent Application No. PCT/US2015/047704, dated Dec. 16, 2015, 10 pages.
International Search Report and Written Opinion received for PCT Patent Application No. PCT/US2015/054310, dated Jan. 20, 2016, 10 pages.
The Window Club, "How to Set GIF as Background Windows 7", Online Available at <https://www.youtube.com/watch?v=tUec42Qd7ng>, Dec. 24, 2012, pp. 1-5.
Applicant Initiated Interview Summary received for U.S. Appl. No. 14/913,349, dated Oct. 7, 2019, 4 pages.
Applicant-Initiated Interview Summary received for U.S. Appl. No. 14/641,308, dated Oct. 10, 2019, 5 pages.
Advisory Action received for U.S. Appl. No. 15/049,064, dated May 10, 2017, 3 Pages.
Advisory Action received for U.S. Appl. No. 15/049,058, dated Oct. 18, 2017, 3 pages.
Corrected Notice of Allowance received for U.S. Appl. No. 14/841,656, dated Apr. 11, 2018, 2 pages.
Corrected Notice of Allowance received for U.S. Appl. No. 14/841,656, dated May 7, 2018, 14 pages.
Decision to Grant received for Danish Patent Application No. PA201770181, dated Mar. 7, 2018, 2 pages.
Final Office Action received for U.S. Appl. No. 14/913,345, dated Oct. 26, 2018, 20 pages.
Final Office Action received for U.S. Appl. No. 15/049,049 dated Jul. 12, 2018, 24 pages.
Final Office Action received for U.S. Appl. No. 15/049,049, dated May 23, 2017, 23 pages.
Final Office Action received for U.S. Appl. No. 15/049,058, dated Aug. 8, 2018, 23 pages.
Final Office Action received for U.S. Appl. No. 15/049,058, dated May 8, 2017, 21 pages.
Final Office Action received for U.S. Appl. No. 15/049,064, dated Feb. 27, 2017, 13 Pages.

(56) References Cited

OTHER PUBLICATIONS

International Preliminary Report on Patentability received for PCT Patent Application No. PCT/US2014/053961, dated Jul. 21, 2016, 24 pages.
International Preliminary Report on Patentability received for PCT Patent Application No. PCT/US2016/019637, dated Sep. 21, 2017, 12 pages.
International Search Report and Written Opinion received for PCT Patent Application No. PCT/US2016/019637, dated Aug. 18, 2016, 18 pages.
International Search Report received for PCT Patent Application No. PCT/US2014/053961, dated Jul. 11, 2016, 10 pages.
International Written Opinion received for PCT Patent Application No. PCT/US2014/053961, dated Jul. 11, 2016, 22 pages.
Invitation to Pay Additional Fees received for PCT Patent Application No. PCT/US2016/019637, dated Jun. 1, 2016, 6 pages.
Non-Final Office Action received for U.S. Appl. No. 14/841,656, dated Jul. 26, 2017, 20 pages.
Non-Final Office Action received for U.S. Appl. No. 14/913,345, dated Apr. 5, 2018, 15 pages.
Non-Final Office Action received for U.S. Appl. No. 14/913,350, dated May 14, 2018, 30 pages.
Non-Final Office Action received for U.S. Appl. No. 15/049,049, dated Dec. 15, 2017, 23 pages.
Non-Final Office Action received for U.S. Appl. No. 15/049,049, dated Nov. 9, 2016, 21 pages.
Non-Final Office Action received for U.S. Appl. No. 15/049,058, dated Feb. 20, 2018, 21 pages.
Non-Final Office Action received for U.S. Appl. No. 15/049,058, dated Nov. 16, 2016, 19 pages.
Non-Final Office Action received for U.S. Appl. No. 15/049,064, dated Oct. 27, 2016., 15 pages.
Notice of Acceptance received for Australian Patent Application No. 2014315319, dated Oct. 12, 2017, 3 pages.
Notice of Acceptance received for Australian Patent Application No. 2014315325, dated Apr. 19, 2017, 3 Pages.
Notice of Allowance Action received for U.S. Appl. No. 14/841,656, dated Feb. 12, 2018, 9 pages.
Notice of Allowance received for Danish Patent Application No. PA201670118, dated Mar. 30, 2017, 2 pages.
Notice of Allowance received for Japanese Patent Application No. 2016-537945, dated Aug. 3, 2018, 4 pages.
Notice of Allowance received for Japanese Patent Application No. 2016-537947, dated Jun. 5, 2017, 3 pages.
Notice of Allowance received for Korean Patent Application No. 10-2018-7002695, dated Oct. 8, 2018, 5 pages.
Notice of Allowance received for Taiwanese Patent Application No. 103130518, dated May 19, 2016, 2 pages.
Notice of Allowance received for Taiwanese Patent Application No. 103130519, dated Oct. 27, 2016, 3 pages.
Notice of Allowance received for Taiwanese Patent Application No. 103130520, dated Apr. 25, 2018, 4 pages.
Notice of Allowance received for U.S. Appl. No. 14/841,656, dated Mar. 5, 2018, 3 pages.
Notice of Allowance received for U.S. Appl. No. 14/913,350, dated Dec. 19, 2018, 27 pages.
Notice of Allowance received for U.S. Appl. No. 15/049,064, dated Jul. 18, 2017, 24 pages.
Office Action and Search Report received for Danish Patent Application No. PA 201670118, dated Jul. 1, 2016, 7 pages.
Office Action received for Australian Patent Application No. 2014315234, dated Jul. 12, 2017, 4 pages.
Office Action received for Australian Patent Application No. 2014315234, dated Nov. 2, 2016, 3 pages.
Office Action received for Australian Patent Application No. 2014315319, dated Aug. 3, 2017, 3 pages.
Office Action received for Australian Patent Application No. 2014315319, dated Oct. 17, 2016, 3 pages.
Office Action received for Australian Patent Application No. 2014315325, dated Nov. 3, 2016, 3 pages.
Office Action received for Australian Patent Application No. 2016229407, dated Aug. 15, 2018, 4 pages.
Office Action received for Australian Patent Application No. 2017254897, dated Aug. 29, 2018, 4 pages.
Office Action received for Australian Patent Application No. 2018200998, dated Mar. 9, 2018, 5 pages.
Office Action received for Australian Patent Application No. 2014315234, dated Apr. 19, 2017, 4 pages.
Office Action received for Chinese Patent Application No. 201480059543.9, dated Jan. 26, 2018, 17 pages.
Office Action received for Chinese Patent Application No. 201480059543.9, dated Sep. 19, 2018, 18 pages.
Office Action received for Chinese Patent Application No. 201480060082.7, dated Jan. 26, 2018, 15 pages.
Office Action received for Chinese Patent Application No. 201480060082.7, dated Sep. 25, 2018, 6 pages.
Office Action received for Danish Patent Application No. PA201670118, dated Feb. 2, 2017, 2 pages.
Office Action received for Danish Patent Application No. PA201670118, dated Oct. 25, 2016, 3 Pages.
Office Action received for Danish Patent Application No. PA201770181, dated Jan. 3, 2018, 2 Pages.
Office Action received for Danish Patent Application No. PA201770181, dated Jun. 13, 2017, 6 pages.
Office Action received for European Patent Application No. 14771688.0, dated May 31, 2018, 6 pages.
Office Action received for European Patent Application No. 14771688.0, dated Nov. 30, 2017, 15 pages.
Office Action received for European Patent Application No. 14772002.3, dated Jul. 4, 2017., 8 pages.
Office Action received for European Patent Application No. 14772494.2, dated Jun. 20, 2017, 7 pages.
Office Action received for European Patent Application No. 14772494.2, dated Oct. 2, 2018, 9 pages.
Office Action received for European Patent Application No. 18157131.6, dated May 8, 2018, 12 pages.
Office Action received for Japanese Patent Application No. 2016-537945, dated Apr. 7, 2017, 6 pages.
Office Action received for Japanese Patent Application No. 2016-537945, dated Jan. 9, 2018, 5 pages.
Office Action received for Japanese Patent Application No. 2016-537947, dated Feb. 24, 2017, 6 pages.
Office Action received for Japanese Patent Application No. 2016-537948, dated Apr. 6, 2018, 5 pages.
Office Action received for Japanese Patent Application No. 2016-537948, dated Jun. 9, 2017, 10 pages.
Office Action received for Japanese Patent Application No. 2016-537948, dated Sep. 3, 2018, 4 pages.
Office Action received for Japanese Patent Application No. 2017-545561, dated Aug. 6, 2018, 8 pages.
Office Action received for Korean Patent Application No. 10-2016-7008474, dated Aug. 6, 2018, 10 pages.
Office Action received for Korean Patent Application No. 10-2016-7008474, dated Dec. 30, 2016, 10 pages.
Office Action received for Korean Patent Application No. 10-2016-7008474, dated May 15, 2018, 7 pages.
Office Action received for Korean Patent Application No. 10-2016-7008474, dated Nov. 27, 2017, 6 pages.
Office Action received for Korean Patent Application No. 10-2016-7008488, dated Feb. 8, 2018, 8 pages.
Office Action received for Korean Patent Application No. 10-2016-7008488, dated Jan. 12, 2017, 14 pages.
Office Action received for Korean Patent Application No. 10-2016-7008488, dated Nov. 27, 2017, 6 pages.
Office Action received for Korean Patent Application No. 10-2016-7008682, dated Dec. 30, 2016, 11 pages.
Office Action received for Korean Patent Application No. 10-2016-7008682, dated Feb. 8, 2018, 7 pages.
Office Action received for Korean Patent Application No. 10-2016-7008682, dated Nov. 27, 2017, 7 pages.
Office Action received for Korean Patent Application No. 10-2017-7024506, dated Sep. 28, 2018, 11 pages.

(56) References Cited

OTHER PUBLICATIONS

Office Action received for Korean Patent Application No. 10-2018-7002695, dated Feb. 27, 2018, 12 pages.
Office Action received for Korean Patent Application No. 10-2018-7002695, dated Jun. 19, 2018, 8 pages.
Office Action received for Korean Patent Application No. 10-2018-7013265, dated Aug. 10, 2018, 12 pages.
Office Action received for Taiwanese Patent Application No. 103130520, dated Apr. 17, 2017, 8 pages.
Office Action received for Taiwanese Patent Application No. 103130520, dated Jan. 23, 2018, 05 pages.
Office Action received for Taiwanese Patent Application No. 103130520, dated May 23, 2016, 38 pages.
Office Action received for Taiwanese Patent Application No. 103130520, dated Sep. 29, 2016, 39 pages.
Search Report received for European Patent Application No. 18157131.6, dated Apr. 19, 2018, 4 pages.
The interview with a key person. IBM and CITIZEN met and applied Linux to a watch, pp. 136-143.
"WatchPad 1.5", Online Available at <http://web.archive.org/web/20011205071448/http://www.trl.ibm.com:80/projects/ngm/index_e.htm>, Dec. 5, 2001, 2 pages.
"Watchpad 1.5 demo", YouTube.com, Online Available at <https://www.youtube.com/watch?v=7xjvVbeUn80>, Uploaded on Jun. 20, 2010, 2 pages.
Office Action received for Taiwan Patent Application No. 103130519, dated Mar. 25, 2016, 14 pages.
Office Action received for Taiwanese Patent Application No. 103130520, dated Oct. 1, 2015, 58 pages.
Brinkmann, Martin, "How to Zoom in Firefox", Ghacks, Available at <https://web.archive.org/web/20130804034728/https://www.ghacks.net/2009/02/23/how-to-zoom-in-firefox/>, Feb. 23, 2009, 11 pages.
Kamijo, Noboru, "Next Generation Mobile System—WatchPad1.5", Available at <http://researcher.ibm.com/researcher/view_group_subpage.php?id=5617>, retrieved on Jul. 4, 2015, 2 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
International Preliminary Report on Patentability received for PCT Patent Application No. PCT/US2014/053951, dated Mar. 17, 2016, 9 pages.
International Search Report and Written Opinion received for PCT Patent Application No. PCT/US2014/053951, dated Dec. 8, 2014, 11 pages.
International Preliminary Report on Patentability received for PCT Patent Application No. PCT/US2014/053958, dated Mar. 17, 2016, 8 pages.
International Search Report and Written Opinion received for PCT Patent Application No. PCT/US2014/053958, dated Feb. 19, 2015, 10 pages.
Invitation to Pay Additional Fees received for PCT Patent Application No. PCT/US2014/053961, dated Aug. 3, 2015, 6 pages.
Raghunath et al., "User Interfaces for Applications on a Wrist Watch", Journal of Personal and Ubiquitous Computing, vol. 6, Feb. 2002, pp. 17-30.
Wikipedia, "Rotary encoder", Online Available at <https://en.wikipedia.org/wiki/Rotary_encoder>, Retrieved on May 17, 2017, 17 pages.
Corrected Notice of Allowance received for U.S. Appl. No. 15/927,768, dated Aug. 7, 2019, 2 pages.
Notice of Acceptance received for Australian Patent Application No. 2018200289, dated Jul. 23, 2019, 3 pages.
Notice of Allowance received for Taiwanese Patent Application No. 104107327, dated Jul. 19, 2019, 5 pages (2 pages of English Translation and 3 pages of Official copy).
Notice of Acceptance received for Australian Patent Application No. 2017276285, dated Apr. 3, 2019, 3 pages.
Notice of Allowance received for Chinese Patent Application No. 201480060044.1, dated Mar. 29, 2019, 3 pages (1 page of English Translation and 2 pages of Official Copy).
Notice of Allowance received for U.S. Appl. No. 14/841,646, dated Apr. 18, 2019, 7 pages.
Non-Final Office Action received for U.S. Appl. No. 15/049,058, dated Jun. 5, 2019, 25 pages.
Notice of Allowance received for Japanese Patent Application No. 2018-090084, dated May 24, 2019, 4 pages (1 page of English Translation and 3 pages of Official Copy).
Notice of Allowance received for U.S. Appl. No. 15/927,768, dated May 31, 2019, 13 pages.
Office Action received for Australian Patent Application No. 2016229407, dated May 27, 2019, 4 pages.
Decision to Grant received for European Patent Application No. 18157131.6, dated May 16, 2019, 2 pages.
Office Action received for Australian Patent Application No. 2019201628, dated May 13, 2019, 2 pages.
Corrected Notice of Allowance received for U.S. Appl. No. 15/927,768, dated Jul. 9, 2019, 2 pages.
Non-Final Office Action received for U.S. Appl. No. 15/655,253, dated Jul. 10, 2019, 16 pages.
Notice of Allowance received for Korean Patent Application No. 10-2018-7032106, dated Jun. 28, 2019, 5 pages (2 pages of English Translation and 3 pages of Official Copy).
Office Action received for Australian Patent Application No. 2017254897, dated Jun. 28, 2019, 4 pages.
Office Action received for Korean Patent Application No. 10-2018-7013265, dated Jun. 14, 2019, 6 pages (2 pages of English Translation and 4 pages of official copy).
Advisory Action received for U.S. Appl. No. 16/144,950, dated Feb. 20, 2020, 5 pages.
Decision on Appeal received for Korean Patent Application No. 10-2016-7008474, dated Jan. 29, 2020, 21 pages (2 pages of English Translation and 19 pages of Official Copy).
Decision to Grant received for European Patent Application No. 14772002.3, dated Feb. 20, 2020, 2 pages.
Notice of Allowance received for Korean Patent Application No. 10-2018-7010872, dated Feb. 10, 2020, 6 pages (2 pages of English Translation and 4 pages of Official Copy).
Office Action received for Indian Patent Application No. 201617009428, dated Feb. 26, 2020, 7 pages.
Office Action received for Korean Patent Application No. 10-2017-7024506, dated Feb. 19, 2020, 12 pages (5 pages of English Translation and 7 pages of Official Copy).
Notice of Acceptance received for Australian Patent Application No. 2019201628, dated Sep. 10, 2019, 3 pages.
Notice of Allowance received for U.S. Appl. No. 15/049,052, dated Sep. 16, 2019, 5 pages.
Notice of Allowance received for U.S. Appl. No. 16/109,120, dated Sep. 11, 2019, 12 pages.
Office Action received for European Patent Application No. 14771688.0, dated Sep. 16, 2019, 7 pages.
Decision to Grant received for Danish Patent Application No. PA201870631, dated May 15, 2019, 2 pages.
Decision to Grant received for Danish Patent Application No. PA201870632, dated May 14, 2019, 2 pages.
Final Office Action received for U.S. Appl. No. 14/839,912, dated Jul. 30, 2019, 42 pages.
Partial European Search Report received for European Patent Application No. 19173371.6, dated Jul. 18, 2019, 17 pages.
Partial European Search Report received for European Patent Application No. 19173886.3, dated Jul. 18, 2019, 15 pages.
Search Report and Opinion received for Danish Patent Application No. PA201970259, dated Jul. 19, 2019, 10 pages.
Corrected Notice of Allowance received for U.S. Appl. No. 14/641,308, dated Mar. 10, 2020, 4 pages.
Extended European Search Report received for European Patent Application No. 19195247.2, dated Mar. 9, 2020, 7 pages.
Non-Final Office Action received for U.S. Appl. No. 16/147,413, dated Mar. 11, 2020, 22 pages.
Notice of Allowance received for U.S. Appl. No. 16/144,950, dated Mar. 19, 2020, 14 pages.
Office Action received for Chinese Patent Application No. 201580077206.7, dated Feb. 3, 2020, 29 pages (8 pages of English Translation and 21 pages of Official Copy).

(56) References Cited

OTHER PUBLICATIONS

Advisory Action received for U.S. Appl. No. 16/147,413, dated Nov. 25, 2019, 2019, 6 pages.
European Search Report received for European Patent Application No. 19173371.6, dated Oct. 30, 2019, 7 pages.
European Search Report received for European Patent Application No. 19199004.3, dated Nov. 12, 2019, 6 pages.
Final Office Action received for U.S. Appl. No. 16/144,950, dated Nov. 25, 2019, 24 pages.
Invitation to Pay Additional Fees received for PCT Patent Application No. PCT/US2019/049237, dated Oct. 31, 2019, 18 pages.
Office Action received for Chinese Patent Application No. 201580046339.8, dated Oct. 31, 2019, 9 pages (3 pages of English Translation and 6 pages of Official Copy).
Office Action received for European Patent Application No. 19173371.6, dated Nov. 12, 2019, 11 pages.
Office Action received for European Patent Application No. 19173886.3, dated Nov. 12, 2019, 9 pages.
Office Action received for European Patent Application No. 19199004.3, dated Nov. 22, 2019, 10 pages.
Office Action received for Korean Patent Application No. 10-2018-7033888, dated Nov. 28, 2019, 10 pages (4 pages of English Translation and 6 pages of Official Copy).
Office Action received for Korean Patent Application No. 10-2019-7007748, dated Nov. 15, 2019, 9 pages (3 pages of English Translation and 6 pages of Official Copy).
Office Action received for Korean Patent Application No. 10-2019-7028736, dated Nov. 28, 2019, 8 pages (3 pages of English Translation and 5 pages of Official Copy).
Advisory Action received for U.S. Appl. No. 14/641,308, dated Nov. 14, 2019, 4 pages.
Advisory Action received for U.S. Appl. No. 14/913,349, dated Oct. 29, 2019, 4 pages.
Advisory Action received for U.S. Appl. No. 14/839,912, dated Nov. 14, 2019, 6 pages.
Applicant Initiated Interview Summary received for U.S. Appl. No. 14/913,345, dated Nov. 4, 2019, 5 pages.
Applicant Initiated Interview Summary received for U.S. Appl. No. 15/655,253, dated Nov. 12, 2019, 3 pages.
Applicant Initiated Interview Summary received for U.S. Appl. No. 16/147,413, dated Oct. 28, 2019, 5 pages.
Applicant Initiated Interview Summary received for U.S. Appl. No. 14/839,912, dated Nov. 5, 2019, 5 pages.
Corrected Notice of Allowance received for U.S. Appl. No. 16/109,120, dated Nov. 12, 2019, 2 pages.
Decision on Appeal received for Korean Patent Application No. 10-2016-7008488, dated Oct. 18, 2019, 33 pages (4 pages of English Translation and 29 pages of Official Copy).
Decision to Grant received for Danish Patent Application No. PA201770794, dated Nov. 11, 2019, 2 pages.
European Search Report received for European Patent Application No. 19173886.3, dated Oct. 30, 2019, 8 pages.
Intention to Grant received for European Patent Application No. 14772002.3, dated Nov. 6, 2019, 9 pages.
Notice of Allowance received for Japanese Patent Application No. 2016-537948, dated Nov. 11, 2019, 3 pages (1 page of English Translation and 2 pages of Official Copy).
Notice of Allowance received for Korean Patent Application No. 10-2016-7008488, dated Oct. 25, 2019, 4 pages (2 pages of English Translation and 2 pages of Official Copy).
Applicant-Initiated Interview Summary received for U.S. Appl. No. 16/147,413, dated Jun. 2, 2020, 4 pages.
Non-Final Office Action received for U.S. Appl. No. 15/655,253, dated Sep. 10, 2020, 17 pages.
Office Action received for Korean Patent Application No. 10-2020-7019035, dated Aug. 28, 2020, 6 pages (2 pages of English Translation and 4 pages of Official Copy).
Office Action received for Korean Patent Application No. 10-2020-7022802, dated Aug. 28, 2020, 7 pages (2 pages of English Translation and 5 pages of Official Copy).

Office Action received for Taiwanese Patent Application No. 104107329, dated Jul. 24, 2020, 7 pages (3 pages of English Translation and 4 pages of Official Copy).
Applicant Initiated Interview Summary received for U.S. Appl. No. 16/384,726, dated Nov. 5, 2020, 3 pages.
Extended European Search Report received for European Patent Application No. 20190670.8, dated Nov. 2, 2020, 10 pages.
Notice of Allowance received for Chinese Patent Application No. 201910454069.4, dated Nov. 2, 2020, 7 pages (3 pages of English Translation and 4 pages of Official Copy).
Notice of Allowance received for U.S. Appl. No. 16/147,413, dated Nov. 5, 2020, 10 pages.
Notice of Allowance received for U.S. Appl. No. 16/525,082, dated Nov. 17, 2020, 7 pages.
Office Action received for Chinese Patent Application No. 201580046339.8, dated Oct. 19, 2020, 12 pages (4 pages of English Translation and 8 pages of Official Copy).
Office Action received for Chinese Patent Application No. 201910454076.4, dated Oct. 16, 2020, 14 pages (8 pages of English Translation and 6 pages of Official Copy).
Office Action received for Japanese Patent Application No. 2019-116590, dated Oct. 5, 2020, 6 pages (3 pages of English Translation and 3 pages of Official Copy).
Applicant-Initiated Interview Summary received for U.S. Appl. No. 15/655,253, dated Nov. 30, 2020, 5 pages.
Applicant-Initiated Interview Summary received for U.S. Appl. No. 16/263,280, dated Nov. 25, 2020, 3 pages.
Corrected Notice of Allowance received for U.S. Appl. No. 16/147,413, dated Nov. 25, 2020, 7 pages.
Non-Final Office Action received for U.S. Appl. No. 16/775,528, dated Nov. 20, 2020, 15 pages.
Office Action received for Danish Patent Application No. PA201970259, dated Nov. 23, 2020, 3 pages.
Askabouttech, "How to Change Android Smartwatch Wallpaper", also online available at: -https://www.youtube.com/watch?v=SBYrsyuHqBA, Jul. 12, 2014, 5 pages.
Intention to Grant received for European Patent Application No. 19199004.3, dated Sep. 14, 2020, 9 pages.
Intention to Grant received for Indian Patent Application No. 201617009216, dated Aug. 27, 2020, 2 pages.
Corrected Notice of Allowance received for U.S. Appl. No. 16/147,413, dated Sep. 17, 2020, 7 pages.
Office Action received for Australian Patent Application No. 2019272034, dated Sep. 14, 2020, 4 pages.
Applicant-Initiated Interview Summary received for U.S. Appl. No. 15/930,300, dated Oct. 27, 2020, 3 pages.
Examiner-Initiated Interview Summary received for U.S. Appl. No. 14/913,349, dated Oct. 27, 2020, 3 pages.
Final Office Action received for U.S. Appl. No. 14/913,349, dated Oct. 30, 2020, 33 pages.
Office Action received for Australian Patent Application No. 2019257521, dated Oct. 21, 2020, 6 pages.
Office Action received for Chinese Patent Application No. 201910164962.3, dated Sep. 18, 2020, 19 pages (6 pages of English Translation and 13 pages of Official Copy).
Office Action received for Japanese Patent Application No. 2019-138053, dated Oct. 2, 2020, 6 pages (3 pages of English Translation and 3 pages of Official Copy).
Office Action received for Korean Patent Application No. 10-2018-7033888, dated Oct. 19, 2020, 10 pages (4 pages of English Translation and 6 pages of Official Copy).
Office Action received for Korean Patent Application No. 10-2019-7028736, dated Oct. 22, 2020, 6 pages (3 pages of English Translation and 3 pages of Official Copy).
Feng Lipeng, "Bound for computer lovers", Dec. 31, 2009, 2 pages (Official Copy Only) (See Communication under 37 CFR § 1.98(a) (3)).
Rev. Some Culture, "It's super easy for middle-aged and elderly people to learn compute", Jul. 31, 2013, 2 pages (Official Copy Only) (See Communication under 37 CFR § 1.98(a) (3)).
WZ Science Alliance, "Very simple geriatrics computer and Internet bestselling upgrade", Sep. 30, 2013, 3 pages (Official Copy Only) (See Communication under 37 CFR § 1.98(a) (3)).

(56) References Cited

OTHER PUBLICATIONS

Notice of Allowance received for U.S. Appl. No. 16/525,082, dated Aug. 20, 2020, 5 pages.
Office Action received for Australian Patent Application No. 2019216614, dated Aug. 13, 2020, 4 pages.
Office Action received for Chinese Patent Application No. 201810074876.9, dated Jul. 31, 2020, 11 pages (5 pages of English Translation and 6 pages of Official Copy).
Office Action received for Japanese Patent Application No. 2019-088503, dated Jul. 31, 2020, 7 pages (4 pages of English Translation and 3 pages of Official Copy).
Applicant-Initiated Interview Summary received for U.S. Appl. No. 16/525,082, dated Jul. 28, 2020, 4 pages.
Decision to Grant received for European Patent Application No. 14772494.2, dated Jul. 23, 2020, 2 pages.
Non-Final Office Action received for U.S. Appl. No. 16/263,280, dated Jul. 27, 2020, 11 pages.
Non-Final Office Action received for U.S. Appl. No. 16/734,173, dated Jul. 23, 2020, 16 pages.
Notice of Allowance received for U.S. Appl. No. 16/147,413, dated Jul. 20, 2020, 11 pages.
Office Action received for Australian Patent Application No. 2019206101, dated Jul. 14, 2020, 4 pages.
Office Action received for Korean Patent Application No. 10-2017-7024506, dated Jul. 8, 2020, 6 pages (3 pages of English Translation and 3 pages of Official Copy).
Office Action received for Korean Patent Application No. 10-2018-7033888, dated Jul. 7, 2020, 7 pages (3 pages of English Translation and 4 pages of Official Copy).
Pedersen, Isabel, "Ready to Wear (or Not) Examining the Rhetorical Impact of Proposed Wearable Devices", 2013 IEEE International Symposium on Technology and Society (ISTAS) Social Implications of Wearable Computing and Augmediated Reality III Everyday Life, Dec. 31, 2013, pp. 201-202.
Tong et al., "Discussion About the Influence of Wearable Device on Mobile Operators' Service", Telecom science, Oct. 31, 2014, pp. 134-142 (Official Copy Only) (See Communication under 37 CFR § 1.98(a) (3)).
Notice of Allowance received for U.S. Appl. No. 15/930,300, dated Aug. 5, 2020. 14 pages.
Office Action received for Australian Patent Application No. 2019257521, dated Aug. 7, 2020. 5 pages.
Office Action received for Chinese Patent Application No. 201680012759.9, dated Jun. 19, 2020. 20 pages (9 pages of English Translation and 11 pages of Official Copy).
Office Action received for Chinese Patent Application No. 201910454069.4, dated Jul. 24, 2020. 8 pages (5 pages of English Translation and 3 pages of Official Copy).
Applicant-Initiated Interview Summary received for U.S. Appl. No. 15/818,500, dated Oct. 13, 2020, 4 pages.
Extended European Search Report received for European Patent Application No. 19217240.1, dated May 25, 2020, 7 pages.
Non-Final Office Action received for U.S. Appl. No. 16/384,726, dated May 14, 2020, 16 pages.
Notice of Allowance received for Korean Patent Application No. 10-2019-7007748, dated May 6, 2020, 5 pages (1 page of English Translation and 4 pages of Official Copy).
Office Action received for Korean Patent Application No. 10-2019-7028736, dated May 7, 2020, 8 pages (3 pages of English Translation and 5 pages of Official Copy).
Corrected Notice of Allowance received for U.S. Appl. No. 14/913,345, dated Apr. 13, 2020, 4 pages.
Final Office Action received for U.S. Appl. No. 15/818,500, dated Apr. 6, 2020, 15 pages.
Notice of Allowance received for Korean Patent Application No. 10-2018-7013265, dated Apr. 1, 2020, 4 pages (1 pages of English Translation and 3 pages of Official Copy).
Office Action received for Australian Patent Application No. 2019216614, dated Apr. 1, 2020, 4 pages.

Office Action received for Taiwanese Patent Application No. 104107329, dated Mar. 5, 2020, 22 pages (9 pages of English Translation and 13 pages of Official Copy).
Non-Final Office Action received for U.S. Appl. No. 16/525,082, dated Jul. 9, 2020, 20 pages.
Office Action received for Chinese Patent Application No. 201580046339.8, dated Jun. 3, 2020, 19 pages (10 pages of English Translation and 9 pages of Official Copy).
Non-Final Office Action received for U.S. Appl. No. 14/913,349, dated Apr. 22, 2020, 20 pages.
Office Action received for Chinese Patent Application No. 201910164962.3, dated Apr. 8, 2020, 25 pages (13 pages of English Translation and 12 pages of Official Copy).
Office Action received for Taiwanese Patent Application No. 103130518, dated Oct. 15, 2015, 7 pages (3 pages of English Translation and 4 pages of Official Copy).
Corrected Notice of Allowance received for U.S. Appl. No. 15/930,300, dated Dec. 24, 2020, 3 pages.
Notice of Acceptance received for Australian Patent Application No. 2019206101, dated Dec. 11, 2020, 3 pages.
Office Action received for Chinese Patent Application No. 201580077206.7, dated Nov. 11, 2020, 11 pages (5 pages of English Translation and 6 pages of Official Copy).
Applicant-Initiated interview Summary received for U.S. Appl. No. 16/263,280, dated Apr. 26, 2021, 2 pages.
Board Opinion received for Chinese Patent Application No. 201580046339.8, dated Mar. 19, 2021, 11 pages (3 pages of English Translation and 8 pages of Official Copy).
European Search Report received for European Patent Application No. 20217518.8, dated Apr. 16, 2021, 4 pages.
Non-Final Office Action received for U.S. Appl. No. 16/871,995, dated Apr. 26, 2021, 14 pages.
Office Action received for Japanese Patent Application No. 2019-116590, dated Mar. 15, 2021, 6 pages (3 pages of English Translation and 3 pages of Official Copy).
Office Action received for Korean Patent Application No. 10-2021-7001482, dated Apr. 9, 2021, 10 pages (4 pages of English Translation and 6 pages of Official Copy).
Applicant-Initiated Interview Summary received for U.S. Appl. No. 15/655,253, dated Mar. 29, 2021, 4 pages.
Applicant-Initiated Interview Summary received for U.S. Appl. No. 16/734,173, dated Feb. 25, 2021, 3 pages.
Applicant-Initiated Interview Summary received for U.S. Appl. No. 16/775,528, dated Feb. 23, 2021, 4 pages.
Corrected Notice of Allowance received for U.S. Appl. No. 16/147,413, dated Jan. 8, 2021, 7 pages.
Corrected Notice of Allowance received for U.S. Appl. No. 16/384,726, dated Apr. 2, 2021, 2 pages.
Decision to Grant received for European Patent Application No. 19199004.3, dated Jan. 21, 2021, 2 pages.
Final Office Action received for U.S. Appl. No. 15/655,253, dated Feb. 9, 2021, 16 pages.
Final Office Action received for U.S. Appl. No. 16/263,280, dated Mar. 4, 2021, 13 pages.
Intention to Grant received for Danish Patent Application No. PA201970259, dated Mar. 23, 2021, 2 pages.
International Preliminary Report on Patentability received for PCT Patent Application No. PCT/US2019/049237, dated Mar. 25, 2021, 15 pages.
Non-Final Office Action received for U.S. Appl. No. 16/734,173, dated Jan. 6, 2021, 14 pages.
Notice of Acceptance received for Australian Patent Application No. 2019272034, dated Dec. 14, 2020, 3 pages.
Notice of Allowance received for Chinese Patent Application No. 201580077206.7, dated Feb. 3, 2021, 2 pages (1 page of English Translation and 1 page of Official Copy).
Notice of Allowance received for Chinese Patent Application No. 201810074876.9, dated Jan. 12, 2021, 2 pages (1 page of English Translation and 1 page of Official Copy).
Notice of Allowance received for Chinese Patent Application No. 201910454076.4, dated Feb. 4, 2021, 2 pages (1 page of English Translation and 1 page of Official Copy).

(56) References Cited

OTHER PUBLICATIONS

Notice of Allowance received for Korean Patent Application No. 10-2020-7022802, dated Mar. 4, 2021, 6 pages (2 pages of English Translation and 4 pages of Official Copy).
Notice of Allowance received for U.S. Appl. No. 15/818,500, dated Feb. 22, 2021, 11 pages.
Notice of Allowance received for U.S. Appl. No. 16/384,726, dated Mar. 17, 2021, 9 pages
Office Action received for Australian Patent Application No. 2019337519, dated Mar. 18, 2021, 5 pages.
Office Action received for Chinese Patent Application No. 201910164962.3, dated Jan. 12, 2021, 14 pages (7 pages of English Translation and 7 pages of Official Copy).
Office Action received for Chinese Patent Application No. 201911127193.6, dated Dec. 17, 2020, 21 pages (10 pages of English Translation and 11 pages of Official Copy).
Office Action received for European Patent Application No. 19173371.6, dated Mar. 15, 2021, 6 pages.
Office Action received for European Patent Application No. 19173886.3, dated Mar. 16, 2021, 6 pages.
Office Action received for European Patent Application No. 19206249.5, dated Jan. 11, 2021, 8 pages.
Office Action received for Indian Patent Application No. 201818001531, dated Mar. 2021, 6 pages.
Office Action received for Korean Patent Application No. 10-2021-7005523, dated Mar. 31, 2021, 8 pages (3 pages of English Translation and 5 pages of Official Copy).
Supplemental Notice of Allowance received for U.S. Appl. No. 15/818,500, dated Mar. 5, 2021, 2 pages.

\* cited by examiner

USER INTERFACE OBJECT MANIPULATIONS IN A USER INTERFACE

CROSS REFERENCE TO RELATED APPLICATIONS

This application is a continuation of U.S. patent application Ser. No. 14/913,350, filed Feb. 19, 2016, entitled "USER INTERFACE OBJECT MANIPULATIONS IN A USER INTERFACE", which is a continuation in part of U.S. patent application Ser. No. 14/476,657, filed Sep. 3, 2014, entitled "USER INTERFACE OBJECT MANIPULATIONS IN A USER INTERFACE", which is a national stage application of International Application No. PCT/US2014/053958, filed Sep. 3, 2014, entitled "USER INTERFACE OBJECT MANIPULATIONS IN A USER INTERFACE," which claims priority to U.S. Provisional Patent Application Ser. No. 61/873,356, filed Sep. 3, 2013, entitled "CROWN INPUT FOR A WEARABLE ELECTRONIC DEVICE"; U.S. Provisional Patent Application Ser. No. 61/873,359, filed Sep. 3, 2013, entitled "USER INTERFACE OBJECT MANIPULATIONS IN A USER INTERFACE"; U.S. Provisional Patent Application Ser. No. 61/959,851, filed Sep. 3, 2013, entitled "USER INTERFACE FOR MANIPULATING USER INTERFACE OBJECTS"; U.S. Provisional Patent Application Ser. No. 61/873,360, filed Sep. 3, 2013, entitled "USER INTERFACE FOR MANIPULATING USER INTERFACE OBJECTS WITH MAGNETIC PROPERTIES"; International Application No. PCT/US2014/053958, filed Sep. 3, 2014, entitled "USER INTERFACE OBJECT MANIPULATIONS IN A USER INTERFACE," is also a continuation-in-part of U.S. Non-provisional patent application Ser. No. 14/476,657, filed Sep. 3, 2014, entitled "USER INTERFACE FOR MANIPULATING USER INTERFACE OBJECTS WITH MAGNETIC PROPERTIES". The content of these applications are hereby incorporated by reference in their entireties for all purposes.

This application is related to International Patent Application Serial Number PCT/US2014/053961, filed Sep. 3, 2014, entitled "USER INTERFACE FOR MANIPULATING USER INTERFACE OBJECTS WITH MAGNETIC PROPERTIES"; International Patent Application Serial Number PCT/US2014/053957, filed Sep. 3, 2014, entitled "USER INTERFACE FOR MANIPULATING USER INTERFACE OBJECTS"; and International Patent Application Serial Number PCT/US2014/053951, filed Sep. 3, 2014, entitled "CROWN INPUT FOR A WEARABLE ELECTRONIC DEVICE". The content of these applications is hereby incorporated by reference in its entirety for all purposes.

FIELD

This disclosure relates generally to user interfaces and, more specifically, to user interfaces using a crown input mechanism.

BACKGROUND

Advanced personal electronic devices can have small form factors. These personal electronic devices include, but are not limited to, tablets and smart phones. Use of such personal electronic devices involves manipulation of user interface objects on display screens which also have small form factors that complement the design of the personal electronic devices.

Exemplary manipulations that users can perform on personal electronic devices include navigating a hierarchy, selecting a user interface object, adjusting the position, size, and zoom of user interface objects, or otherwise manipulating user interfaces. Exemplary user interface objects include digital images, video, text, icons, maps, control elements such as buttons, and other graphics. A user can perform such manipulations in image management software, video editing software, word pressing software, software execution platforms such as an operating system's desktop, website browsing software, and other environments.

Existing methods for manipulating user interface objects on reduced-size touch-sensitive displays can be inefficient. Further, existing methods generally provide less precision than is preferable.

SUMMARY

Systems and processes for manipulating a graphical user interface are disclosed. One process can include receiving user input through a crown to rotate a virtual object. The process includes selecting a surface of the object from among the multiple surfaces of the object in response to determining that the crown rotation exceeded a speed threshold.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

Many personal electronic devices have graphical user interfaces with options that can be activated in response to user inputs. Typically, a user can select and activate a particular option from among multiple options. For example, a user may select an option by placing a mouse cursor over the desired option using a pointing device. The user may activate the option by clicking a button of the pointing device while the option is selected. In another example, a user may select and activate an option displayed on a touch-sensitive display (also known as a touch screen) by touching the touch-sensitive display at the location of the displayed option. Given the inefficiency of existing methods for selecting options on reduced-size touch-sensitive displays, there is a need for methods that enable users to more efficiently and conveniently select a desired option in a graphical user interface environment.

The examples below describe improved techniques for selecting a surface of a user interface object in a graphical user interface using user inputs. More specifically, these techniques use a physical crown as an input device to enable a user to select a desired option by selecting a surface of the user interface object. As a result, the examples described below allow a user to more efficiently and conveniently select a desired option.

Figure 1:
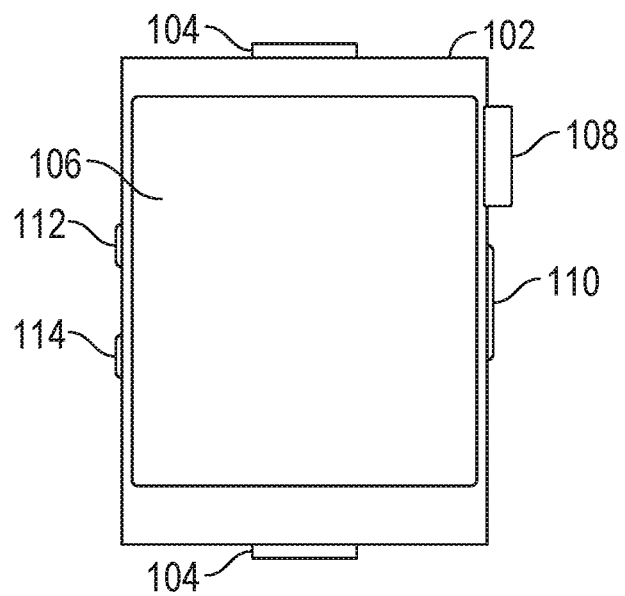
FIG. 1 illustrates an exemplary wearable electronic device according to various examples.

FIG. 1 illustrates exemplary personal electronic device 100. In the illustrated example, device 100 is a watch that generally includes body 102 and strap 104 for affixing device 100 to the body of a user. That is, device 100 is wearable. Body 102 can designed to couple with straps 104. Device 100 can have touch-sensitive display screen (hereafter touchscreen) 106 and crown 108. Device 100 can also have buttons 110, 112, and 114.

Conventionally, the term 'crown,' in the context of a watch, refers to the cap atop a stem for winding the watch. In the context of a personal electronic device, the crown can be a physical component of the electronic device, rather than a virtual crown on a touch sensitive display. Crown 108 can be mechanical meaning that it can be connected to a sensor for converting physical movement of the crown into electrical signals. Crown 108 can rotate in two directions of rotation (e.g., forward and backward). Crown 108 can also be pushed in towards the body of device 100 and/or be pulled away from device 100. Crown 108 can be touch-sensitive, for example, using capacitive touch technologies that can detect whether a user is touching the crown. Moreover, crown 108 can further be rocked in one or more directions or translated along a track along an edge or at least partially around a perimeter of body 102. In some examples, more than one crown 108 can be used. The visual appearance of crown 108 can, but need not, resemble crowns of conventional watches. Buttons 110, 112, and 114, if included, can each be a physical or a touch-sensitive button. That is, the buttons may be, for example, physical buttons or capacitive buttons. Further, body 102, which can include a bezel, may have predetermined regions on the bezel that act as buttons.

Display 106 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Display 106 can allow a user to perform various functions by touching over hovering near the touch sensor panel using one or more fingers or other object.

In some examples, device 100 can further include one or more pressure sensors (not shown) for detecting a force or pressure applied to the display. The force or pressure applied to display 106 can be used as an input to device 100 to perform any desired operation, such as making a selection, entering or exiting a menu, causing the display of additional options/actions, or the like. In some examples, different operations can be performed based on the amount of force or pressure being applied to display 106. The one or more pressure sensors can further be used to determine a position that the force is being applied to display 106.

Figure 2:
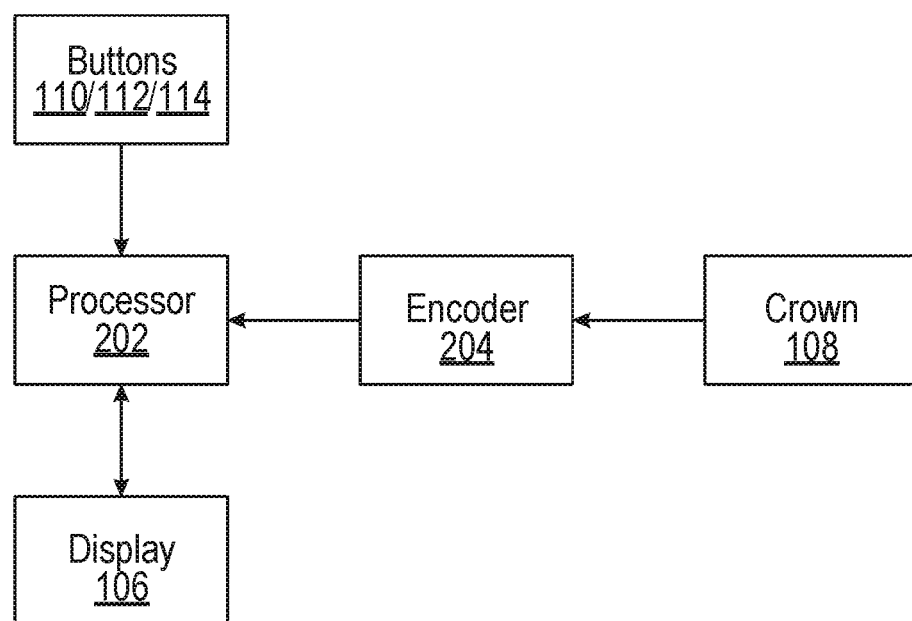
FIG. 2 illustrates a block diagram of an exemplary wearable electronic device according to various examples.

FIG. 2 illustrates a block diagram of some of the components of device 100. As shown, crown 108 can be coupled to encoder 204, which can be configured to monitor a physical state or change of state of crown 108 (e.g., the position of the crown), convert it to an electrical signal (e.g., convert it to an analog or digital signal representation of the position or change in position of crown 108), and provide the signal to processor 202. For instance, in some examples, encoder 204 can be configured to sense the absolute rotational position (e.g., an angle between 0-) 360° of crown 108 and output an analog or digital representation of this position to processor 202. Alternatively, in other examples, encoder 204 can be configured to sense a change in rotational position (e.g., a change in rotational angle) of crown 108 over some sampling period and to output an analog or digital representation of the sensed change to processor 202. In these examples, the crown position information can further indicate a direction of rotation of the crown (e.g., a positive value can correspond to one direction and a negative value can correspond to the other). In yet other examples, encoder 204 can be configured to detect a rotation of crown 108 in any desired manner (e.g., velocity, acceleration, or the like) and can provide the crown rotational information to processor 202. In alternative examples, instead of providing information to processor 202, this information can be provided to other components of device 100. While the examples described herein refer to the use of rotational position of crown 108 to control scrolling, scaling, or an objects position, it should be appreciated that any other physical state of crown 108 can be used.

In some examples, the physical state of the crown can control physical attributes of display 106. For example, if crown 108 is in a particular position (e.g., rotated forward), display 106 can have limited z-axis traversal ability. In other words, the physical state of the crown can represent physical modal functionality of display 106. In some examples, a temporal attribute of the physical state of crown 108 can be used as an input to device 100. For example, a fast change in physical state can be interpreted differently than a slow change in physical state.

Processor 202 can be further coupled to receive input signals from buttons 110, 112, and 114, along with touch signals from touch-sensitive display 106. The buttons may be, for example, physical buttons or capacitive buttons. Further, body 102, which can include a bezel, may have predetermined regions on the bezel that act as buttons. Processor 202 can be configured to interpret these input signals and output appropriate display signals to cause an image to be produced by touch-sensitive display 106. While a single processor 202 is shown, it should be appreciated that any number of processors or other computational devices can be used to perform the general functions discussed above.

FIGS. 3-12 illustrate an exemplary user interface 300 displaying a two-sided user interface object 302. Object 302 has a first surface 304 and a second surface 306. Each surface of object 302 is a selectable surface associated with corresponding data. The data may be, for example, text, an image, an application icon, an instruction, a binary ON or OFF option, and the like. A user can select a surface from among the multiple selectable surfaces of object 302 by using a physical crown of a wearable electronic device to rotate object 302 to align the desired selection surface such that the surface is parallel to the display 106 of the device 100 and is displayed on the display 106. The system is designed to transition between one surface to another, rather than stopping in between surfaces. Although examples are described with respect to object surfaces (or planes) being parallel to display 106, the examples can also be modified to instead be described with respect to object surfaces (or planes) facing the viewer of display 106. This modification may be particularly helpful when object surfaces or display 106 is not plane surface.

Crown 108 of device 100 is a user rotatable user interface input. The crown 108 can be turned in two distinct directions: clockwise and counterclockwise. FIGS. 3-12 include rotation direction arrows illustrating the direction of crown rotation and movement direction arrows illustrating the direction of rotation of a user interface object, where applicable. The rotation direction arrows and movement direction arrows are typically not part of the displayed user interface, but are provided to aid in the interpretation of the figures. In this example, a clockwise direction rotation of crown 108 is illustrated by a rotation direction arrow pointing in the up direction. Similarly, a counterclockwise direction rotation of crown 108 is illustrated by a rotation direction arrow pointing in the down direction. The characteristics of the rotation direction arrow are not indicative of the distance, speed, or acceleration with which crown 108 is rotated by a user. Instead, the rotation direction arrow is indicative of the direction of rotation of crown 108 by the user.

Figure 3:
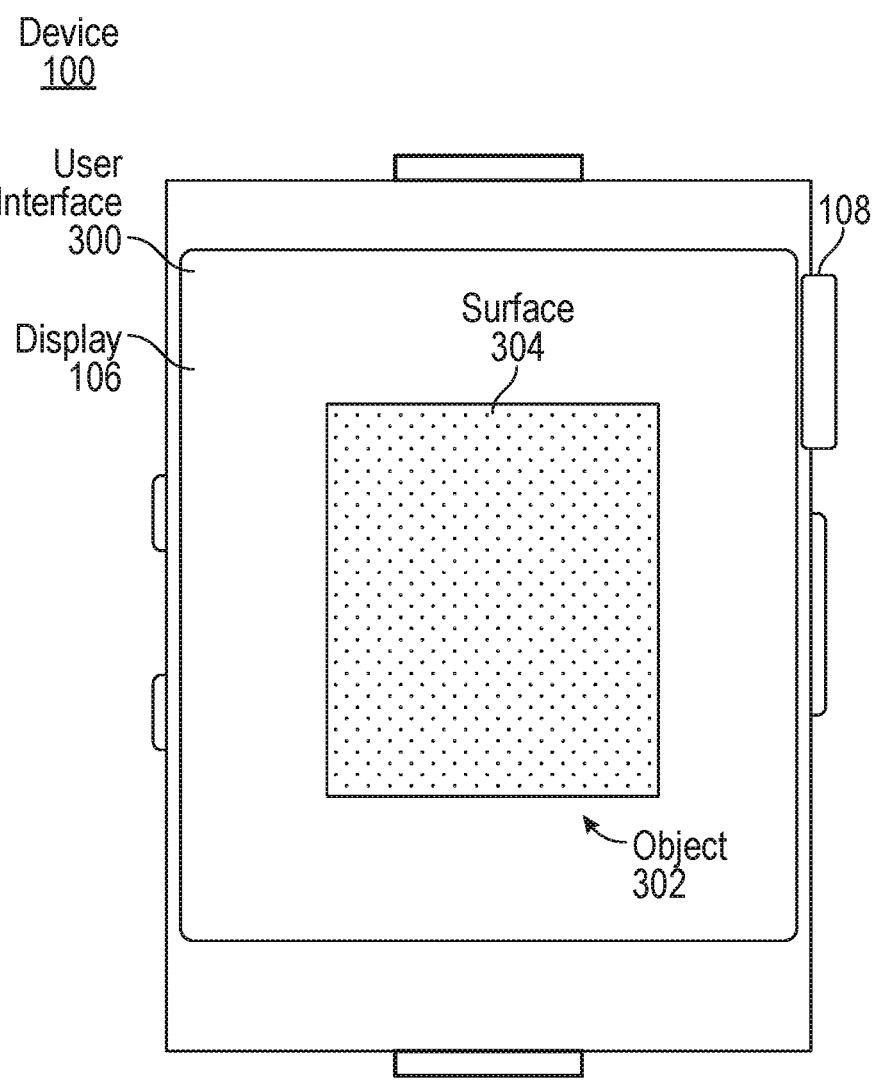
FIGS. 3-12 illustrate an exemplary graphical user interface showing the selection of a surface of a two-sided object in response to a rotation of a crown.
Figure 4:
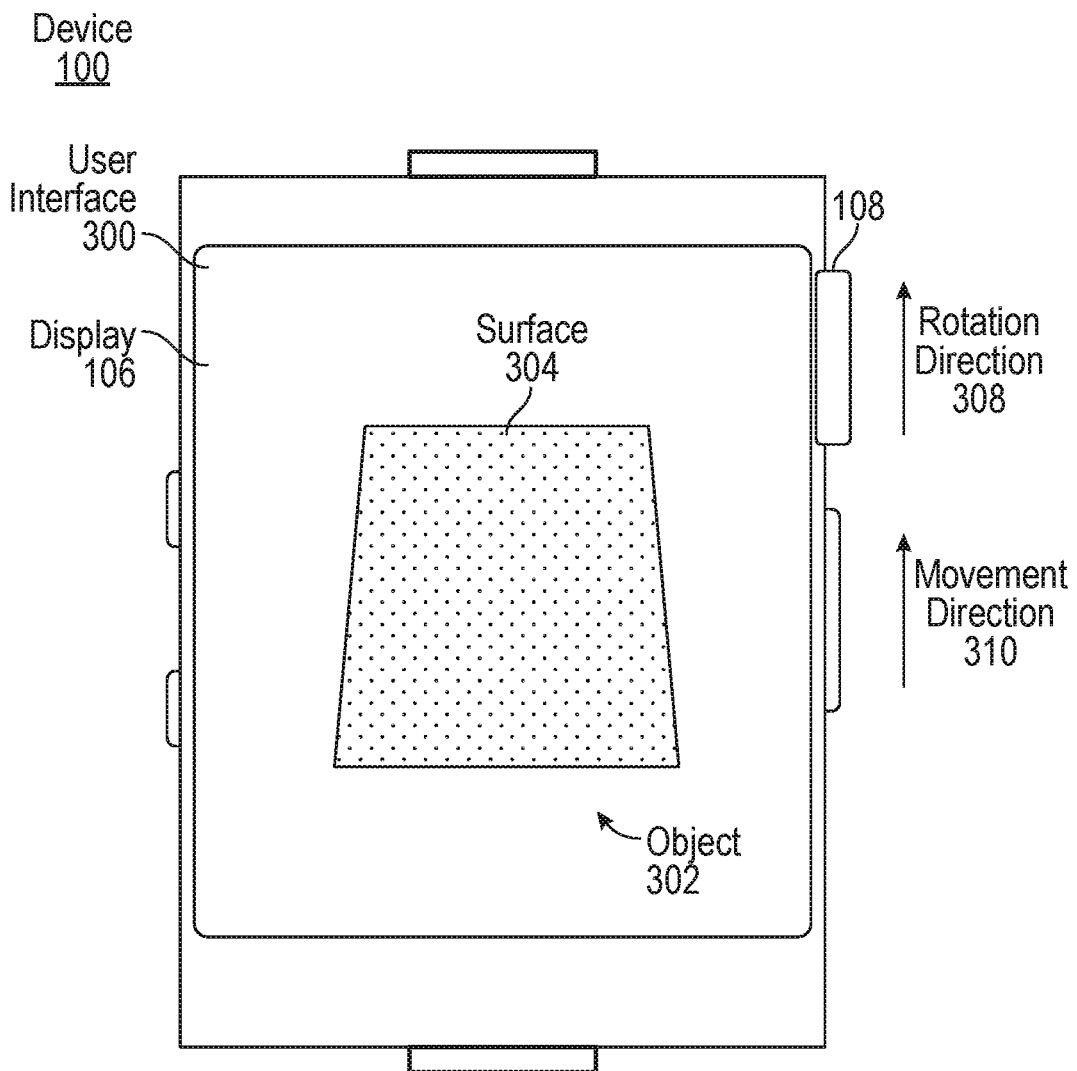

At FIG. 3, first surface 304 of object 302 is aligned parallel to display 106 and is displayed, indicating selection of first surface 304. The selected first surface 304 can be activated through, for example, an additional user input. At FIG. 4, device 100 determines a change in the position of crown 108 in the clockwise direction, as indicated by rotation direction arrow 308. Device 100 determines a rotational speed and a direction based on the determined change in the position of crown 108. In response to determining the change in the position of crown 108, the device rotates object 302, as indicated by movement direction arrow 310 and illustrated in FIG. 4. The rotation of object 302 is based on the determined rotational speed and direction. Rotational speed may be expressed in numerous ways. For example, rotational speed may be expressed as hertz, as rotations per unit of time, as rotations per frame, as revolutions per unit of time, as revolutions per frame, as a change in angle per unit of time, and the like. In one example, object 302 may be associated with a mass or may have a calculated rotational inertia.

Figure 5:
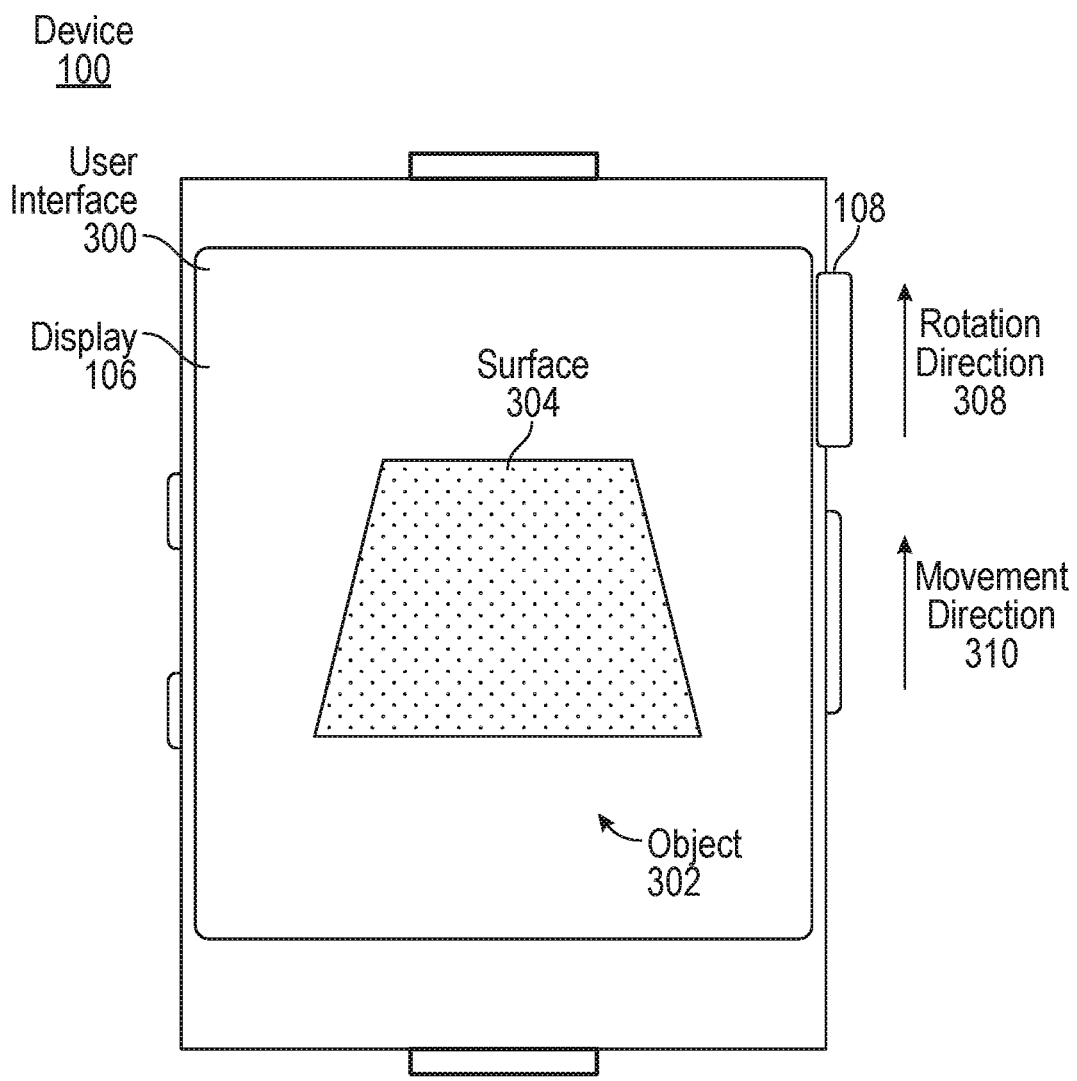
Figure 6:
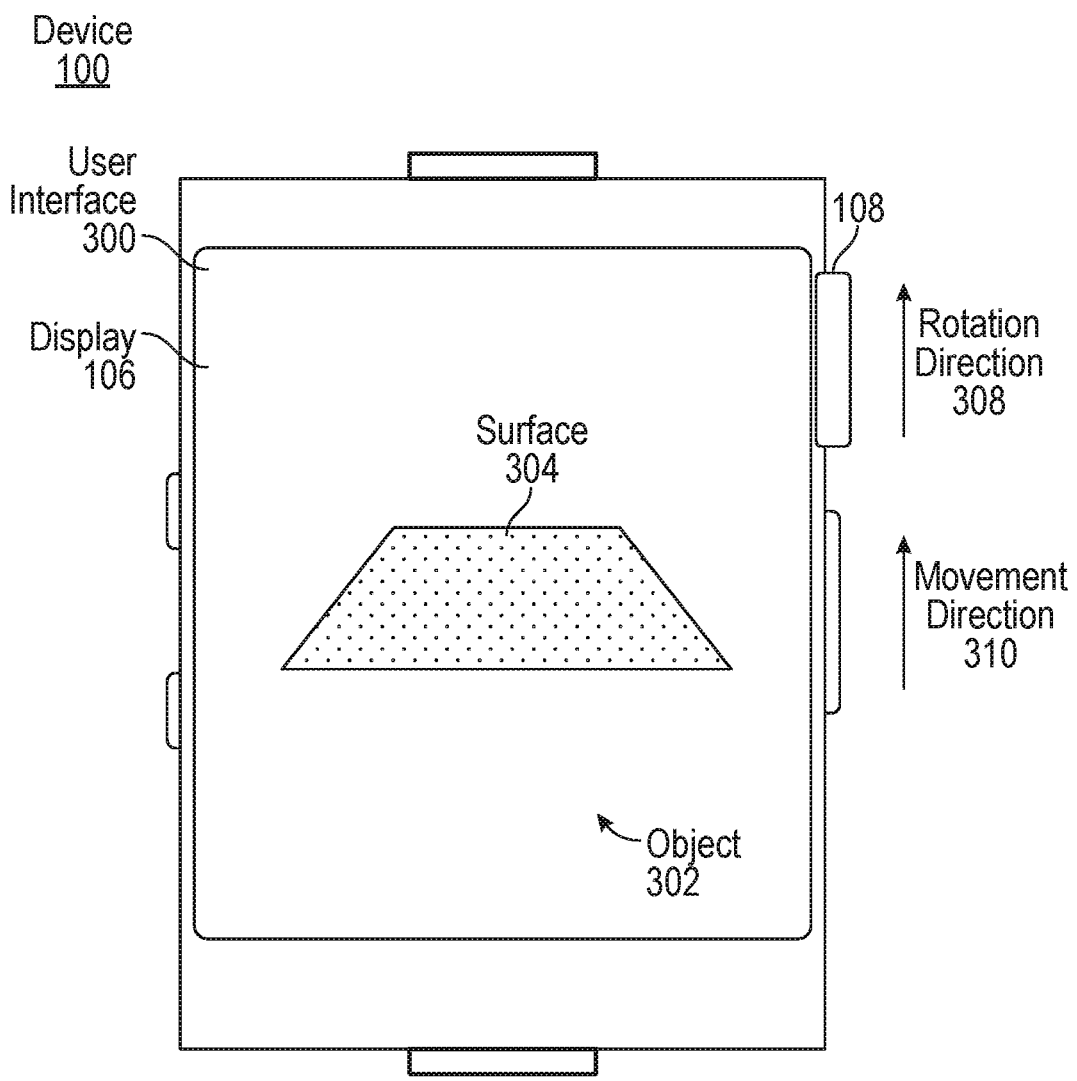
Figure 7:
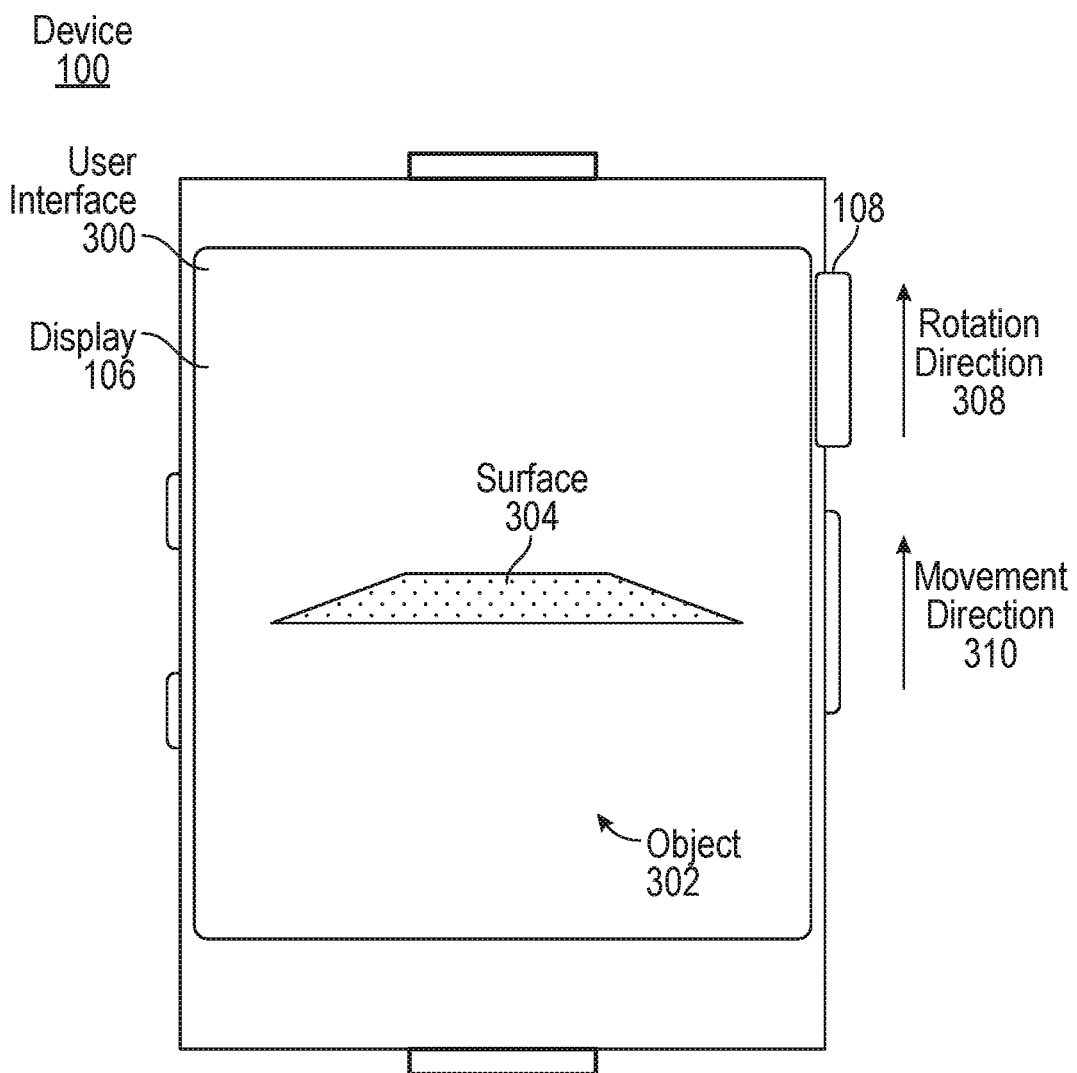
Figure 8:
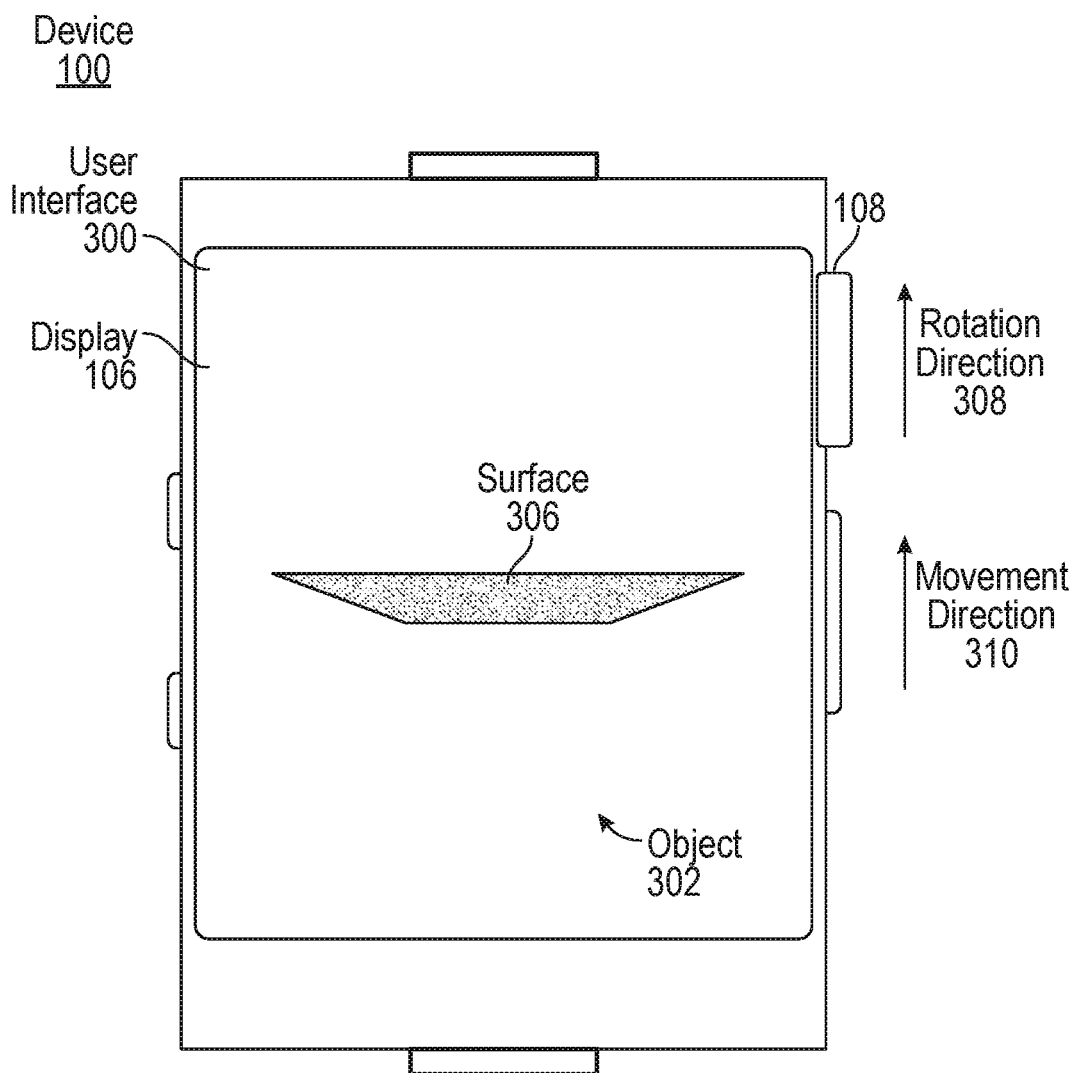
Figure 9:
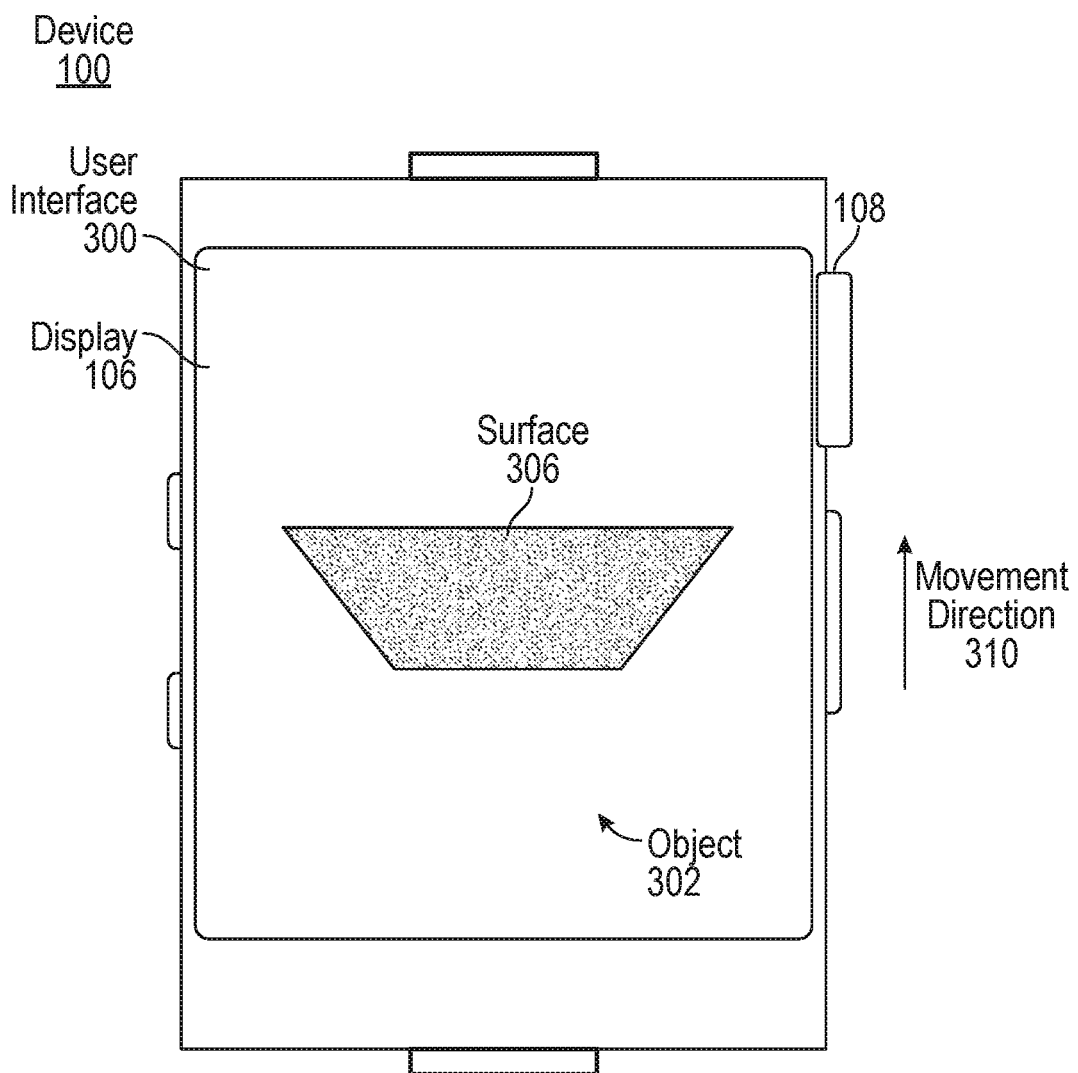
Figure 10:
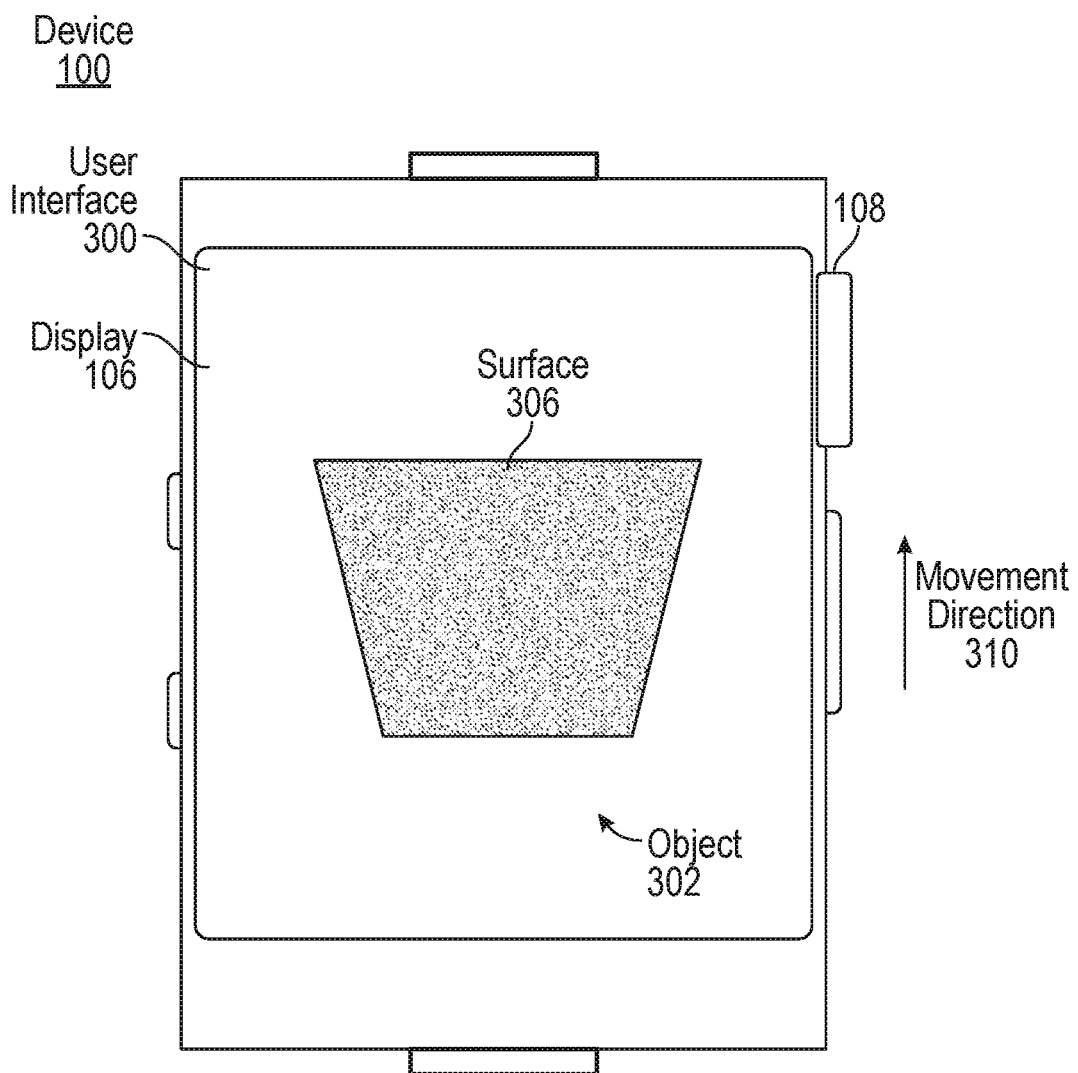
Figure 11:
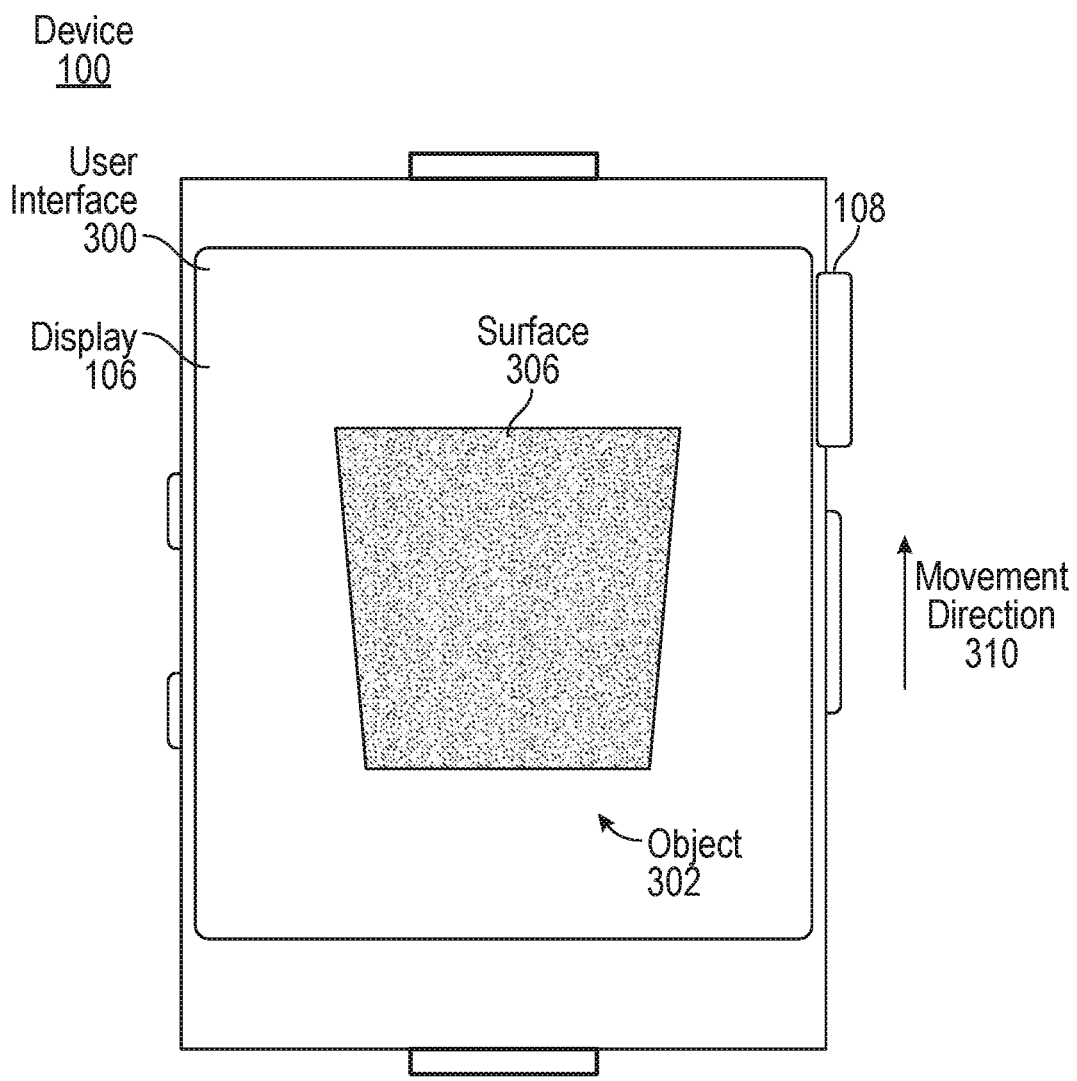
Figure 12:
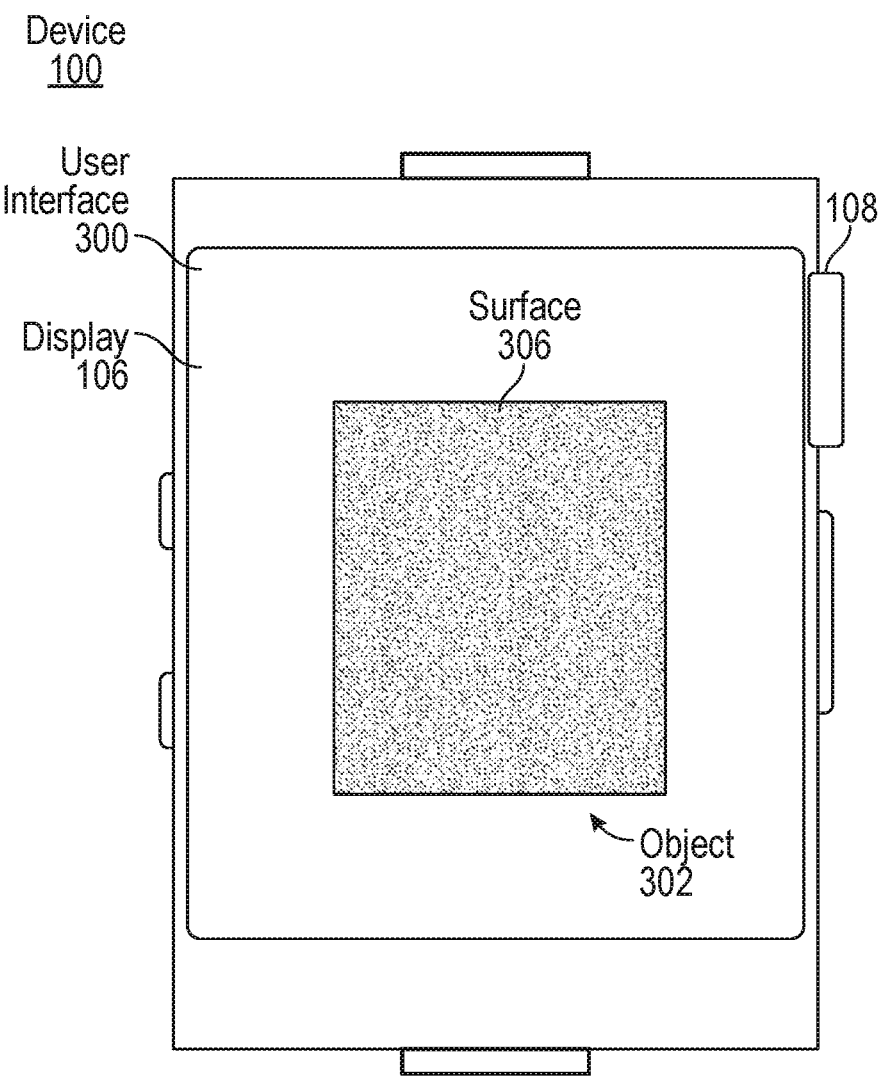

At FIGS. 5-7, device 100 continues to determine a change in the position of crown 108 in the clockwise direction, as indicated by rotation direction arrow 308. Device 100 determines a rotational speed and a direction based on the determined change in the position of crown 108. In response to determining the change in the position of crown 108, the device continues to rotate object 302, as indicated by movement direction arrow 310 and illustrated in FIG. 5-6. The rotation of object 302 is based on the determined rotational speed and direction.

In one example, the degrees of rotation of object 302, as measured from the object's position while parallel to display 106, is based on the determined speed. For easier visualization, object 302 can be thought of as having some similar qualities as an analog tachometer. As the determined speed increases, the degree of rotation of object 302 increases. In this example, if the rotation of crown 108 is maintained at a constant speed, object 302 will stay at a static rotated position that is not parallel to display 106. If the speed of the rotation of crown 108 is increased, the determined speed will increase and object 302 will rotate an additional amount.

In some examples, object 302 is configured to become perpendicular to display 106 in response to the determined speed being at a speed threshold. When the determined speed exceeds the speed threshold, object 302 exceeds a total rotation of 90 degrees, causing first surface 304 of object 302 to no longer be displayed and instead causing second surface 306 of object 302 to be displayed. This transition between the display of first surface 304 and second surface 306 is illustrated as the transition between FIGS. 7 and 8. Thus, as the determined speed exceeds the speed threshold the object 302 flips from one side to another side.

At FIGS. 9-12, device 100 determines that there is no further change in the position of crown 108. As a result of this determination, the rotation of object 302 is changed such that a surface of object 302 is parallel to display 106. This change may be animated, as illustrated in FIGS. 9-12. Device 100 will rotate object 302 such that the surface of object 302 partially facing display 106 when device 100 determines that there is no change in the position of crown 108 is the surface that will be displayed as being parallel to display 106. When a surface of object 302 is parallel to display 106 and no change in the position of crown 108 is detected, object 302 is in a steady state. An object is in a steady state when the object is not being translated, rotated, or scaled.

In some examples, when object 302 is in a steady state, the displayed surface of object 302 that is parallel to display 106 can be activated with an additional input. The displayed surface that is parallel to display 106 in a steady state is determined to be selected even prior to activation. For example, object 302 may be used as an ON/OFF switch or toggle. First surface 304 is associated with an ON instruction and second surface 306 is associated with an OFF instruction. A user can transition between the ON and OFF states by rotating crown 108 at above a speed threshold, causing object 302 to flip and display a desired surface. The desired surface is determined to be selected when the desired surface is displayed on display 106, is parallel to display 106, and no change in the position of crown 108 is detected.

While a surface is selected, the user can activate the selected surface by one or more of many techniques. For example, the user may press on touch-sensitive display 106, press on touch-sensitive display with a force greater than a predetermined threshold, press button 112, or simply allow the surface to remain selected for a predetermined amount of time. In another example, when the displayed surface is parallel to display 106, the action can be interpreted as both a selection and an activation of the data associated with the displayed surface.

Figure 13:
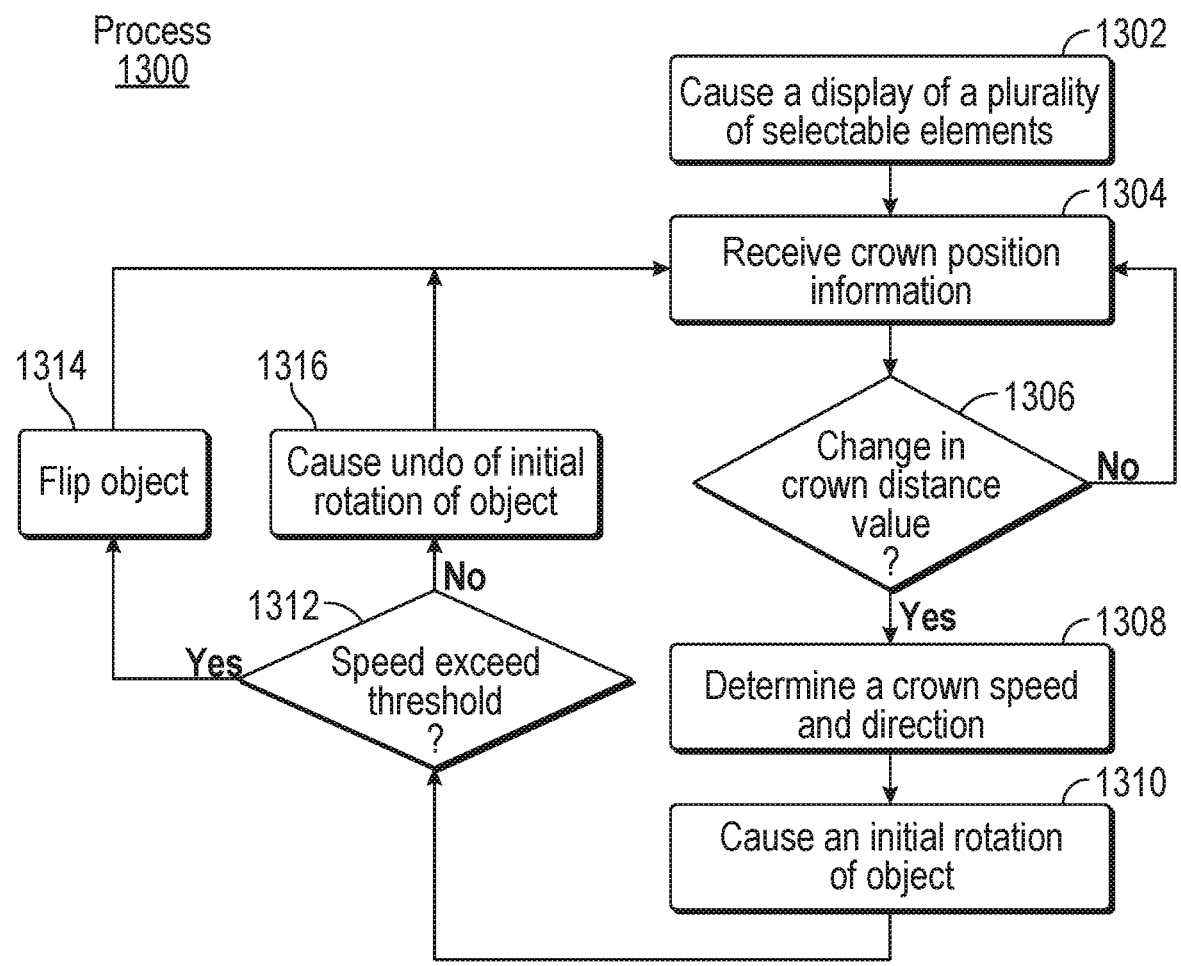
FIG. 13 illustrates an exemplary process for selecting a surface of a two-sided object in response to a rotation of a crown.

FIG. 13 illustrates an exemplary process for selecting a surface of a two-sided graphical user interface object in response to a rotation of a crown. Process 1300 is performed at a wearable electronic device (e.g., device 100 in FIG. 1) having a physical crown. In some examples, the electronic device also includes a touch-sensitive display. The process provides an efficient technique for selecting a surface of a two-sided, two-dimensional object.

At block 1302, the device causes a display of a two-sided object on a touch-sensitive display of a wearable electronic device. In some examples, the object is two-dimensional. In other examples, the object is three dimensional but only two surfaces are selectable. Each selectable surface of the object is associated with a corresponding data value. The data may be, for example, text, an image, an application icon, an instruction, a binary ON or OFF option, and the like.

At block 1304, the device receives crown position information. The crown position information may be received as a series of pulse signals, real values, integer values, and the like.

At block 1306, the device determines whether a change has occurred in a crown distance value. The crown distance value is based on an angular displacement of the physical crown of the wearable electronic device. A change in the crown distance value is indicative of a user providing input to the wearable electronic device by, for example, turning the physical crown. If the device determines that a change in the crown distance value has not occurred, the system returns to block 1304 and continues receiving crown position information. If the device determines that a change in the crown distance value has occurred, the system continues to block 1308, though the system may continue to receive crown position information.

At block 1308, the device determines a direction and a crown speed. The crown speed is based on the speed of rotation of the physical crown of the wearable electronic device. For example, the determined crown speed may be expressed as hertz, as rotations per unit of time, as rotations per frame, as revolutions per unit of time, as revolutions per frame, and the like. The determined direction is based on a direction of rotation of the physical crown of the wearable electronic device. For example, an up direction can be determined based on a clockwise rotation of the physical crown. Similarly, a down direction can be determined based on a counterclockwise rotation of the physical crown. In other examples, a down direction can be determined based on a clockwise rotation of the physical crown and an up direction can be determined based on a counterclockwise rotation of the physical crown.

At block 1310, in response to determining the change in the crown distance value, the device causes an initial rotation of the two-sided object on the display. The amount of the rotation is based on the determined crown speed. The direction of rotation is based on the determined direction. The rotation may be animated.

At block 1312, the device determines whether the determined crown speed exceeds a speed threshold. If the device determines that the determined crown speed exceeds the speed threshold, the device continues to block 1314. For example, the speed threshold may be thought of as an escape velocity (or escape speed). An escape velocity is the speed at which the kinetic energy plus the gravitational potential energy of an object is zero. If the device determines that the determined crown speed does not exceed the speed threshold, the device transitions to block 1316.

In some examples, the minimum angular velocity of crown rotation that is necessary to reach escape velocity corresponds directly to the instantaneous angular velocity of crown 108 (FIG. 1), meaning that the user interface of device 100, in essence, responds when crown 108 reaches a sufficient angular velocity. In some embodiments, the minimum angular velocity of crown rotation necessary for reaching the escape velocity is a calculated velocity that is based on, but not directly equal to, the instantaneous ("current") angular velocity of crown 108. In these examples, device 100 can maintain a calculated crown (angular) velocity V in discrete moments in time T according to equation 1:

$$V_T = V_{(T-1)} + \Delta V_{CROWN} - \Delta V_{DRAG}. \quad (\text{EQ. 1})$$

In equation 1, $V_T$ represents a calculated crown velocity (speed and direction) at time T, $V_{(T-1)}$ represents the previous velocity (speed and direction) at time T−1, $\Delta V_{CROWN}$ represents the change in velocity caused by the force being applied through the rotation of the crown at time T, and $\Delta V_{DRAG}$ represents the change in velocity due to a drag force. The force being applied, which is reflected through $\Delta V_{CROWN}$, can depend on the current velocity of angular rotation of the crown. Thus, $\Delta V_{CROWN}$ can also depend on the current angular velocity of the crown. In this way, device 100 can provide user interface interactions based not only on instantaneous crown velocity but also based on user input in the form of crown movement over multiple time intervals, even if those intervals are finely divided. Note, typically, in the absence of user input in the form of $\Delta V_{CROWN}$, $V_T$ will approach (and become) zero based on $\Delta V_{DRAG}$ in accordance with EQ. 1, but $V_T$ would not change signs without user input in the form of crown rotation ($\Delta V_{CROWN}$).

Typically, the greater the velocity of angular rotation of the crown, the greater the value of $\Delta V_{CROWN}$ will be. However, the actual mapping between the velocity of angular rotation of the crown and $\Delta V_{CROWN}$ can be varied depending on the desired user interface effect. For example, various linear or non-linear mappings between the velocity of angular rotation of the crown and $\Delta V_{CROWN}$ can be used.

Also, $\Delta V_{DRAG}$ can take on various values. For example, $\Delta V_{DRAG}$ can depend on the velocity of crown rotation such that at greater velocities, a greater opposing change in velocity ($\Delta V_{DRAG}$) can be produced. In another example, $\Delta V_{DRAG}$ can have a constant value. It should be appreciated that the above-described requirements of $\Delta V_{CROWN}$ and $\Delta V_{DRAG}$ can be changed to produce desirable user interface effects.

As can be seen from EQ. 1, the maintained velocity ($V_T$) can continue to increase as long as $\Delta V_{CROWN}$ is greater than $\Delta V_{DRAG}$. Additionally, $V_T$ can have non-zero values even when no $\Delta V_{CROWN}$ input is being received, meaning that user interface objects can continue to change without the user rotating the crown. When this occurs, objects can stop changing based on the maintained velocity at the time the user stops rotating the crown and the $\Delta V_{DRAG}$ component.

In some examples, when the crown is rotated in a direction corresponding to a rotation direction that is opposite the current user interface changes, the $V_{(T-1)}$ component can be reset to a value of zero, allowing the user to quickly change the direction of the object without having to provide a force sufficient to offset the $V_T$.

At block 1314, the device causes the object to flip past a transition position between a first surface that was last selected and a second surface. For example, the object has flipped past the transition position when the object will not return to having the first surface displayed parallel to the display without receiving additional user input. In the example of a two-sided object, the transition position may be when the surface is perpendicular to the display.

Once the object reaches a steady state, the displayed surface that is parallel to the display can be activated by a designated user input. The displayed surface that is parallel to the display in a steady state is determined to be selected even prior to activation. An object is in a steady state when the object is not being translated, rotated, or scaled. This may result in the first surface of the object no longer being displayed, in the case of a cube-shaped object.

At block 1316, because the escape velocity has not been reached, the device causes the object to at least partially return to the object's initial position at the time of block 1302. For example, part of the initial rotation of the object caused at block 2410 can be negated. To achieve this, the device animates a rotation of the object that is in an opposite direction of the initial rotation at block 1310.

FIGS. 14-23 illustrate an exemplary graphical user interface showing the selection of a surface of a cube object in response to a rotation of a crown. Object 1402 is a cube with six surfaces. In this example, four of the six surfaces are selectable. These four selectable surfaces include surface 1404 of object 1402, which is facing a viewer of display 106, the top surface of object 1402, the bottom surface of object 1402, and the back surface of object 1402. In this example, the left and right surfaces of object 1402 are not selectable. However, the left and right surfaces of object 1402 may be selectable in other examples. Although examples are described with respect to object surfaces (or planes) being parallel to display 106, the examples can also be modified to instead be described with respect to object surfaces (or planes) facing the viewer of display 106. This modification may be particularly helpful when object surfaces or display 106 is not plane surface.

Each selectable surface of object 1402 is associated with corresponding data. The data may be, for example, text, an image, an application icon, an instruction, a quad-state setting (such as Off/Low/Medium/High), and the like. A user can select a surface from among the multiple selectable surfaces of the object 1402 by using a physical crown of a wearable electronic device to rotate object 1402 to align the desired selection surface such that it is parallel to the display 106 and displayed on display 106.

Crown 108 of device 100 is a user rotatable user interface input. The crown 108 can be turned in two distinct directions: clockwise and counterclockwise. FIGS. 14-23 include rotation direction arrows illustrating the direction of crown rotation and movement direction arrows illustrating the direction of rotation of a user interface object, where applicable. The rotation direction arrows and movement direction arrows are typically not part of the displayed user interface, but are provided to aid in the interpretation of the figures. In this example, a clockwise direction rotation of crown 108 is illustrated by a rotation direction arrow pointing in the up direction. Similarly, a counterclockwise direction rotation of crown 108 is illustrated by a rotation direction arrow pointing in the down direction. The characteristics of the rotation direction arrow are not indicative of the distance, speed, or acceleration with which crown 108 is rotated by a user. Instead, the rotation direction arrow is indicative of the direction of rotation of crown 108 by the user.

Figure 14:
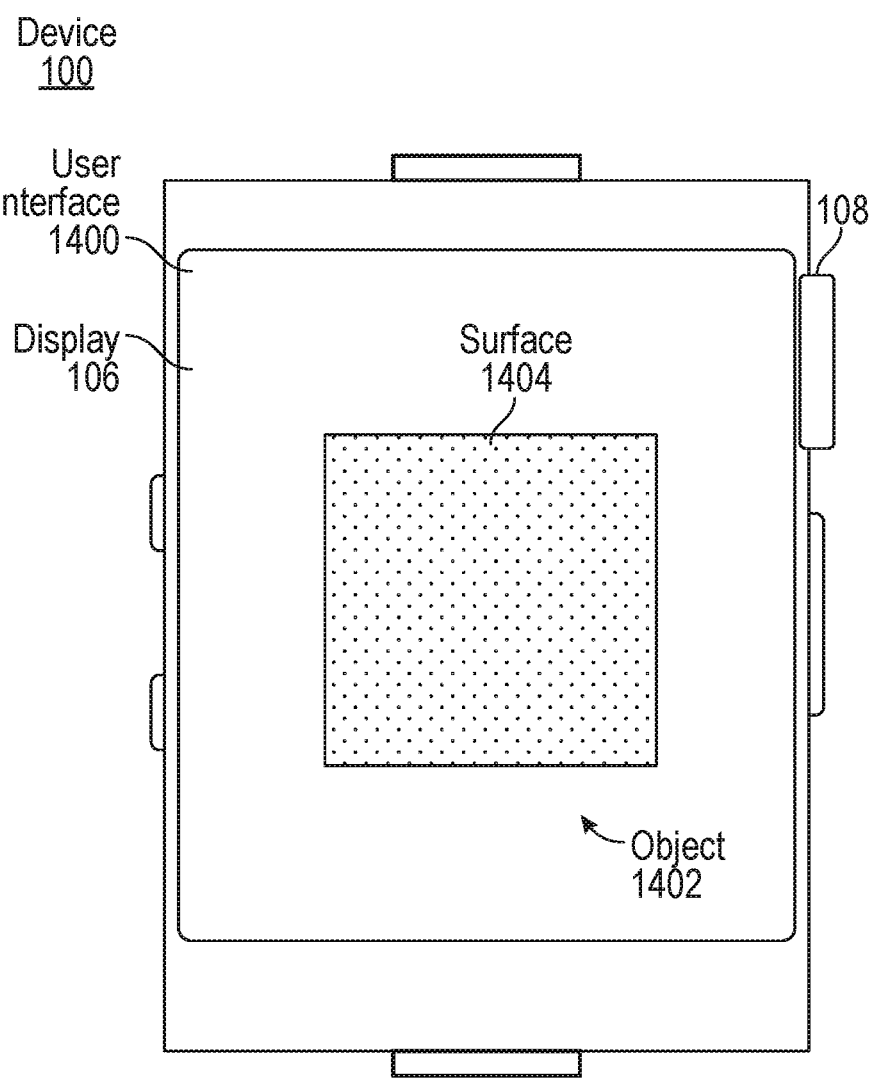
FIGS. 14-23 illustrate an exemplary graphical user interface showing the selection of a surface of an object in response to a rotation of a crown.
Figure 15:
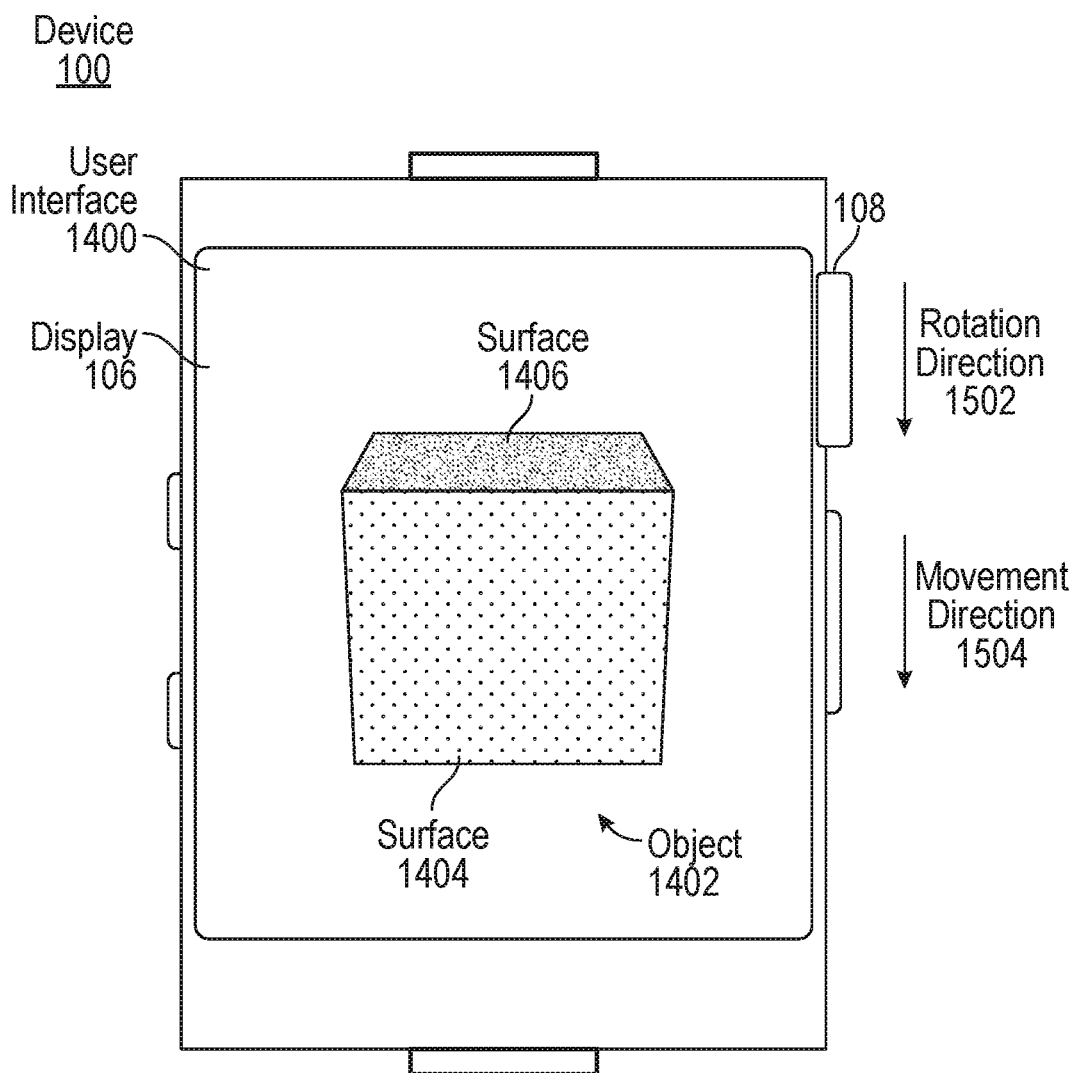

At FIG. 14, first surface 1404 of object 1402 is aligned parallel to display 106 and is displayed, indicating selection of first surface 1404. At FIG. 15, device 100 determines a change in the position of crown 108 in the counterclockwise direction, as indicated by rotation direction arrow 1502. Device 100 determines a rotational speed and a direction based on the determined change in the position of crown 108. In response to determining the change in the position of crown 108, the device rotates object 1402, as indicated by movement direction arrow 1504 and illustrated in FIG. 15. The rotation of object 1402 is based on the determined rotational speed and direction. Rotational speed may be expressed in numerous ways. For example, rotational speed may be expressed as hertz, as rotations per unit of time, as rotations per frame, as revolutions per unit of time, as revolutions per frame, and the like. In one example, object 1402 may be associated with a mass or may have a calculated rotational inertia.

Figure 16:
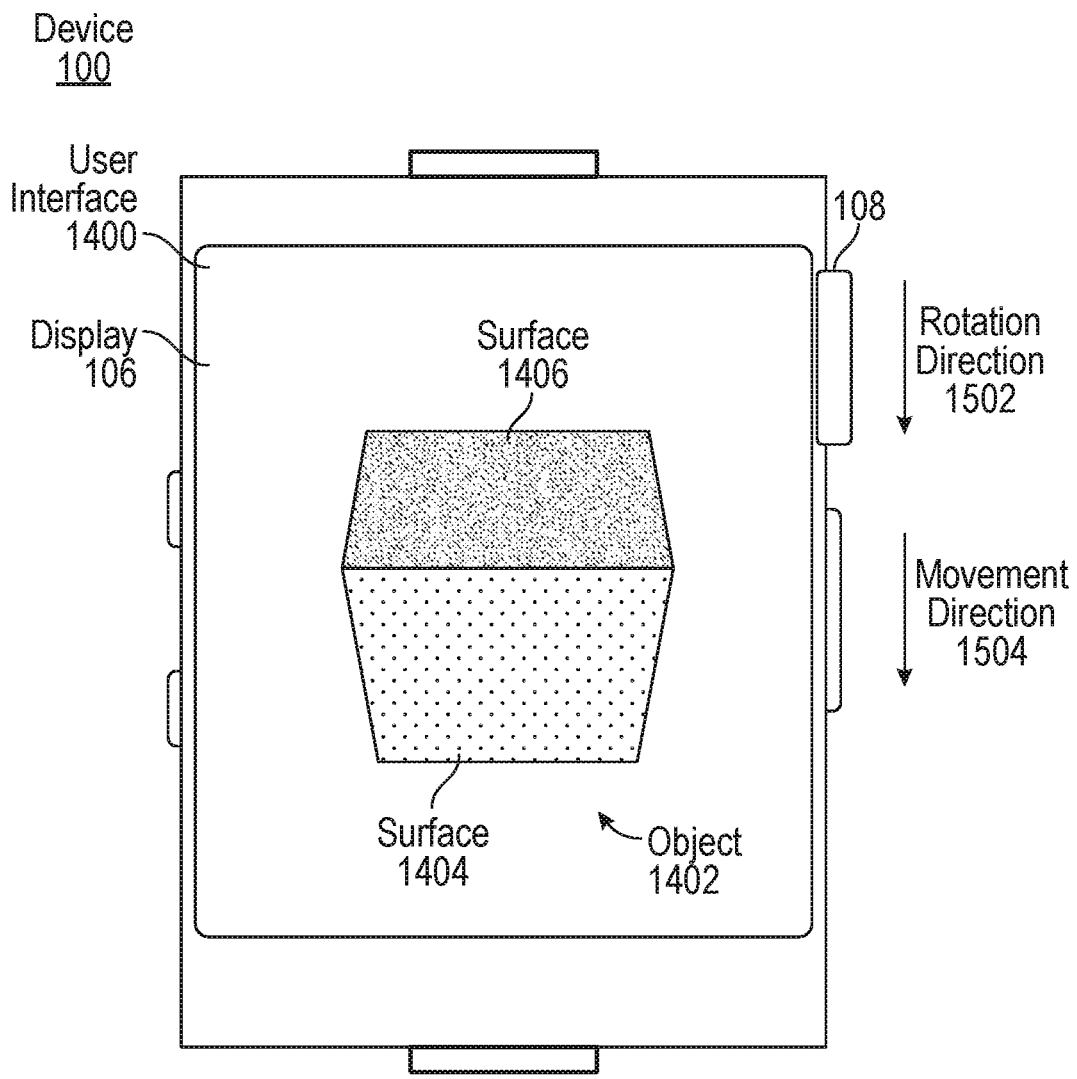

At FIG. 16, device 100 continues to determine a change in the position of crown 108 in the counterclockwise direction, as indicated by rotation direction arrow 1502. Device 100 determines a rotational speed and a direction based on the determined change in the position of crown 108. In response to determining the change in the position of crown 108, the device continues to rotate object 1402, as indicated by movement direction arrow 1504 and illustrated in FIG. 16. The rotation of object 1402 is based on the determined rotational speed and direction.

In one example, the degrees of rotation of object 1402 is based on the determined speed. As the determined speed increases, the degree of rotation of object 1402 increases. In this example, if the rotation of crown 108 is maintained at a constant speed, object 1402 will stay at a static rotated position where no surface of object 1402 is parallel to display 106. If the speed of the rotation of crown 108 is increased, the determined speed will increase and object 1402 will rotate an additional amount.

In some examples, object 1402 is configured to rotate to have a surface parallel to display 106 in response to the determined speed being above a speed threshold. When the determined speed exceeds the speed threshold, object 1402 exceeds a rotation of 45 degrees, causing first surface 1404 of object 1402 to rotate away from the display to no longer be displayed and instead causing second surface 1406 of object 1402 rotate toward the display to be displayed. This transition between the display of first surface 1404 and second surface 1406 is illustrated as the transition between FIGS. 16 and 17. Thus, as the determined speed exceeds the speed threshold, the object 1402 flips from one surface to another surface.

Figure 17:
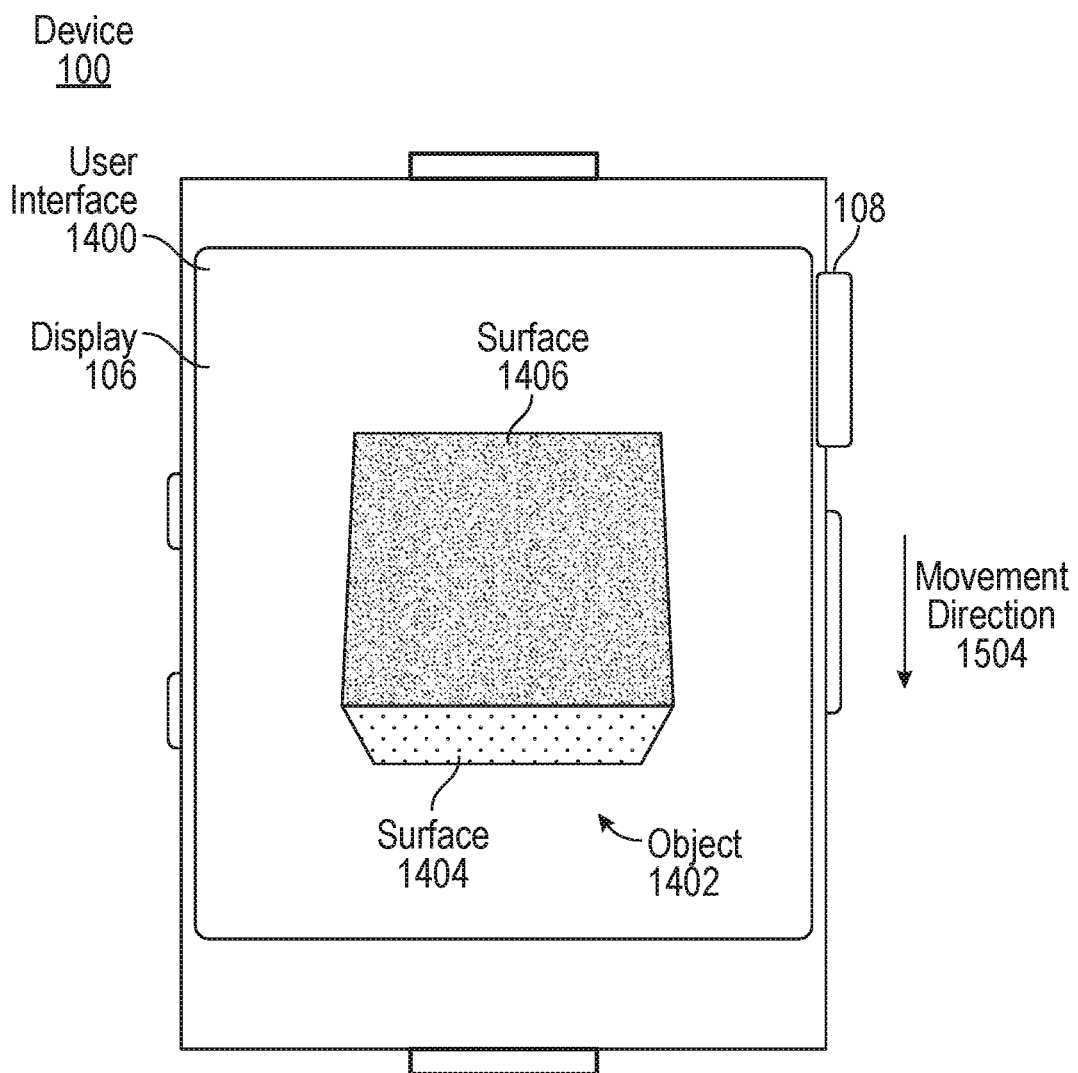
Figure 18:
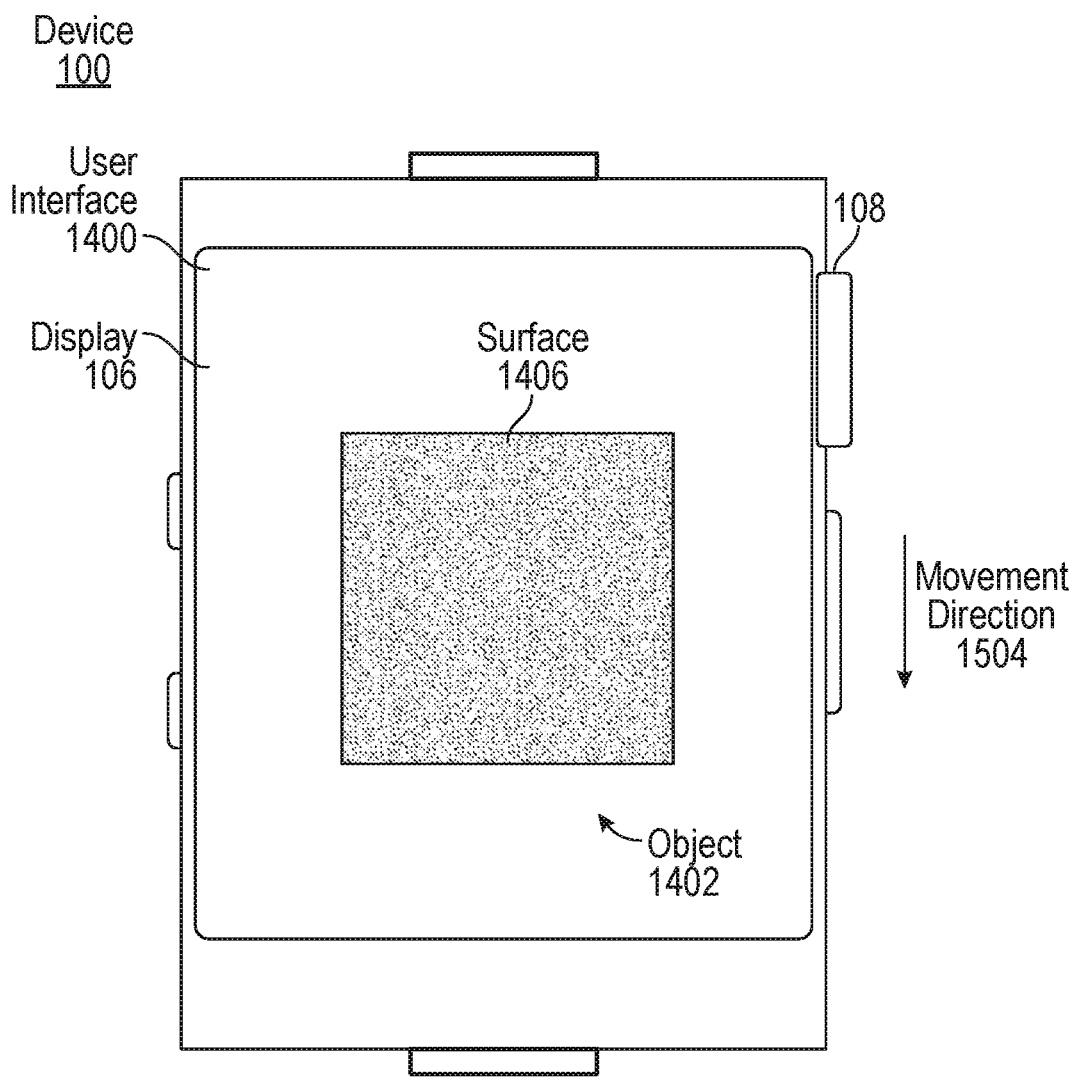
Figure 19:
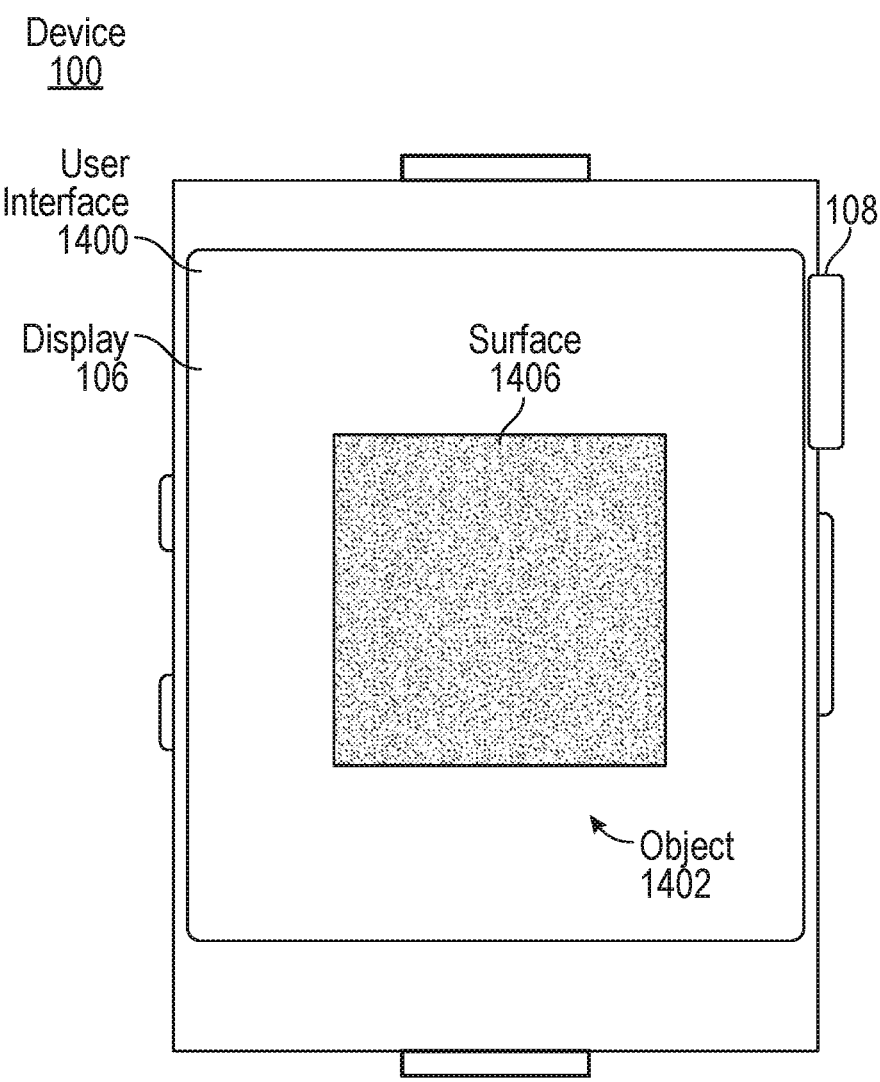
Figure 20:
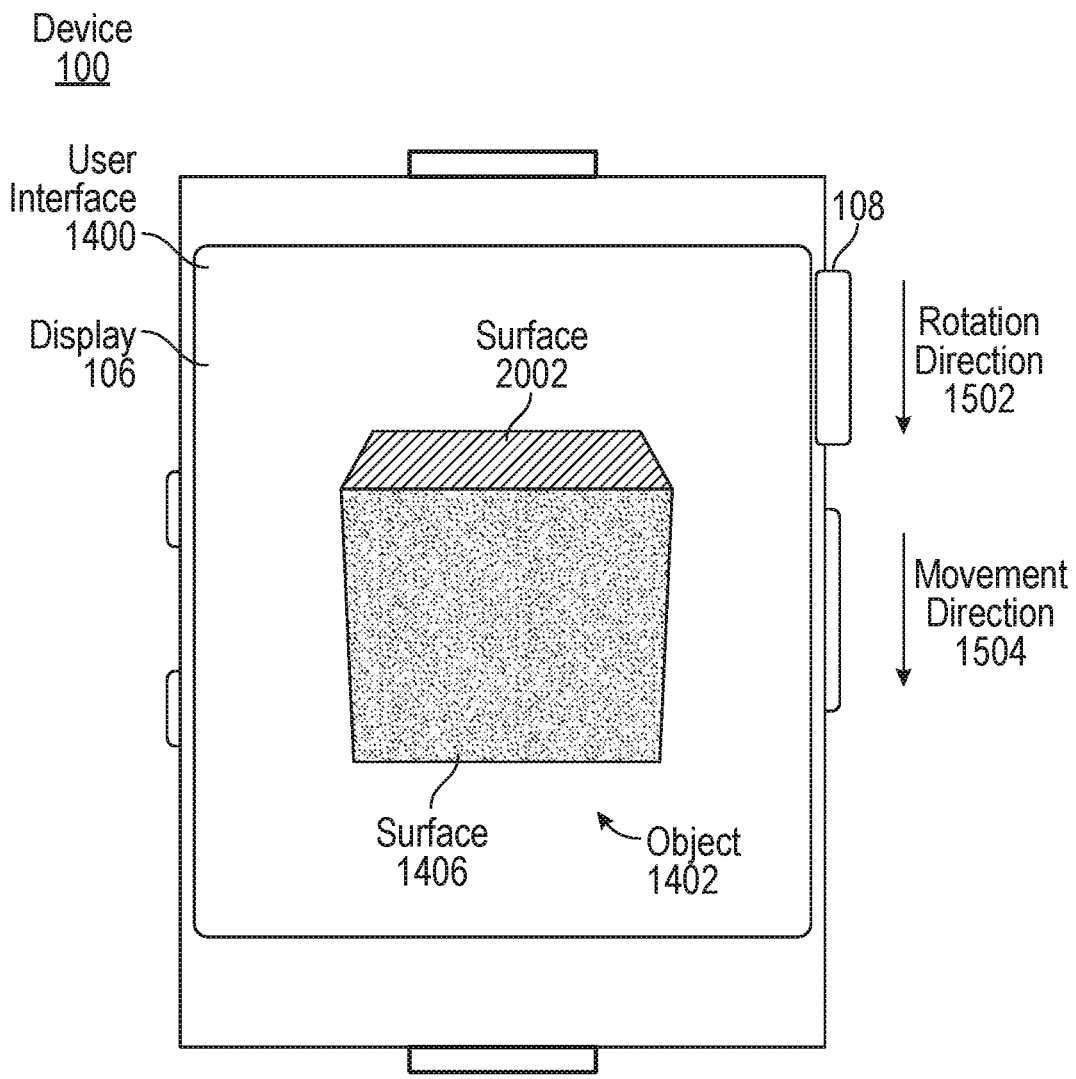

At FIGS. 17-18, device 100 determines that there is no change in the position of crown 108. As a result of this determination, object 1402 is rotated such that a displayed surface of object 1402 is parallel to display 106. This rotation may be animated, as illustrated in FIGS. 17-18. Device 100 will rotate object 1402 such that the displayed surface of object 1402 that has the smallest angle with respect to the display is made parallel to the display 106. In other words, the object's surface that best faces the display 106 or is closest to parallel to display 106 is made parallel to the display 106. When a surface of object 1402 is parallel to display 106 and no change in the position of crown 108 is detected, object 1402 is in a steady state. An object is in a steady state when the object is not being translated, rotated, or scaled.

In some examples, when object 1402 is in a steady state, the surface of object 1402 that is parallel to display 106 and displayed on display 106 is determined to be selected. For example, object 1402 may be used as four-phase selection switch. First surface 1404 is associated with a LOW setting instruction and second surface 1406 is associated with a MEDIUM instruction setting. The remaining two selectable surfaces are associated with HIGH and OFF instruction settings. A user can transition between the four settings by rotating crown 108 at above a speed threshold, causing object 1402 to flip and display a desired surface. The desired surface is determined to be selected when the displayed surface is parallel to display 106 and no change in the position of crown 108 is detected.

While a surface is selected, the user can activate the selected surface by one or more of many techniques. For example, the user may press on touch-sensitive display 106, press button 112, or simply allow the surface to remain selected for a predetermined amount of time. In another example, when the displayed surface is parallel to display 106, the action can be interpreted as both a selection and an activation of the data associated with the displayed surface.

Figure 21:
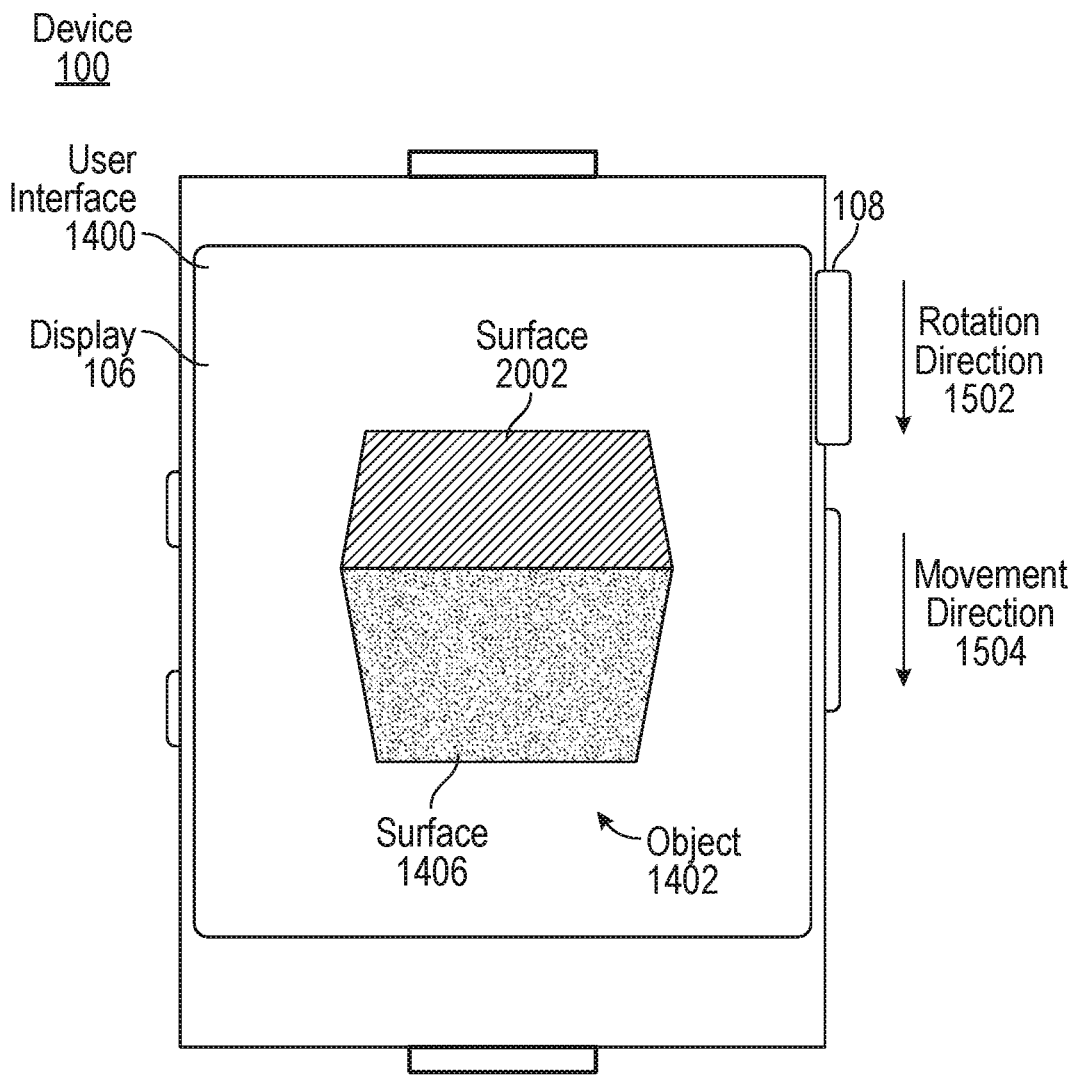
Figure 22:
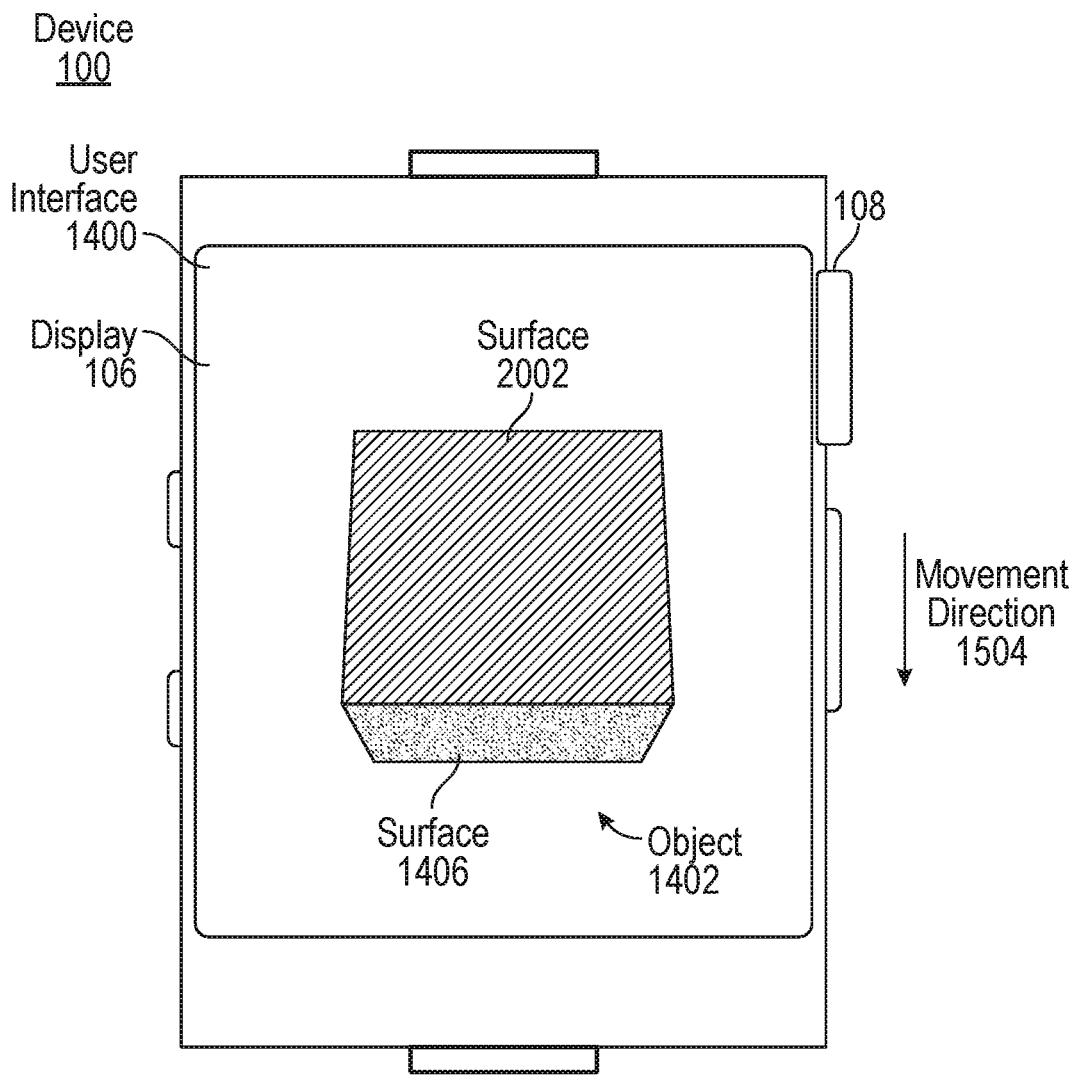

FIGS. 20-23 illustrate a second flip of object 1402 to select third surface 2002 of object 1402. In FIGS. 21-22, device 100 determines a change in the position of crown 108 in the counterclockwise direction, as indicated by rotation direction arrow 1502. Device 100 determines a rotational speed and a direction based on the determined change in the position of crown 108. In response to determining the change in the position of crown 108, the device rotates object 1402, as indicated by movement direction arrow 1504 and illustrated in FIG. 21-22. The rotation of object 1402 is based on the determined rotational speed and direction.

Figure 23:
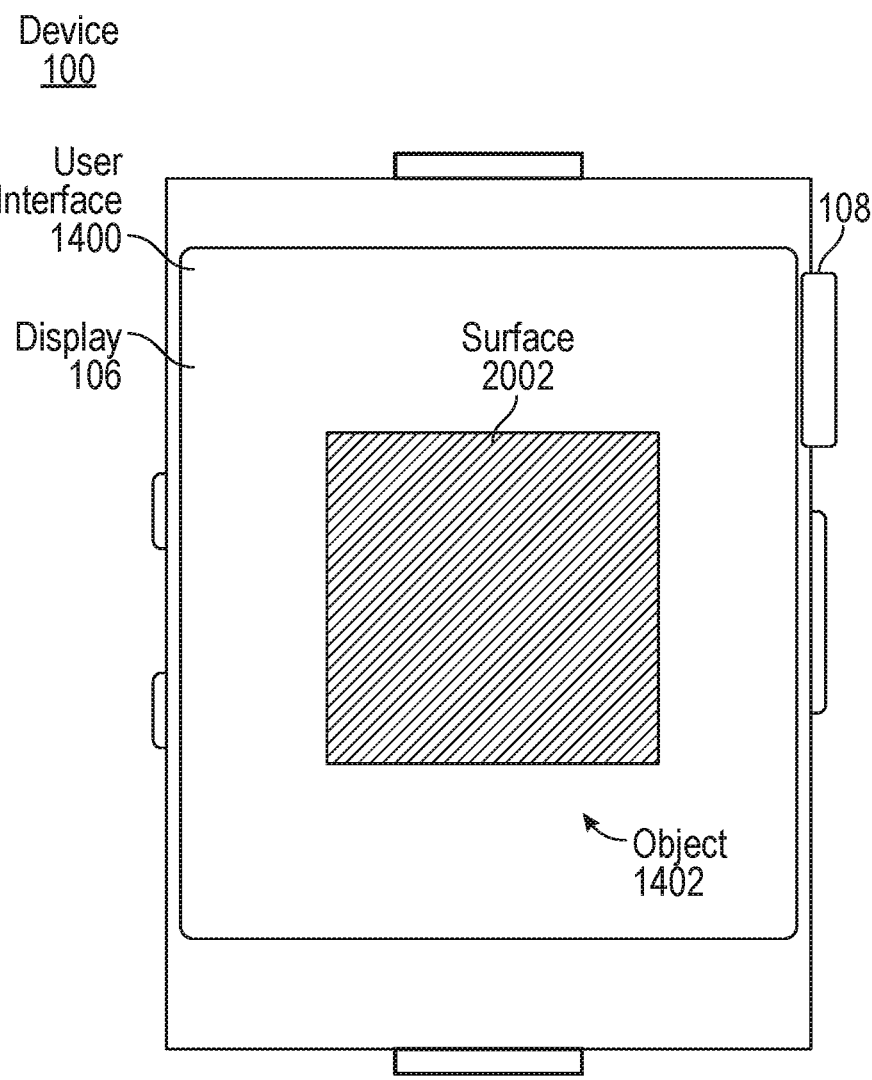

In response to the rotational speed exceeding a threshold, object 1402 flips to cause third surface 2002 to be parallel to display 106 and to be displayed on display 106, as illustrated in FIG. 23. An object is in a steady state when the object is not being translated, rotated, or scaled. When object 1402 is in a steady state, the surface of object 1402 that is parallel to display 106 and displayed on display 106 is determined to be selected. In this example, third surface 2002 is selected.

Figure 24:
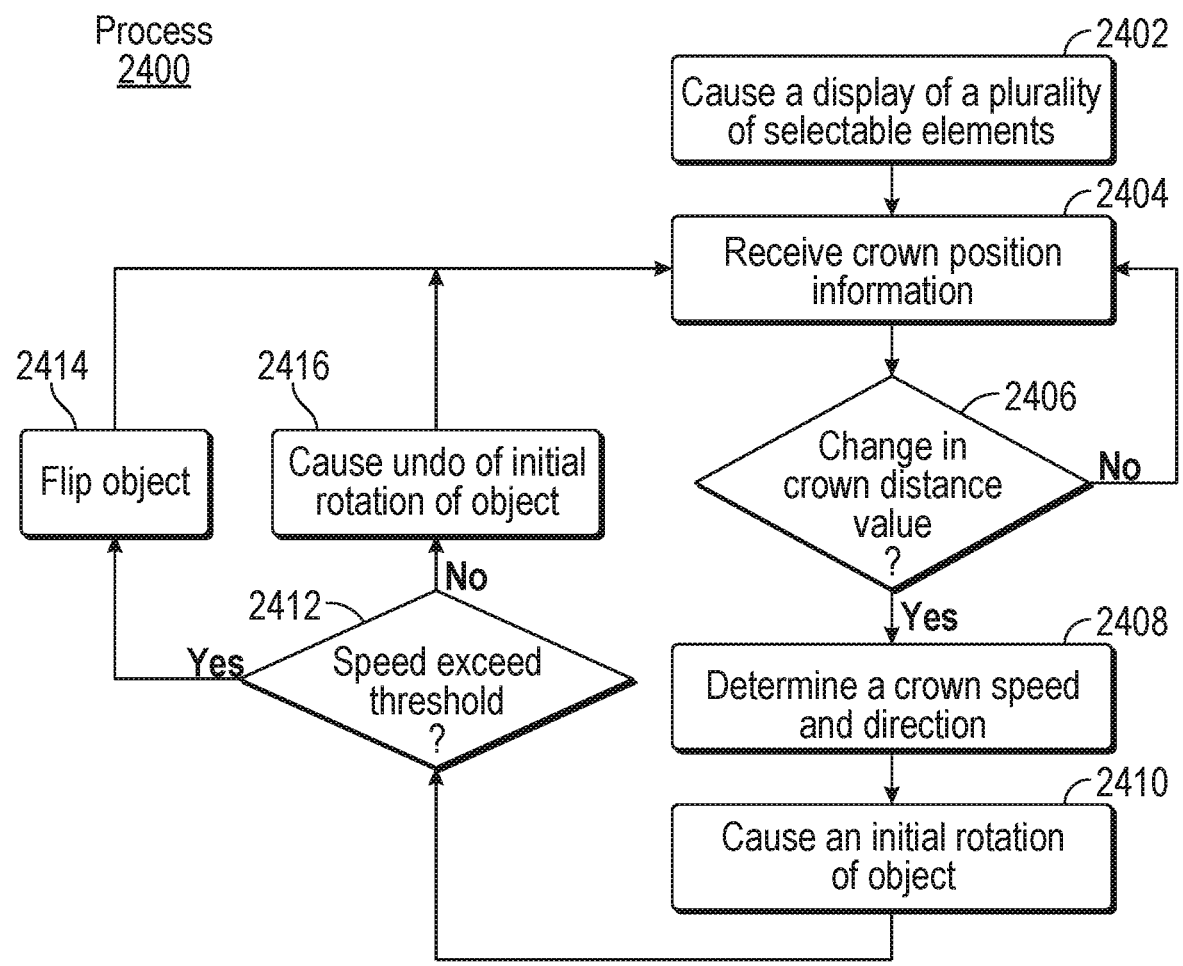
FIG. 24 illustrates an exemplary process for selecting a surface of an object in response to a rotation of a crown.

FIG. 24 illustrates an exemplary process for selecting a surface of a multi-sided graphical user interface object in response to a rotation of a crown. Process 2400 is performed at a wearable electronic device (e.g., device 100 in FIG. 1) having a physical crown. In some examples, the electronic device also includes a touch-sensitive display. The process provides an efficient technique for selecting a surface of a multi-sided, three-dimensional object.

At block 2402, the device causes a display of a multi-sided object on a touch-sensitive display of a wearable electronic device. Each selectable surface of the object is associated with a corresponding data value. The data may be, for example, text, an image, an application icon, an instruction, and the like.

At block 2404, the device receives crown position information. The crown position information may be received as a series of pulse signals, real values, integer values, and the like.

At block 2406, the device determines whether a change has occurred in a crown distance value. The crown distance value is based on an angular displacement of the physical crown of the wearable electronic device. A change in the crown distance value is indicative of a user providing input to the wearable electronic device by, for example, turning the physical crown. If the device determines that a change in the crown distance value has not occurred, the system returns to block 2404 and continues receiving crown position information. If the device determines that a change in the crown distance value has occurred, the system continues to block 2408, though the system may continue to receive crown position information.

At block 2408, the device determines a direction and a crown speed. The crown speed is based on the speed of rotation of the physical crown of the wearable electronic device. For example, the determined crown speed may be expressed as hertz, as rotations per unit of time, as rotations per frame, as revolutions per unit of time, as revolutions per frame, and the like. The determined direction is based on a direction of rotation of the physical crown of the wearable electronic device. For example, an up direction can be determined based on a clockwise rotation of the physical crown. Similarly, a down direction can be determined based on a counterclockwise rotation of the physical crown. In other examples, a down direction can be determined based on a clockwise rotation of the physical crown and an up direction can be determined based on a counterclockwise rotation of the physical crown.

At block 2410, in response to determining the change in the crown distance value, the device causes an initial rotation of the multi-sided object on the display. The amount of the rotation is based on the determined crown speed. The direction of rotation is based on the determined direction. The rotation may be animated.

At block 2412, the device determines whether the determined crown speed exceeds a speed threshold. If the device determines that the determined crown speed exceeds the speed threshold, the device continues to block 2414. For example, the speed threshold may be thought of as an escape velocity (or escape speed). An escape velocity is the speed at which the kinetic energy plus the gravitational potential energy of an object is zero. If the device determines that the determined speed does not exceed the speed threshold, the device continues to block 2416.

In some examples, the minimum angular velocity of crown rotation that is necessary to reach escape velocity corresponds directly to the instantaneous angular velocity of crown 108 (FIG. 1), meaning that the user interface of device 100, in essence, responds when crown 108 reaches a sufficient angular velocity. In some embodiments, the minimum angular velocity of crown rotation necessary for reaching the escape velocity is a calculated velocity that is based on, but not directly equal to, the instantaneous ("current") angular velocity of crown 108. In these examples, device 100 can maintain a calculated crown (angular) velocity V in discrete moments in time T according to equation 1:

$$V_T = V_{(T-1)} + \Delta V_{CROWN} - \Delta V_{DRAG}. \quad (EQ. 1)$$

In equation 1, $V_T$ represents a calculated crown velocity (speed and direction) at time T, $V_{(T-1)}$ represents the previous velocity (speed and direction) at time T−1, $\Delta V_{CROWN}$ represents the change in velocity caused by the force being applied through the rotation of the crown at time T, and $\Delta V_{DRAG}$ represents the change in velocity due to a drag force. The force being applied, which is reflected through $\Delta V_{CROWN}$, can depend on the current velocity of angular rotation of the crown. Thus, $\Delta V_{CROWN}$ can also depend on the current angular velocity of the crown. In this way, device 100 can provide user interface interactions based not only on instantaneous crown velocity but also based on user input in the form of crown movement over multiple time intervals, even if those intervals are finely divided. Note, typically, in the absence of user input in the form of $\Delta V_{CROWN}$, $V_T$ will approach (and become) zero based on $\Delta V_{DRAG}$ in accordance with EQ. 1, but $V_T$ would not change signs without user input in the form of crown rotation ($\Delta V_{CROWN}$).

Typically, the greater the velocity of angular rotation of the crown, the greater the value of $\Delta V_{CROWN}$ will be. However, the actual mapping between the velocity of angular rotation of the crown and $\Delta V_{CROWN}$ can be varied depending on the desired user interface effect. For example, various linear or non-linear mappings between the velocity of angular rotation of the crown and $\Delta V_{CROWN}$ can be used.

Also, $\Delta V_{DRAG}$ can take on various values. For example, $\Delta V_{DRAG}$ can depend on the velocity of crown rotation such that at greater velocities, a greater opposing change in velocity ($\Delta V_{DRAG}$) can be produced. In another example, $\Delta V_{DRAG}$ can have a constant value. It should be appreciated that the above-described requirements of $\Delta V_{CROWN}$ and $\Delta V_{DRAG}$ can be changed to produce desirable user interface effects.

As can be seen from EQ. 1, the maintained velocity ($V_T$) can continue to increase as long as $\Delta V_{CROWN}$ is greater than $\Delta V_{DRAG}$. Additionally, $V_T$ can have non-zero values even when no $\Delta V_{CROWN}$ input is being received, meaning that user interface objects can continue to change without the user rotating the crown. When this occurs, objects can stop changing based on the maintained velocity at the time the user stops rotating the crown and the $\Delta V_{DRAG}$ component.

In some examples, when the crown is rotated in a direction corresponding to a rotation direction that is opposite the current user interface changes, the $V_{(T-1)}$ component can be reset to a value of zero, allowing the user to quickly change the direction of the object without having to provide a force sufficient to offset the $V_T$.

At block 2414, the device causes the object to flip past a transition position between a first surface that was last selected and a new surface. For example, the object has flipped past the transition position when the object will not return to having the first surface displayed parallel to the display without receiving additional user input.

Once the object reaches a steady state, the displayed surface that is parallel to the display can be activated through a designated user input. The displayed surface parallel to the display in the steady state is determined to be selected even before activation. An object is in a steady state when the object is not being translated, rotated, or scaled. This may result in the first surface of the object no longer being displayed, in the case of a cube-shaped object.

At block 2416, because the escape velocity has not been reached, the device causes the object to at least partially return to the object's initial position at the time of block 2408. For example, part of the initial rotation of the object caused at block 2410 can be negated. To achieve this, the device animates a rotation of the object that is in an opposite direction of the initial rotation at block 2410.

Figure 25:
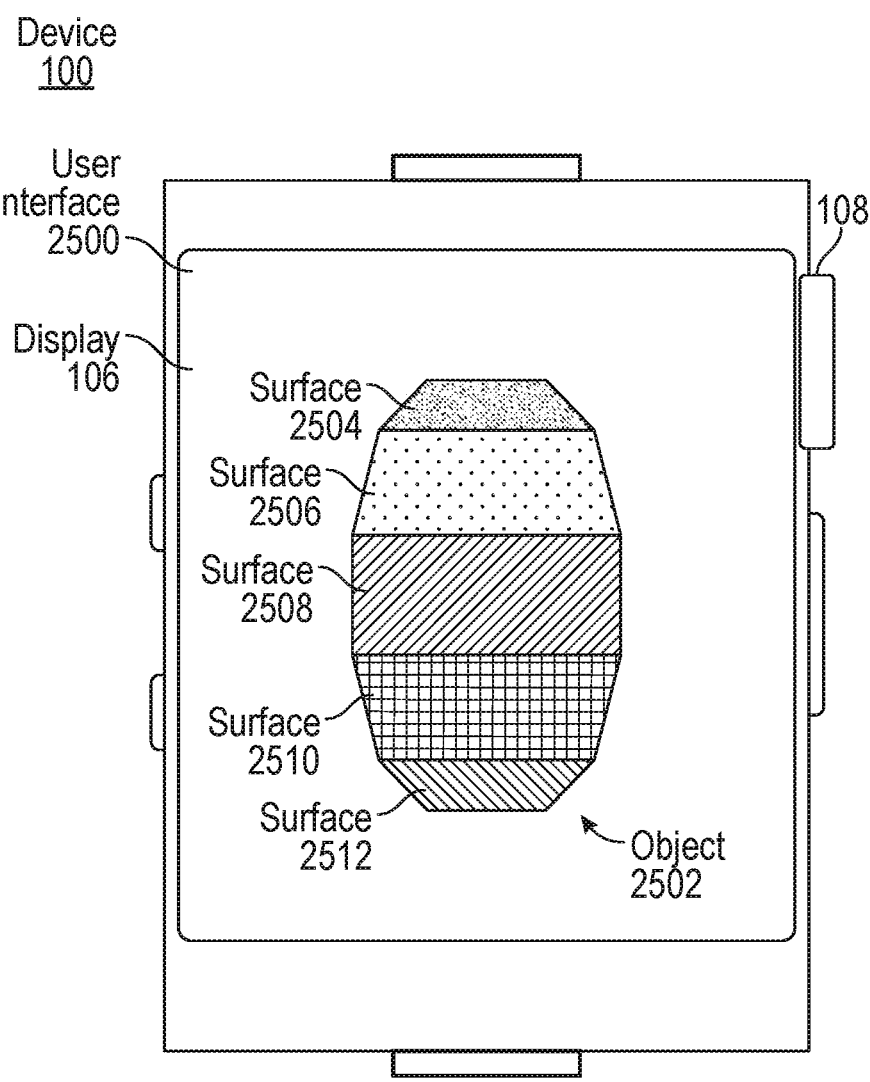
FIG. 25 illustrates an exemplary multi-sided object in a graphical user interface.

FIG. 25 illustrates a graphical user interface 2500 showing the selection of a surface 2506 of a multi-sided object in response to a rotation of a crown. Object 2502 is a 12-sided rotatable dial, shaped similar to a wheel. Object 2502 is rotatable along a fixed axis. In this example, all 12 surfaces of object 2502 are selectable. These 12 selectable surfaces include surface 2504, surface 2506, surface 2508, surface 2510, and surface 2512. In FIG. 25, surface 2508 is selected because surface 2508 is parallel to display 106 and is displayed on display 106. The selectable surfaces of object 2505 can be selected according to the processes and techniques described in other examples.

In some examples, device 100 can provide haptic feedback based on the content displayed on the display 106. When a user interface object is displayed on display 106, the device can modify the appearance of the object based on a change in a crown distance value received at the device 100 based on a rotation of crown 108. When a criterion is satisfied, a tactile output is output at the device 100.

In one example, the object is a rotatable multi-sided object, such as is described above. The criterion is satisfied when a surface of the multi-sided object is selected. In another example, the criterion is satisfied each time a displayed surface of the multi-sided object passes through a plane parallel to the display.

Figure 26:
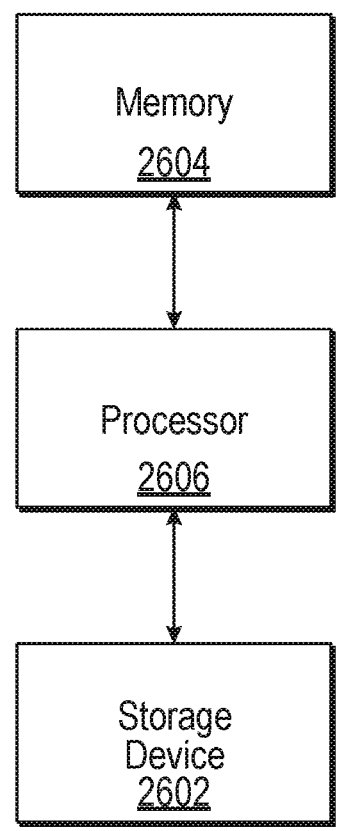
FIG. 26 illustrates an exemplary computing system for manipulating a user interface in response to a rotation of a crown according to various examples.

One or more of the functions relating to a user interface can be performed by a system similar or identical to system 2600 shown in FIG. 26. System 2600 can include instructions stored in a non-transitory computer readable storage medium, such as memory 2604 or storage device 2602, and executed by processor 2606. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM), a read-only memory (ROM), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

In some examples, system 2600 can be included within device 100. In these examples, processor 2606 can be the same or a different process than processor 202. Processor 2606 can be configured to receive the output from encoder 204, buttons 110, 112, and 114, and from touch-sensitive display 106. Processor 2606 can process these inputs as described above with respect to the processes described and illustrated. It is to be understood that the system is not limited to the components and configuration of FIG. 26, but can include other or additional components in multiple configurations according to various examples.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. An electronic device comprising:
   a physical crown;
   a display;
   one or more processors coupled to the physical crown and the display; and
   memory storing one or more programs, the one or more programs configured to be executed by the one or more processors, the one or more programs including instructions for:
   displaying a user interface in a first state;
   while displaying the user interface in the first state, detecting an input that includes a rotation of the physical crown of the electronic device in a first direction;
   determining a speed of the rotation in the first direction, wherein the speed is based on an angular velocity of the physical crown during the detected rotation;
   in response to detecting the input that includes a rotation of the physical crown in the first direction, displaying, on the display, an animation starting a transition of the user interface from the first state to a second state; and after starting the transition of the user interface from the first state to the second state and while continuing to detect the input that includes rotation of the physical crown in the first direction:

in accordance with a determination that the speed of the rotation of the physical crown in the first direction during the input exceeds a first speed threshold, displaying, on the display, a transition of the user interface to the second state;

in accordance with a determination that the speed of the rotation of the physical crown in the first direction during the input exceeds the first speed threshold after the transition to the second state, displaying, on the display, a transition of the user interface to a third state; and in accordance with a determination that the speed of the rotation of the physical crown in the first direction during the input is below the first speed threshold before the transition to the second state displaying, on the display, a transition of the user interface back towards the first state.

2. The electronic device of claim 1, wherein the transition of the user interface from the first state to the second state comprises an animation of translating, in a second direction, a surface of the first state and a surface of the second state.

3. The electronic device of claim 2, wherein the transition of the user interface back towards the first state comprises an animation of translating, in a third direction opposite to the second direction, a surface of the first state and a surface of the second state.

4. The electronic device of claim 1, wherein the transition of the user interface from the first state to the second state includes displaying, on the display, the second state and at least a portion of the first state, wherein a display area of the second state is larger than a display area of the at least the portion of the first state.

5. The electronic device of claim 1, wherein the transition of the user interface back towards the first state includes displaying, on the display, the first state and at least a portion of the second state, wherein a display area of the first state is larger than a display area of the at least the portion of the second state.

6. The electronic device of claim 1, wherein the one or more programs further include instructions for:

associating the first state with a first data;
associating the second state with a second data, wherein the first data and the second data are different; and
in response to the speed of the rotation of the physical crown during the input exceeding the first speed threshold, displaying the second data at a location corresponding to the second state without displaying the first data.

7. The electronic device of claim 1, wherein the one or more programs further include instructions for:

associating the first state with a first data;
associating the second state with a second data, wherein the first data and the second data are different; and
in response to the speed of the rotation of the physical crown during the input not exceeding the first speed threshold, displaying the first data at a location corresponding to the first state without displaying the second data.

8. The electronic device of claim 1, wherein the electronic device further includes a touch-sensitive surface and wherein the one or more programs further include instructions for:

while the second state is displayed, detecting a user input on the touch-sensitive surface of the electronic device at a location corresponding to the second state; and
in response to detecting the user input, selecting the second state.

9. The electronic device of claim 1, wherein the one or more programs further include instructions for:

detecting a user input corresponding to a second rotation of the physical crown while displaying the user interface; and
in response to detecting the user input corresponding to a second rotation, generating a haptic output.

10. The electronic device of claim 1, wherein the physical crown is a mechanical crown.

11. A non-transitory computer-readable storage medium comprising one or more programs for execution by one or more processors of an electronic device with a physical crown and a display, the one or more programs including instructions for:

displaying a user interface in a first state;
while displaying the user interface in the first state, detecting an input that includes a rotation of the physical crown of the electronic device in a first direction;
determining a speed of the rotation in the first direction, wherein the speed is based on an angular velocity of the physical crown during the detected rotation;
in response to detecting the input that includes a rotation of the physical crown in the first direction, displaying, on the display, an animation starting a transition of the user interface from the first state to a second state; and
after starting the transition of the user interface from the first state to the second state and while continuing to detect the input that includes rotation of the physical crown in the first direction:

in accordance with a determination that the speed of the rotation of the physical crown in the first direction during the input exceeds a first speed threshold, displaying, on the display, a transition of the user interface to the second state;

in accordance with a determination that the speed of the rotation of the physical crown in the first direction during the input exceeds the first speed threshold after the transition to the second state, displaying, on the display, a transition of the user interface to a third state; and in accordance with a determination that the speed of the rotation of the physical crown in the first direction during the input is below the first speed threshold before the transition to the second state, displaying; on the display, a transition of the user interface back towards the first state.

12. The non-transitory computer-readable storage medium of claim 11, wherein the transition of the user interface from the first state to the second state comprises an animation of translating, in a second direction, a surface of the first state and a surface of the second state.

13. The non-transitory computer-readable storage medium of claim 11, wherein the transition of the user interface back towards the first state comprises an animation of translating, in a third direction opposite to the second direction, a surface of the first state and a surface of the second state.

14. The non-transitory computer-readable storage medium of claim 11, wherein the transition of the user interface from the first state to the second state includes displaying, on the display, the second state and at least a portion of the first state, wherein a display area of the second state is larger than a display area of the at least the portion of the first state.

15. The non-transitory computer-readable storage medium of claim 11, wherein the transition of the user interface back towards the first state includes displaying, on the display, the first state and at least a portion of the second state, wherein a display area of the first state is larger than a display area of the at least the portion of the second state.

16. The non-transitory computer-readable storage medium of claim 11, wherein the one or more programs further include instructions for:
associating the first state with a first data;
associating the second state with a second data, wherein the first data and the second data are different; and
in response to the speed of the rotation of the physical crown during the input exceeding the first speed threshold, displaying the second data at a location corresponding to the second state without displaying the first data.

17. The non-transitory computer-readable storage medium of claim 11, wherein the one or more programs further include instructions for:
associating the first state with a first data;
associating the second state with a second data, wherein the first data and the second data are different; and
in response to the speed of the rotation of the physical crown during the input not exceeding the first speed threshold, displaying the first data at a location corresponding to the first state without displaying the second data.

18. The non-transitory computer-readable storage medium of claim 11, wherein the electronic device further includes a touch-sensitive surface and wherein the one or more programs further include instructions for:
while the second state is displayed, detecting a user input on the touch-sensitive surface of the electronic device at a location corresponding to the second state; and
in response to detecting the user input, selecting the second state.

19. The non-transitory computer-readable storage medium of claim 11, wherein the one or more programs further include instructions for:
detecting a user input corresponding to a second rotation of the physical crown while displaying the user interface; and
in response to detecting the user input corresponding to a second rotation, generating a haptic output.

20. The non-transitory computer-readable storage medium of claim 11, wherein the physical crown is a mechanical crown.

21. A method comprising:
at an electronic device with a physical crown and a display:
displaying a user interface in a first state;
while displaying the user interface in the first state, detecting an input that includes a rotation of the physical crown of the electronic device in a first direction;
determining a speed of the rotation in the first direction, wherein the speed is based on an angular velocity of the physical crown during the detected rotation;
in response to detecting the input that includes a rotation of the physical crown in the first direction, displaying, on the display, an animation starting a transition of the user interface from the first state to a second state; and
after starting the transition of the user interface from the first state to the second state and while continuing to detect the input that includes rotation of the physical crown in the first direction:
in accordance with a determination that the speed of the rotation of the physical crown in the first direction during the input exceeds a first speed threshold, displaying, on the display, a transition of the user interface to the second state;
in accordance with a determination that the speed of the rotation of the physical crown in the first direction during the input exceeds the first speed threshold after the transition to the second state, displaying, on the display, a transition of the user interface to a third state; and
in accordance with a determination that the speed of the rotation of the physical crown in the first direction during the input is below the first speed threshold before the transition to the second state, displaying, on the display, a transition of the user interface back towards the first state.

22. The method of claim 21, wherein the transition of the user interface from the first state to the second state comprises an animation of translating, in a second direction, a surface of the first state and a surface of the second state.

23. The method of claim 22, wherein the transition of the user interface back towards the first state comprises an animation of translating, in a third direction opposite to the second direction, a surface of the first state and a surface of the second state.

24. The method of claim 21, wherein the transition of the user interface from the first state to the second state includes displaying, on the display, the second state and at least a portion of the first state, wherein a display area of the second state is larger than a display area of the at least the portion of the first state.

25. The method of claim 21, wherein the transition of the user interface back towards the first state includes displaying, on the display, the first state and at least a portion of the second state, wherein a display area of the first state is larger than a display area of the at least the portion of the second state.

26. The method of claim 21, further comprising:
associating the first state with a first data;
associating the second state with a second data, wherein the first data and the second data are different; and
in response to the speed of the rotation of the physical crown during the input exceeding the first speed threshold, displaying the second data at a location corresponding to the second state without displaying the first data.

27. The method of claim 21, further comprising:
associating the first state with a first data;
associating the second state with a second data, wherein the first data and the second data are different; and
in response to the speed of the rotation of the physical crown during the input not exceeding the first speed threshold, displaying the first data at a location corresponding to the first state without displaying the second data.

28. The method of claim 21, wherein the electronic device further includes a touch-sensitive surface, the method further comprising:
- while the second state is displayed, detecting a user input on the touch-sensitive surface of the electronic device at a location corresponding to the second state; and
- in response to detecting the user input, selecting the second state.

29. The method of claim 21, further comprising:
- detecting a user input corresponding to a second rotation of the physical crown while displaying the user interface; and
- in response to detecting the user input corresponding to a second rotation, generating a haptic output.

30. The method of claim 21, wherein the physical crown is a mechanical crown.

* * * * *

UNITED STATES PATENT AND TRADEMARK OFFICE
CERTIFICATE OF CORRECTION

PATENT NO. : 11,068,128 B2  Page 1 of 1
APPLICATION NO. : 16/358483
DATED : July 20, 2021
INVENTOR(S) : Nicholas Zambetti et al.

It is certified that error appears in the above-identified patent and that said Letters Patent is hereby corrected as shown below:

In the Claims

In Column 15, Line 23, Claim 1, delete "state" and insert -- state, --, therefor.

In Column 16, Line 54, Claim 11, delete "displaying;" and insert -- displaying, --, therefor.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*